US010121446B2

(12) United States Patent
Jeong et al.

(10) Patent No.: US 10,121,446 B2
(45) Date of Patent: Nov. 6, 2018

(54) ELECTRONIC DEVICE AND METHOD OF PROVIDING INFORMATION IN ELECTRONIC DEVICE

(71) Applicant: Samsung Electronics Co., Ltd., Gyeonggi-do (KR)

(72) Inventors: Mi-Hyun Jeong, Seoul (KR); Eun-Seok Kim, Gyeonggi-do (KR); Do-Hyeong Park, Seoul (KR); Pyo-Je Cho, Gyeonggi-do (KR); Jin-A Choe, Seoul (KR); Jin-Soo Ha, Seoul (KR); Dong-Il Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 40 days.

(21) Appl. No.: 15/469,057

(22) Filed: Mar. 24, 2017

(65) Prior Publication Data

US 2017/0278477 A1    Sep. 28, 2017

(30) Foreign Application Priority Data

Mar. 24, 2016  (KR) .................. 10-2016-0035469

(51) Int. Cl.
*G09G 5/00* (2006.01)
*F16M 11/12* (2006.01)
*F16M 11/18* (2006.01)

(52) U.S. Cl.
CPC ........... *G09G 5/003* (2013.01); *F16M 11/128* (2013.01); *F16M 11/18* (2013.01); *G09G 2340/04* (2013.01); *G09G 2354/00* (2013.01)

(58) Field of Classification Search
CPC . F16M 11/18; G09G 2340/04; G09G 2354/00
See application file for complete search history.

(56) References Cited

U.S. PATENT DOCUMENTS

| 2005/0122318 | A1* | 6/2005 | Tonouchi | G06F 1/162 345/179 |
| 2006/0022096 | A1* | 2/2006 | Chan | A47B 23/046 248/129 |

(Continued)

FOREIGN PATENT DOCUMENTS

| KR | 1020090079474 | 7/2009 |
| KR | 10-1573364 | 12/2015 |

OTHER PUBLICATIONS

International Search Report dated Jul. 4, 2017 issued in counterpart application No. PCT/KR2017/003229, 10 pages.

*Primary Examiner* — Shaheda Abdin
(74) *Attorney, Agent, or Firm* — The Farrell Law Firm, P.C.

(57) ABSTRACT

An electronic device is provided. The electronic device includes a rotation support member; a support member configured to support the rotation support member; a rotation member movably coupled to the rotation support member; a display movably coupled to a surface of the rotation member; a driving device configured to drive the display; a memory; and a processor, wherein the processor is configured to control, if input information is received, driving of the rotation member to make the display corresponding to the received input information face a first direction, control, if the display moves to face the first direction, driving the rotation member to face a second direction for identify an external object, identifying, if the display is located to face the external object in the second direction, the external object, and display information on at least one function executed in connection with the identified external object on the display.

20 Claims, 48 Drawing Sheets

(56) References Cited

U.S. PATENT DOCUMENTS

| | | | |
|---|---|---|---|
| 2008/0253072 A1* | 10/2008 | Tracy | G06F 1/162 |
| | | | 361/679.06 |
| 2013/0250034 A1 | 9/2013 | Kang et al. | |
| 2014/0191945 A1 | 7/2014 | Wang et al. | |
| 2014/0277735 A1 | 9/2014 | Breazeal | |
| 2015/0317120 A1 | 11/2015 | Kim et al. | |

* cited by examiner

ELECTRONIC DEVICE AND METHOD OF PROVIDING INFORMATION IN ELECTRONIC DEVICE

PRIORITY

This application claims priority under 35 U.S.C. § 119(a) to a Korean Patent Application filed on Mar. 24, 2016 in the Korean Intellectual Property Office and assigned Serial No. 10-2016-0035469, the entire content of which is incorporated herein by reference.

BACKGROUND

1. Field of the Disclosure

The present disclosure relates generally to an electronic device and a method of providing information in an electronic device, and more particularly, to an electronic device and a method of providing information in an electronic device which control driving of a rotation member.

2. Description of the Related Art

Various types of electronic devices are used within the home and the electronic devices have been developed in the form of home devices according to the development of technology.

A home device may transmit and receive information to and from another electronic device within the home, a mobile device of a user, or external communication devices through a communication network in a smart home device form.

An electronic device in a home device form may provide a user with a convenient lifestyle through various services required for living within the home and also provide relevant information to allow the user to recognize various situations and information generated within the home even though the user does not directly recognize them.

A home device type electronic device may transmit and receive information between objects or user devices through a home network and provide information according to the transmission and reception to the user.

However, when providing useful information to a user through an interaction with an object or the user, the electronic device provides only input information, so that a target to be interacted with may not be clearly recognized. Accordingly, in order to precisely determine whether the information provided from the electronic device is information for the user or another person, the user should move in a display direction in which the information is displayed and check the corresponding information. If the user cannot move to a location of the display of the electronic device to check the information, the user may have difficulty in rapidly and precisely identifying the provided information.

SUMMARY

The present disclosure provides an electronic device and a method of providing information in an electronic device which control driving of a rotation member to make the movable display of the electronic device face the identified external object and displays information on a function related to the identified external object on the display according to the movement of the display by the driving of the rotation member.

An aspect of the present disclosure provides an electronic device that can move a display coupled to a rotation member to face a direction in which an identified external object is located according to the rotation of the rotation member and display information on at least one function related to the identified external object in accordance with the movement of the display.

Another aspect of the present disclosure provides an electronic device that can display an object as if the object moves according to a movement of a display and provide an intuitive and familiar experience to a user.

Another aspect of the present disclosure provides an electronic device that can provide information suitable for a context or a matter of interested of an external object through an exact interaction with the external object.

In accordance with an aspect of the present disclosure, an electronic device is provided. The electronic device includes a rotation support member; a support member configured to support the rotation support member; a rotation member movably coupled to the rotation support member; a display movably coupled to a surface of the rotation member; a driving device configured to drive the display; a memory; and a processor, wherein the processor is configured to control, if input information is received, driving of the rotation member to make the display corresponding to the received input information face a first direction, control if the display moves to face the first direction, driving the rotation member to face a second direction for identifying an external object, identifying, if the display is located to face the external object in the second direction, the external object, and displaying information on at least one function executed in connection with the identified external object on the display.

In accordance with another aspect of the present disclosure, a method of an electronic device, including a rotation support member; a support member configured to support the rotation support member; and a rotation member movably coupled to the rotation support member is provided. The method includes if input information is received, controlling, by a processor, driving of the rotation member to make a display coupled to the rotation member corresponding to the received input information face a first direction; if the display moves to face the first direction, controlling, by the processor, the driving of the rotation member to face a second direction for identifying an external object; if the display is located to face the external object in the second direction, identifying, by the processor, the external object; and displaying, by the processor, information on at least one function executed in connection with the identified external object on the display.

In accordance with another aspect of the present disclosure, an electronic device is provided. The electronic device includes a rotation support member; a support member configured to support the rotation support member; a rotation member rotatably coupled to a surface of the rotation support member; first and second rotation devices included within the rotation support member and configured to rotate the rotation member in first and second directions; a display located on a surface of the rotation member; a driving device configured to drive the display; a memory; and a processor, wherein the processor is configured to control, if input information is received, rotating the rotation member to make the display corresponding to the received input information rotates in the first and second directions, identifying an external object located in the first and second directions through at least one sensor, and providing at least one function related to the identified external object.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
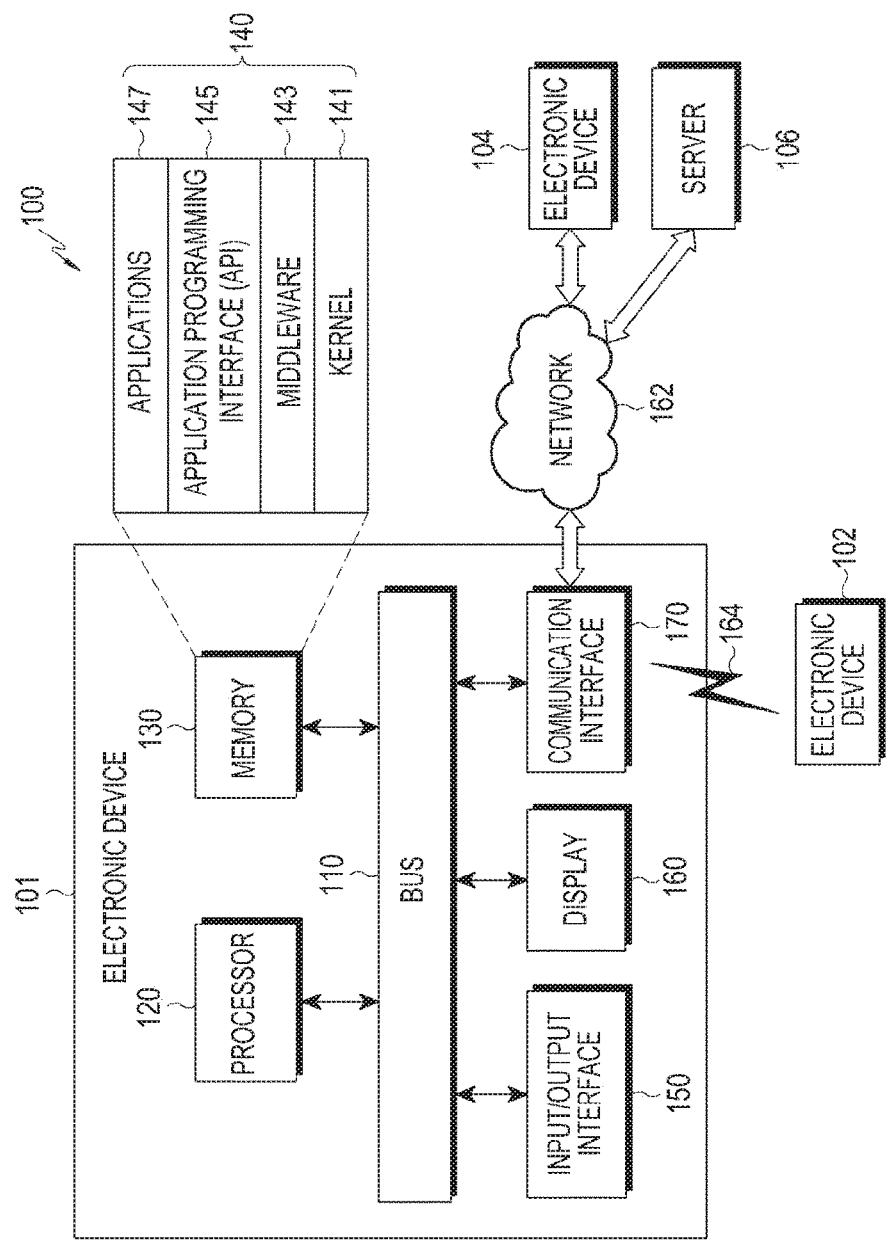
FIG. 1 is a network environment according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives of embodiments of the present disclosure. In describing the drawings, similar reference numerals may be used to designate similar elements.

As used herein, the expressions "have", "may have", "include", and "may include" refer to the existence of a corresponding feature (e.g., a numeral, a function, an operation, or an element such as a component), but does not exclude one or more additional features.

In the present disclosure, the expressions "A or B", "at least one of A and/or B", and "one or more of A and/or B" may include all possible combinations of the items listed. For example, the expressions "A or B", "at least one of A and B", and "at least one of A or B" refers to all of (1) including at least one A, (2) including at least one B, and (3) including all of at least one A and at least one B.

The expressions "a first", "a second", "the first", and "the second" used in various embodiments of the present disclosure may modify various components regardless of order and/or importance but is not intended to limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being (operatively or communicatively) "connected," or "coupled," to another element (e.g., a second element), the element may be directly connected or coupled directly to the other element or any other element (e.g., a third element) may be interposer between them. In contrast, it may be understood that when an element (e.g., a first element) is referred to as being "directly connected," or "directly coupled" to another element (e.g., a second element), there is no element (e.g., a third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate a dedicated processor (e.g., an embedded processor) only for performing the corresponding operations or a general purpose processor (e.g., a central processing unit (CPU) or an application processor (AP)) that can perform the corresponding operations by executing one or more software programs stored in a memory device.

The terms used herein are merely for the purpose of describing certain embodiments of the present disclosure and are not intended to limit the scope of other embodiments. A singular expression may include a plural expression unless they are definitely different in a context. Unless defined otherwise, all terms used herein, have the same meanings as those commonly understood by a person skilled in the art to which the present disclosure pertains. Such terms as those defined in a generally used dictionary may be interpreted to have meanings equal to the contextual meanings in the relevant field of art, and are not intended to be interpreted to have ideal or excessively formal meanings unless clearly defined in the present disclosure. In some cases, even a term defined in the present disclosure should not be interpreted to exclude embodiments of the present disclosure.

An electronic device according to an embodiment of the present disclosure may include at least one of, for example, a smart phone, a tablet personal computer (PC), a mobile phone, a video phone, an electronic book reader (e.g., an e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. A wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. A home appliance may include at least one of, for example, a television, a digital video disk (DVD) player, an audio player, a refrigerator, an air conditioner, a vacuum cleaner; an oven, a microwave oven, a washing machine, an air cleaner, a set-top box, a home automation control panel, a security control panel, a TV box (e.g., Samsung Home-Sync®, Apple TV®, or Google TV™), a game console (e.g., Xbox® and PlayStation®), an electronic dictionary, an electronic key, a camcorder, and an electronic photo frame.

According to an embodiment of the present disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) machine, a magnetic resonance imaging (MRI) machine, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an Internet of Things device (e.g., a light bulb, various sensors, electric or gas meter, a sprinkler device, a fire alarm, a thermostat, a streetlamp, a toaster, sporting goods, a hot water tank, a heater, a boiler, etc.).

According to an embodiment of the present disclosure, an electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device may be a combination of one or more of the aforementioned various devices. An electronic device may also be a flexible device. However, an electronic device is not intended to be limited to the aforementioned devices, but may include a newly developed electronic device.

Hereinafter, an electronic device according to an embodiment of the present disclosure is described with reference to the accompanying drawings. In the present disclosure, the term "user" may indicate a person using an electronic device or a device (e.g., an artificial intelligence electronic device) using an electronic device.

FIG. 1 is a network environment 100 according to an embodiment of the present disclosure.

Referring to FIG. 1, an electronic device 101 is within the network environment 100. The electronic device 101 may include a bus 110, a processor 120, a memory 130, an input/output interface 150, a display 160, and a communication interface 170. The electronic device 101 may omit at least one of the elements, or may further include other elements.

The bus 110 may include, for example, a circuit that interconnects the components 110 to 170 and delivers communication (for example, a control message and/or data) between the components 110 to 170.

The processor 120 may include one or more of a CPU, an AP, and a communication processor (CP). The processor 120 may carry out, for example, operations or data processing relating to control and/or communication of one or more other elements of the electronic device 101.

The memory 130 may include a volatile and/or a non-volatile memory. The memory 130 may store, for example, instructions or data relevant to at least one other element of the electronic device 101. The memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the bus 110, the processor 120, the memory 130, or the like of the electronic device 101, to at least one of the application programs 147. For example, the middleware 143 may perform scheduling or load balancing on the one or more task requests by processing the one or more task requests according to the priorities assigned to the one or more application programs.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

The display 160 may include, for example, a liquid crystal display (LCD), a light-emitting diode (LED) display, an organic LED (OLED) display, a microelectromechanical systems (MEMS) display, and an electronic paper display. The display 160 may display, for example, various types of contents (for example, text, images, videos, icons, or symbols) to a user. The display 160 may include a touch screen and may receive, for example, a touch, a gesture, a proximity, or a hovering input using an electronic pen or a part of a user's body.

The communication interface 170 may configure communication, for example, between the electronic device 101 and a first external electronic device 102, a second external electronic device 104, or a server 106. For example, the communication interface 170 may be connected to a network 162 through wireless or wired communication to communicate with the second external electronic device 104 or the server 106.

Wireless communication may use, for example, at least one of long term evolution (LTE), LTE-Advance (LTE-A), code division multiple access (CDMA), wideband CDMA (WCDMA), universal mobile telecommunications system (UMTS), wireless broadband (WiBro), global system for mobile communications (GSM) and the like, for example, as a cellular communication protocol. In addition, the wireless communication may include, for example, short range communication 164. The short-range communication 164 may include at least one of, for example, wireless fidelity (Wi-Fi), Bluetooth, near field communication (NFC), magnetic Zig-Bee, z-wave, and global navigation satellite system (GNSS). The GNSS may include, for example, at least one of a GPS, a global navigation satellite system (Glonass), a Beidou Navigation satellite system (Beidou), Galileo, and the European global satellite-based navigation system according to a place of usage, a bandwidth, or the like. Hereinafter, in the present disclosure, "GPS" may be interchangeably used with "GNSS". Wired communication may include, for example, at least one of a universal serial bus (USB), a high definition multimedia interface (HDMI), recommended standard 232 (RS-232), a plain old telephone service (POTS), and the like. The network 162 may include at least one of a telecommunication network such as a computer network (for example, a local area network (LAN) or a wide area network (WAN)), the Internet, and a telephone network.

Each of the first and second external electronic devices 102 and 104 may be of the same type as or a different type from the electronic device 101. According to an embodiment of the present disclosure, the server 106 may include a group of one or more servers. All or some of the operations executed in the electronic device 101 may be executed in another electronic device or a plurality of electronic devices (for example, the electronic devices 102 and 104 or the server 106). If the electronic device 101 must perform some functions or services automatically or in response to a request, the electronic device 101 may make a request the electronic device 102 or 104 or the server 106 perform at least some functions relating thereto instead of performing the functions or services itself or in addition. The electronic device 102 or 104, or the server 106 may execute the requested functions or the additional functions, and may deliver a result of the execution to the electronic device 101. The electronic device 101 may provide the received result as is, or may additionally process the received result to provide the requested functions or services. In this case, cloud computing, distributed computing, or client-server computing technology may be used.

Hereinafter, an electronic device according to various embodiments of the present disclosure is described with reference to the accompanying drawings.

Figure 2A:
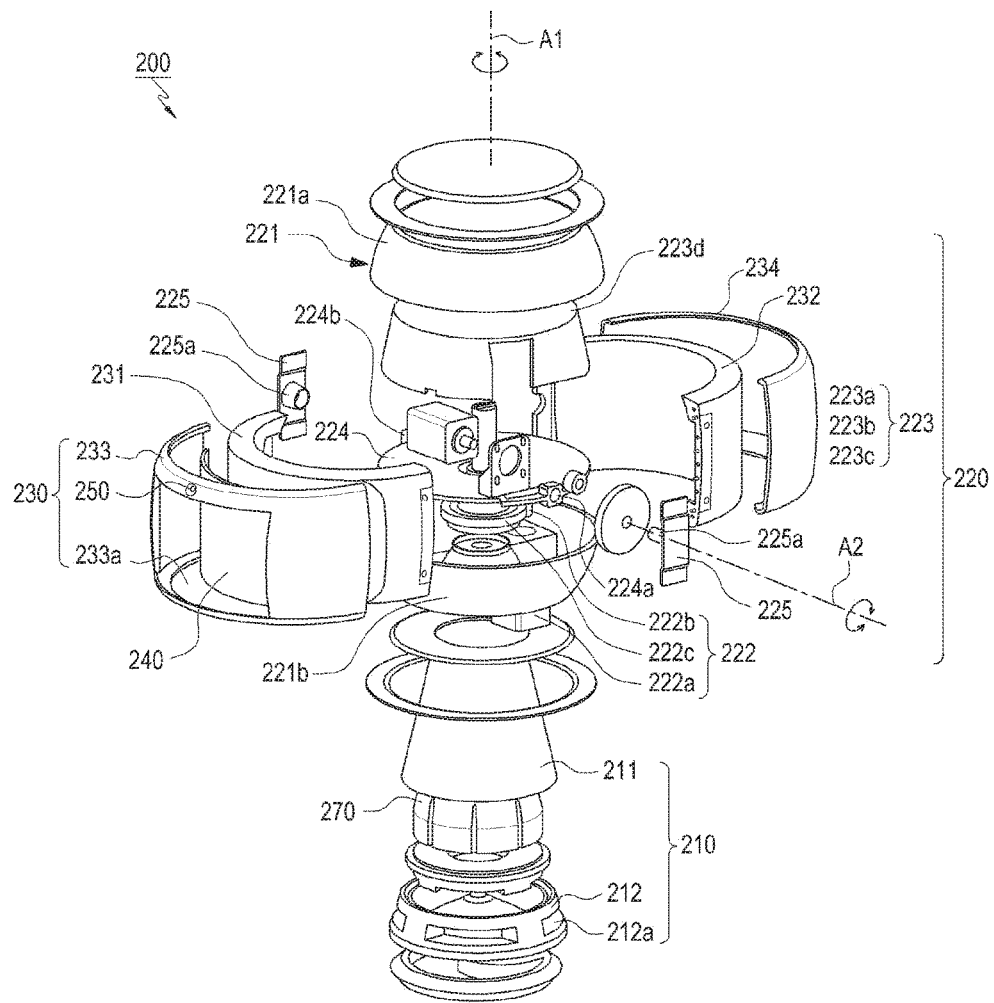
FIGS. 2A, 2B, 2C, 2D, 2E, and 2F illustrate examples of an external configuration of an electronic device according to various embodiments of the present disclosure.
Figure 2B:
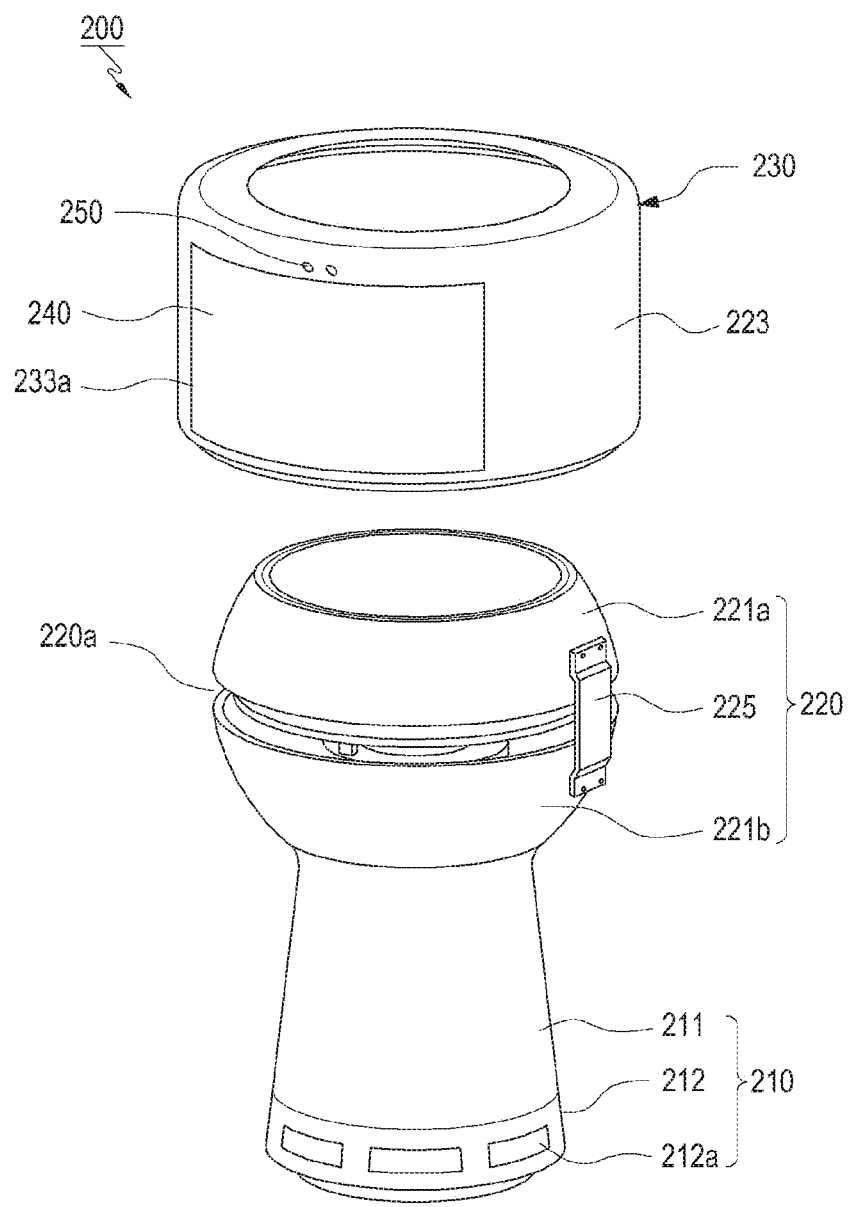

FIGS. 2A, 2B, 2C, 2D, 2E, and 2F illustrate examples of an external configuration of an electronic device 200 (for example, the electronic device 101 or 102 of FIG. 1) according to various embodiments of the present disclosure. FIG. 2A is an exploded perspective view illustrating the configuration of the electronic device 200, and FIG. 2B is an exploded perspective view illustrating a state before a rotation member 230 and a rotation support member 220 are coupled in the configuration of the electronic device 200.

Referring to FIGS. 2A and 2B, the electronic device 200 may include a rotation support member 220, a support member 210, a rotation member 230, first and second rotation modules 222 and 223, a display 240, a driving module, a memory, and a processor. The rotation support member 220 may be supported by the support member 210 and may rotatably couple the rotation member 230 thereto.

The support member 210 may be disposed below the rotation support member 220 to support the rotation support member 220 such that the rotation support member 220 can rotate the rotation member 230.

The rotation member 230 may be rotatably coupled to the surface of the rotation support member 220 to be rotated in first and second directions A1 (e.g., axis 1) and A2 (e.g., axis 2) on the surface of the rotation support member 220.

The first and second rotation modules 222 and 223 may be disposed within the rotation support member 220 to rotate the rotation member 230 in the first and second directions A1 and A2.

The display 240 may be disposed on the surface of the rotation member 230 to display information of the electronic device 200.

When receiving input information, the processor may control the rotation of the rotation member 230 such that the display 240 (e.g., a screen of the display) corresponding to the received input information is rotated in the first and second directions A1 and A2, identify an external object located in the first and second directions A1 and A2 through at least one sensor 250, and provide at least one function related to the identified external object.

The memory (for example, the same as or similar to the memory 130 of FIG. 1) may store various pieces of data created during execution of programs including a program required for a function operation according to various embodiments of the present disclosure. The processor and the memory will be described below in more detail.

Hereinafter, the support member 210 in the electronic device 200 is described below in more detail with reference to the accompanying drawings.

The support member 210 may include first and second cases 211 and 212. For example, a speaker 270 may be embedded in the first case 211. The second case 212 may have at least one discharge hole 212a to emit sound of the speaker 270. The top surface of the first case 211 may be formed in the shape of a disc, the body of the first case 211 may be formed in the shape of a column, and the bottom part of the first case 211 may be coupled to the second case 212.

The second case 212 may stand on a floor and support the first case 211, and the first case 211 may support the rotation support member 220 and the rotation member 230.

The rotation support member 220 supported by the support member 210 is described below in more detail.

The rotation support member 220 may include a body 221 including first and second housings 221a and 221b, first and second rotation modules 222 and 223, a rotator 224, and at least one coupling piece 225. For example, the body 221 is supported by and disposed on the top of the support member 210, the first and second rotation modules 222 and 223 and the rotator 224 may be disposed inside the body 221, and the coupling piece 225 may be disposed outside the body 221.

The first rotation module 222 may include a first drive 222a (for example, a motor or the like), and may be disposed within the body 221 to rotate the rotation member 230 by the first drive 222a in the horizontal direction with respect to the first direction A1.

The second rotation module 223 may include a second drive 223a (for example, a motor or the like), and may be disposed within the body 221 to rotate the rotation member 230 by the second drive 223a in the up-and-down direction with respect to the second direction A2.

The rotator 224 may be coupled to the rotation member 230 and disposed within the body 221 to be rotated along with the rotation member 230.

The coupling piece 225 may be disposed between the rotation member 230 and the rotator 224 to couple the rotation member 230 and the rotator 224.

The coupling piece 225 may include first and second coupling pieces 225. The first and second coupling pieces 225 may have coupling protrusions 225a formed on the rear surfaces thereof, which are coupled to first and second coupling holes 224b and 224a formed in the rotator 224 to rotate the rotation member 230 along with the rotator 224.

The body 221 may include the first and second housings 221a and 221b, and a guide hole 220a may be formed between the first and second housings 221a and 221b to guide the rotation of the rotator 224.

Figure 2C:
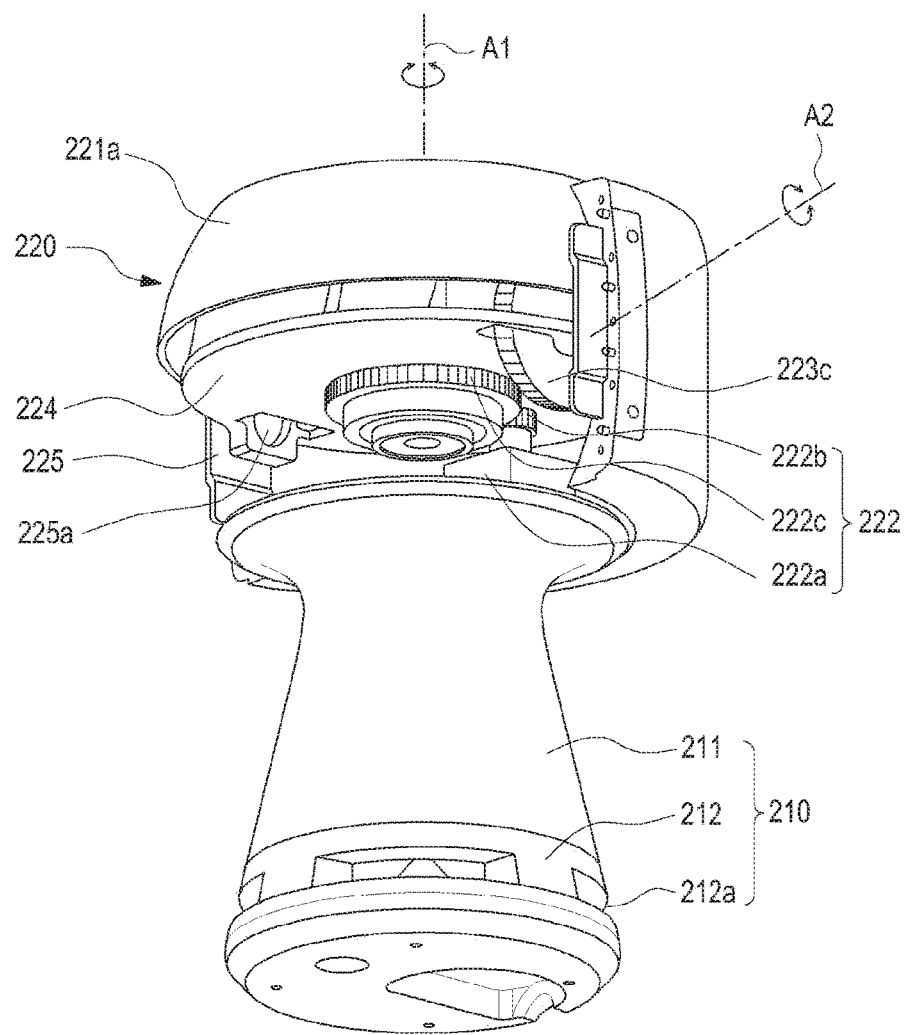

The first rotation module 222 is described below in more detail with reference to FIG. 2C. FIG. 2C is a cutaway perspective view illustrating a coupled state of the first rotation module 222 in the electronic device 200 according to an embodiment of the present disclosure.

For example, the first rotation module 222 may include the first drive 222a and first and second gears 222b and 222c.

The first drive 222a may be disposed below the rotator 224 to rotate the rotator 224 in the first direction A1.

The first gear 222b may be disposed in the first drive 222a to be engaged with the second gear 222c as described below and to rotate the second gear 222c at the same time.

The second gear 222c may be engaged with the first gear 222b and may be disposed on the bottom surface of the rotator 224 to rotate the rotator 224 and simultaneously rotate the rotation member 230 in the first direction A1 by transmitting the torque of the first drive 222a to the rotator 224.

Figure 3:
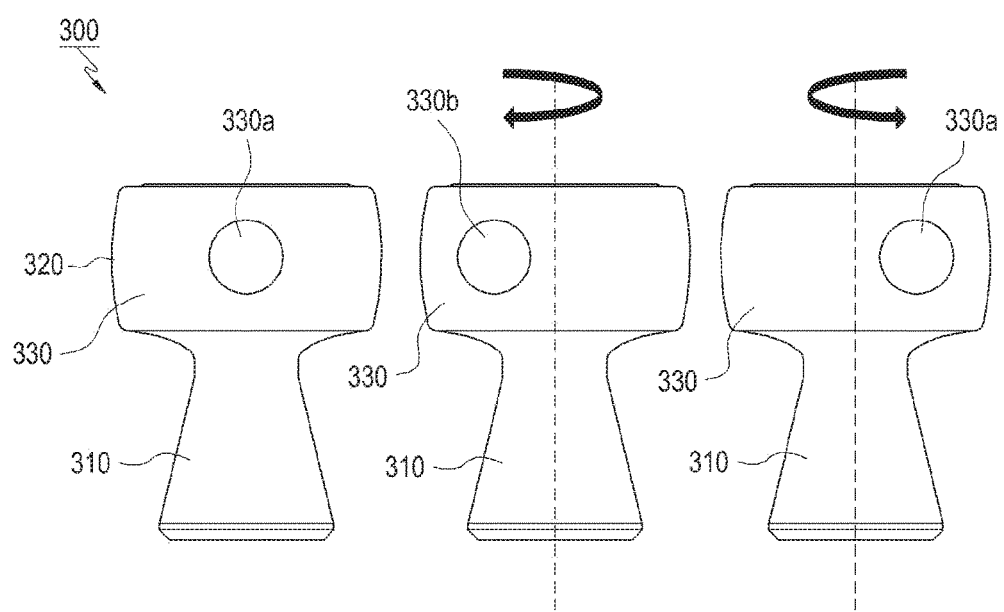
FIG. 3 illustrates an example of a movement of an external configuration of an electronic device according to an embodiment of the present disclosure.

For example, when power is supplied to the first drive 222a to operate the first drive 222a, the first drive 222a may rotate and the torque of the first drive 222a may be transmitted to the second gear 222c through the first gear 222b. As the second gear 222c rotates, the rotator 224 may also rotate along therewith and may horizontally rotate the rotation member 230 to the left or right in the first direction A1 while being rotated in the first direction A1. The rotation member 230 may be rotated along the surface of the rotation support member 220 in the first direction A1. In this way, the first rotation module 222 may rotate the rotation member 230 to the left or right with respect to the first direction A1, as illustrated in FIG. 3.

Figure 2D:
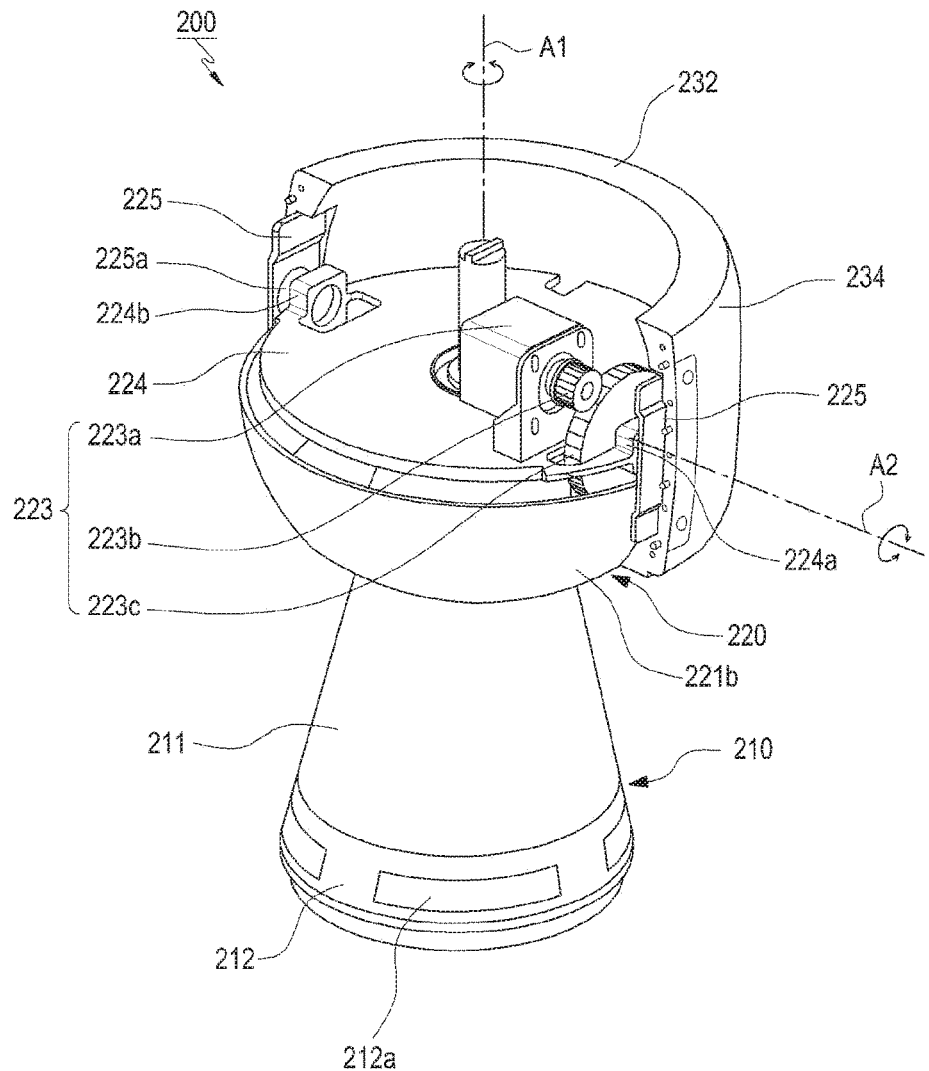

The second rotation module 223 is described below in more detail with reference to FIG. 2D. FIG. 2D is a cutaway perspective view illustrating a coupled state of the second rotation module 223 in the configuration of the electronic device 200 according to an embodiment of the present disclosure.

For example, the second rotation module 223 may include the second drive 223a and first and second gears 223b and 223c.

The second drive 223a may be disposed on the rotator 224 to rotate the rotator 224 in the second direction A2.

The first gear 223b may be disposed in the second drive 223a to be engaged with the second gear 223c as described below and to rotate the second gear 223c at the same time.

The second gear 223c may be engaged with the first gear 223b and may be disposed on the side of the rotator 224 to rotate the rotator 224 and simultaneously rotate the rotation member 230 in the first direction A1 by transmitting torque of the second drive 223a to the rotator 224.

The second gear 223c may be rotatably coupled to the rotator 224 while passing through a through hole formed in the rotator 224. A center hole may be formed at the center of the second gear 223c to face the first coupling hole 224a formed on the side surface of the rotator 224. When the center hole of the second gear 223c and the first coupling hole 224a of the rotator 224 face each other, the coupling protrusion 225a formed on the rear surface of the first coupling piece 225 may be inserted into and coupled to the holes. Accordingly, when the second gear 223c rotates, the coupling piece 225 may be also rotated. Since the second coupling hole 224b to be coupled with the coupling protrusion 225a formed on the rear surface of the second coupling piece 225 is formed on the opposite side surface to the first coupling hole 224a formed on the rotator 224, the coupling protrusion 225a formed on the rear surface of the second coupling piece 225 may be coupled to the second coupling hole 224b.

Protection covers 233 and 234 for protecting the second drive 223a and the first and second gears 223b and 223c may be disposed on the rotator 224. For example, the protection covers 233 and 234 may cover and protect the second drive 223a and the first and second gears 223b and 223c.

Figure 4A:
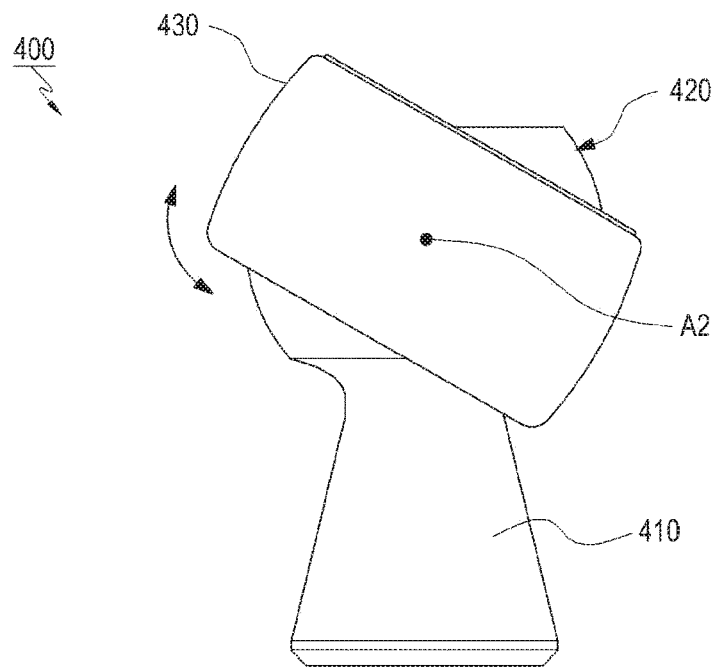
FIGS. 4A and 4B illustrate examples of a movement of an external configuration of an electronic device according to various embodiments of the present disclosure.
Figure 4B:
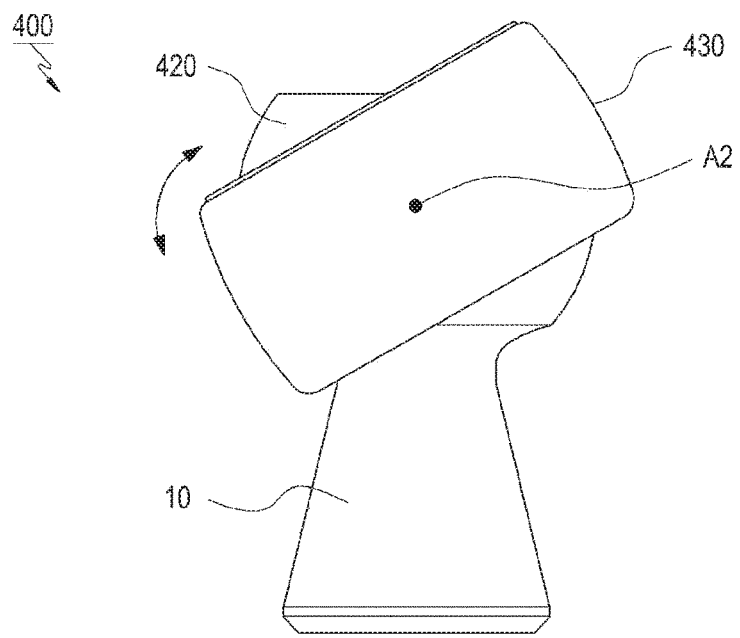

For example, when power is supplied to the second drive 223a to operate the second drive 223a, the second drive 223a may rotate and the torque of the second drive 223a may be transmitted to the second gear 223c through the first gear 223b. As the second gear 223c rotates, the rotator 224 may also rotate and may rotate the rotation member 230 upward or downward in the second direction A2 while being rotated in the second direction A2. The rotation member 230 may be rotated along the surface of the rotation support member 220 in the second direction A2. In this way, the second rotation module 223 may rotate the rotation member 230 upward and downward with respect to the second direction A2, as illustrated in FIGS. 4A and 4B.

Figure 2E:
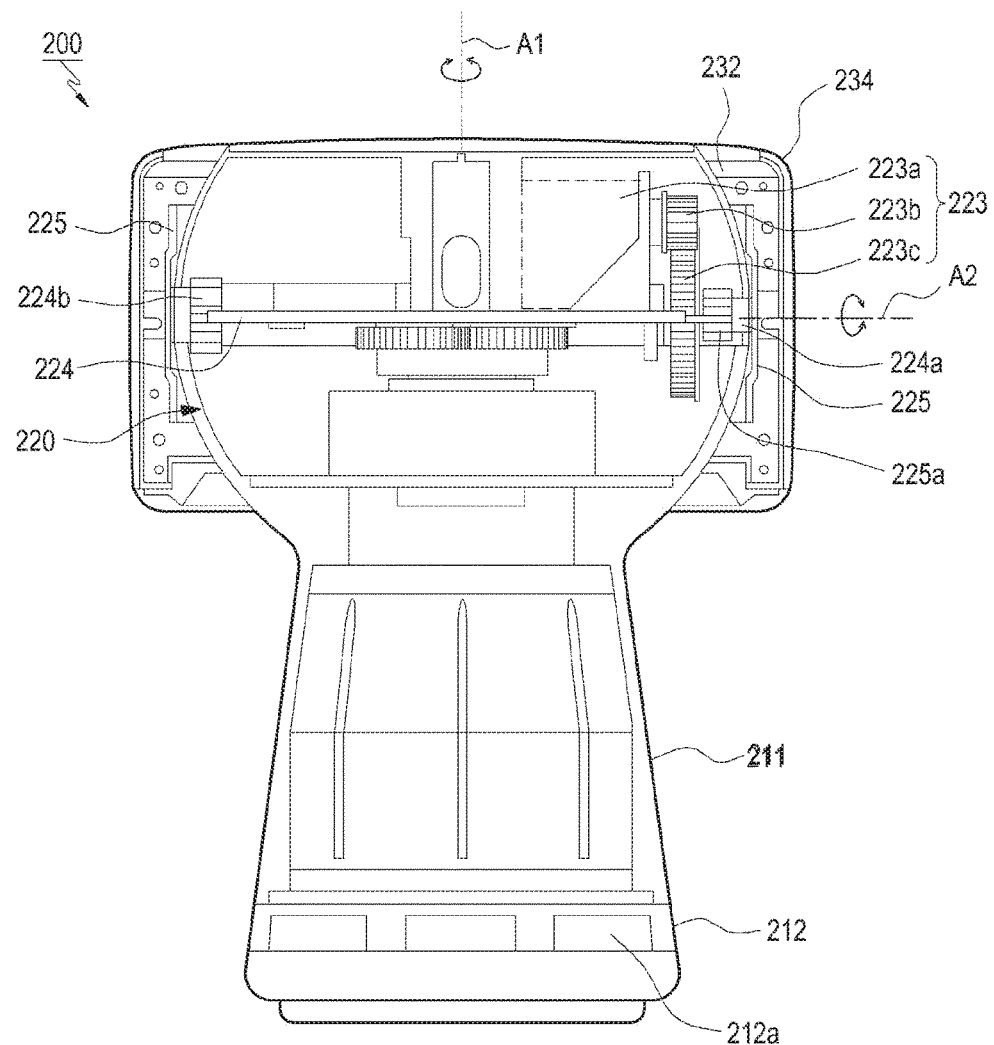

The rotation member 230 is described below in more detail with reference to FIGS. 2E and 2F. FIG. 2E is a side cross-sectional view illustrating a coupled state of the rotation member 230 in the configuration of the electronic device 200 according to an embodiment of the present disclosure, and FIG. 2F is a cutaway perspective view illustrating the coupled state of the rotation member 230 in the configuration of the electronic device 200 according to an embodiment of the present disclosure.

For example, as illustrated in FIG. 2A described above, the rotation member 230 may include first and second brackets 231 and 232 and the first and second covers 233 and 234. The first bracket 231 may be formed in a hemispheric shape and may include the display 240. The second bracket 232 may be formed in a hemispheric shape and may be coupled to the first bracket 231 while forming a ring shape with the first bracket 231. The first cover 233 may include at least one sensor and have an opening 233a to expose the display 240 to the outside. The second cover 234 may be disposed on the surface of the second bracket 232 to be coupled to the first cover 233.

Figure 2F:
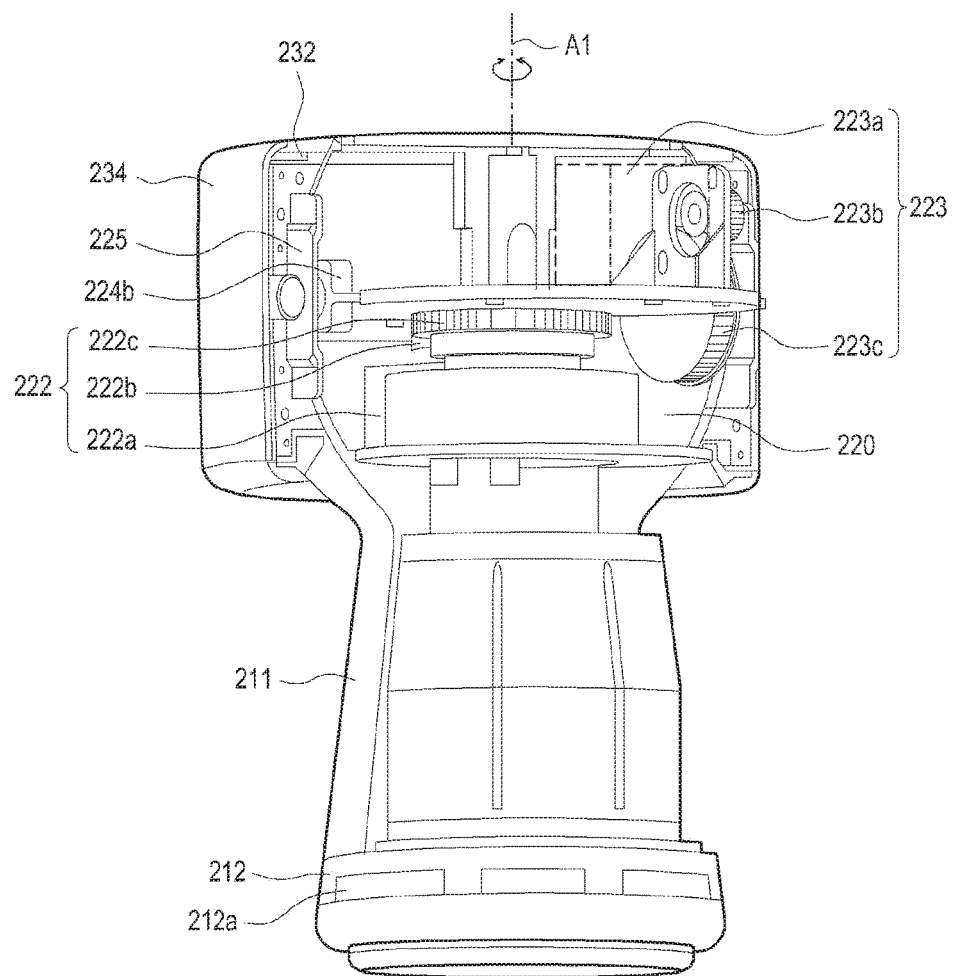

For example, as illustrated in FIGS. 2E and 2F, the display 240 and the first cover 233 are located on a first surface of the first bracket 231, and the display 240 may be exposed to the outside through the opening 233a of the first cover 233. A second surface opposite to the first surface of the first bracket 231 may be rotatably coupled to face the surface of the rotation support member 220 while facing the same. The second cover 234 may be disposed on a first surface of the second bracket 232, and a second surface opposite to the first surface of the second bracket 232 may be rotatably coupled to the surface of the rotation support member 220 while facing the same.

When receiving input information, the processor may control the rotation member 230 to rotate the display 240 corresponding to the received input information in the first and second directions A1 and A2. For example, the processor may apply power to the first and second drives 222a and 223a of the first and second rotation modules 222 and 223, so as to simultaneously rotate the first and second drives 222a and 223a and the rotator 224. The processor may simultaneously control the application of power to the first and second drives 222a and 223a and the rotations of the first and second drives 222a and 223a and the rotator 224.

Accordingly, the rotator 224 may rotate the rotation member 230 according to the rotation of the first and second drives 222a and 223a. Then, the processor may identify external objects located in the first and second directions A1 and A2 through sensors disposed on the first cover 233, determine the locations of the identified external objects, and control the first and second drives 222a and 223a and the rotator 224, so as to rotate the rotation member 230. The operation of the processor is described below in more detail.

The first and second covers 233 and 234 may be made of one of a material including glass, transparent acryl, polyethylene, polyethylene terephthalate, and polycarbonate. Various transparent materials as well as the above listed materials may be employed for the material of the first and second covers 233 and 234.

Referring to FIGS. 2A and 2B described above, the electronic device 200 (for example, the electronic device 101 of FIG. 1) may include the support member 210, the rotation support member 220, the rotation member 230, and the first and second rotation modules 222 and 223 according to various embodiments of the present disclosure. Further, the electronic device 200 may include the display 240 coupled to the surface of the rotation member 230 and the sensor module 250 including at least one sensor that can acquire surrounding information. The sensor module 250 may include at least one sensor of an image sensor, an infrared sensor, an ultrasonic sensor, an illumination sensor, a red-green-blue (RGB) sensor, a ultra-wideband (UWB), a JIGBEE, and a microphone and also include various sensors that can acquire surrounding information. The sensor module 250 may be coupled to a partial area of at least one of the support member 210, the rotation support member 220, and the rotation member 230 as well as the areas illustrated in FIG. 2B.

Further, the speaker 270 of the electronic device 200 as illustrated in FIG. 2A may be disposed in a partial exposed area of at least one of the rotation support member 220 and the rotation member 230 as well as the support member 210.

In addition, the electronic device 200 may include software elements for performing the operation or function of the electronic device in internal areas of at least one of the support member 210, the rotation support member 220, and the rotation member 230. According to various embodiments of the present disclosure, the electronic device may include a processor (for example, the processor 120 of FIG. 1) for processing and controlling the operation and function to provide information through an interaction with an identified external object.

The support member 210 may be coupled to the rotation support member 220 and support the rotation support member 220. The rotation support member 220 may include, in at least one area thereof, a module for supplying power and the first and second rotation modules (the aforementioned first and second drives and first and second gears) that drive the rotation member 230 to rotate the display 240 coupled to the rotation member 230.

A means of transportation (for example, a wheel) may be coupled to the lower exposed surface of the support member 210 to allow the electronic device 200 to move to another place. According to various embodiments of the present disclosure, the support member 210 may receive a power input externally, and a connection terminal or a cable for receiving power from the outside may be accommodated in the lower part of the electronic device. A coil for receiving power from an external wireless charging supply device through a wireless charging scheme may be mounted in the lower part of the support member 210. For example, a battery for receiving power may be formed in an internal area of at least one of the support member 210, the rotation support member 220, and the rotation member 230.

According to various embodiments of the present disclosure, the opening 233a of the rotation member 230, through which the display 240 can be exposed, may be formed to surround the entire area of the first cover 233, as well as the form illustrated in FIG. 2A. The rotation member 230 may have an opening (for example, similar to the opening 233a) formed in a partial or the entire area of the second cover 234 to expose the display 240 disposed on the second cover 234. The first cover 233 or the second cover 234 may be formed with a window to cover the surface of a panel (for example, a panel in a circular ring shape) of the display 240. The window of the rotation member 230 may be, for example, a display that may display information in a partial or the entire area.

As described above, the rotation support member 220 may include various elements (for example, the first and second rotation modules and the rotate) for rotating the rotation member 230 therein, and a physical button or a touch pad capable of a touch input may be coupled on the outer top surface of the rotation member 220. At least some of the elements included in the rotation support member 220 may be coupled to at least some of the elements (the first and second brackets and the first and second covers) included in the rotation member 230 to rotate the rotation member 230. Since the rotation and coupling configurations of the rotation support member and the rotation member are illustrated in FIGS. 2A and 2B, a detailed description thereof is omitted.

The electronic device 200 according to various embodiments of the present disclosure may be configured in the form as illustrated in FIGS. 2A to 2F, but is not limited thereto and may be configured in various forms. The electronic device may include various modules (for example, the first and second rotation modules 222 and 223 and the rotator 224 of FIGS. 2A to 2F) for moving the display 240 coupled to the rotation member 230 within the support member 210 and the rotation support member 220. For example, the electronic device may separately include the first rotation module, the drive of which is driven to rotate in the horizontal direction of the first direction A1 of the rotation support member 220, and the second rotation module, the drive of which is driven to rotate in the left-and-right direction with respect to the horizontal axis. The first rotation module may include the first drive (for example, motor) and the first and second gears. The second rotation module may include the first drive (for example, fan motor) and the first and second gears.

Further, the electronic device may include the display 240 formed to surround one area on the surface of the rotation member 230 and may include the coupling piece (for example, a display assembly) for coupling the rotation member 230 and the rotation support member 220.

Figure 5A:
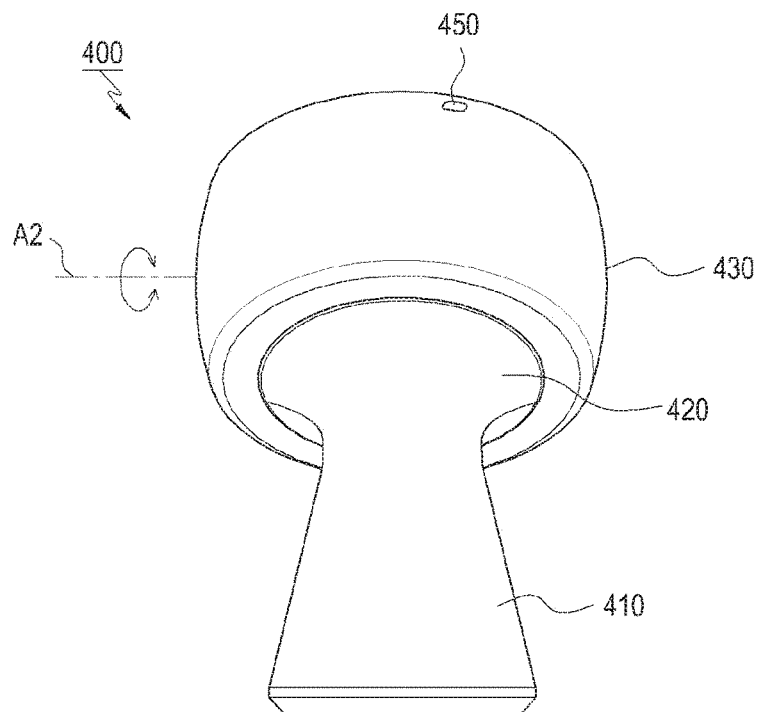
FIGS. 5A and 5B illustrate examples of a movement of an external configuration of an electronic device according to various embodiments of the present disclosure.
Figure 5B:
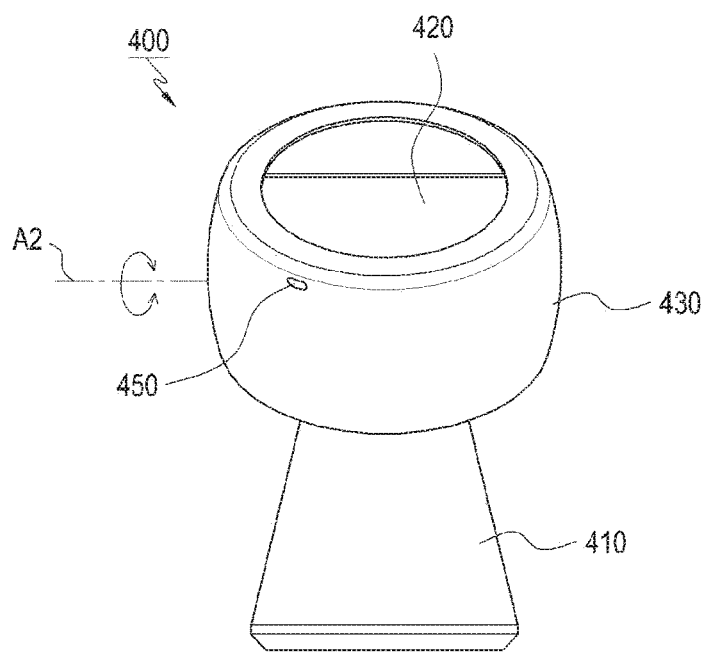

FIG. 3 illustrates an example of a rotation in a first direction of a rotation member in a configuration of an electronic device according to various embodiments of the present disclosure, FIGS. 4A and 4B illustrate examples of a rotation in a second direction of the rotation member in the electronic device, and FIGS. 5A and 5B illustrate examples of another rotation in the second direction of the rotation member in the electronic device, according to various embodiments of the present disclosure.

Referring to FIG. 3, an electronic device 300 may include a support member 310, a rotation support member coupled to the support member 310, and a rotation member 320, the rotation support member may include first and second rotation modules therein, and the rotation member 320 may be rotated in the left-and-right direction corresponding to the horizontal direction of a vertical axis (for example, A1 of FIG. 2A) by the first and second rotation modules. According to various embodiments of the present disclosure, if a display moves in a rotation direction according to the rotation of the rotation member 320, the electronic device 300 may control displaying of an object to create an effect as if the object also moves according to the movement. For example, the electronic device 300 may display an object 330a in, for example, a central area of the display 330 formed to surround a partial or the entire area of the rotation member 320. Thereafter, when rotating to the left, the electronic device 300 may move the displayed object 331a in advance to a left area of the display 330, that is, an area toward which the electronic device 300 will rotate and display the moved object 330b or 330c. When the rotation of the rotation member 320 is completed, the electronic device 300 may display the object 331b, which has been moved in advance to the left area of the display 330, at the location before the driving, for example, the central area of the display 330. According to various embodiments, if the display 330 moves in the right direction as the rotation member 320 is rotated in the right direction, for example, the electronic device 300 may move, in advance, the object 331a, which is located in the central area of the display 330, in the right direction of the display 330 and display the moved object 331c, and, if the rotation of the rotation member 300 is completed, the moved and displayed object 331c may be displayed at the original location (e.g., the central area of the display) again.

Since the first and second rotation modules and the rotation support member are the same as the first and second rotation modules 222 and 223 and the rotation support member 220 illustrated in FIG. 2A described above, a detail description thereof will be omitted.

Referring to FIGS. 4A and 4B, an electronic device 400 may include a support member 430, a rotation support member 420, and a rotation member 430, the rotation support member 420 may include first and second rotation modules therein, and the rotation member 430 may be rotated in the up-and-down direction of the second direction A2 by the first and second rotation modules. FIGS. 5A and 5B illustrate the upward/download rotation operation of the rotation member 430 as viewed from the front while FIGS. 4A and 4B illustrate the same as viewed from the side.

Similarly, since the first and second rotation modules and the rotation support member 420 are the same as the first and second rotation modules 222 and 223 and the rotation support member 220 illustrated in FIG. 2A described above, a detail description thereof will be omitted.

Figure 6A:
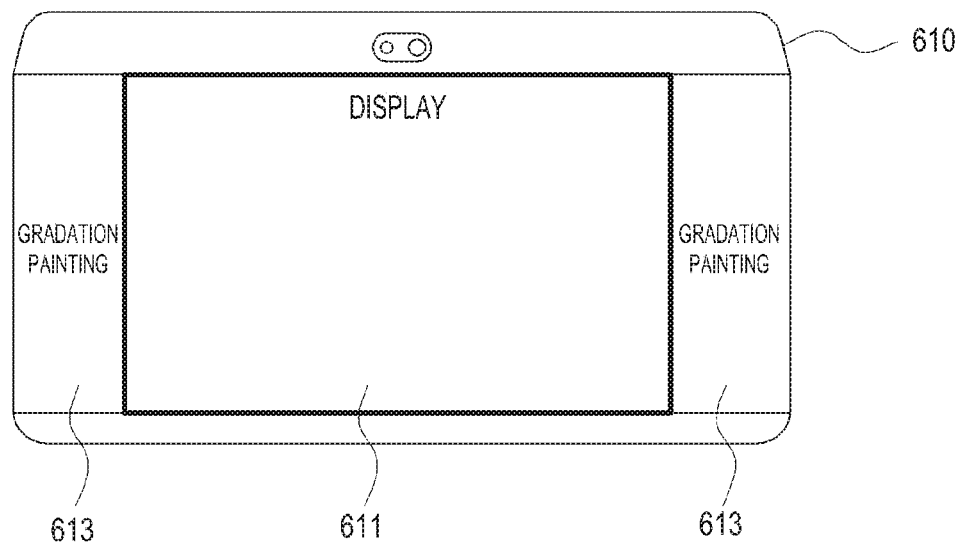
FIGS. 6A, 6B, and 6C illustrate examples of a configuration of a display of an electronic device according to various embodiments of the present disclosure.
Figure 6B:
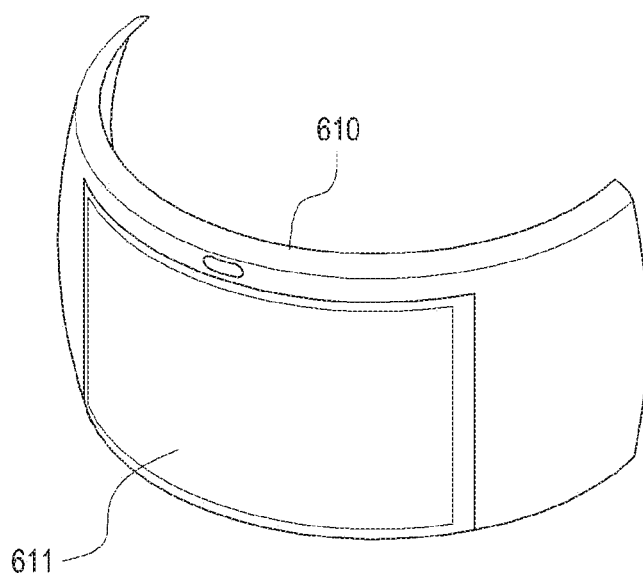
Figure 6C:
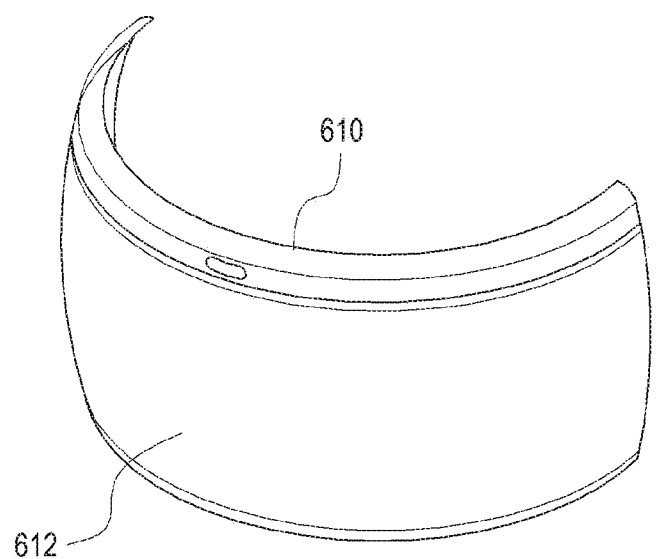

FIGS. 6A to 6C illustrate examples of a configuration of a display of an electronic device according to various embodiments of the present disclosure.

Referring to FIGS. 6A and 6B, a display 611 (for example, similar to or the same as the display 240 of FIGS. 2A and 2B) of the electronic device may be coupled to a rotation member 610, and a panel of the display 611 may be coupled to one area of the surface of the rotation member 610 (similar to or the same as the rotation member 230 of FIGS. 2A to 2F). A window may be coupled to the surface of the rotation member. For a sense of unification between the display panel and the window assembly, the electronic device may be treated with gradation painting by differentiating painting of the window assembly in an area close to the display from painting of the window assembly in an area far away from the display 611. According to various embodiments of the present disclosure, for example, left and right 10 mm areas from an active area of the display may be gradated such that the outermost part is black and the areas become more transparent as going to an inner part.

According to various embodiments of the present disclosure, at least a part of the display 611 of the electronic device may be bent and coupled to the window assembly of the rotation member 610. The display 611 of the electronic device may be coupled based on a coupling area, a physical structure for coupling, or a chemical conjugate, provided on at least one of the window assembly, so as to maintain a predetermined amount of bending.

Referring to FIG. 6C, according to various embodiments of the present disclosure, the electronic device may include the display 612 formed to completely surround, for example, the surface of the cylindrical rotation member 610. The rotation member 610 may have an opening formed to surround the entire surface thereof and may be formed such that a transparent window is coupled to the opening.

The electronic device according to various embodiments of the present disclosure may be configured in various forms to provide information to the user as well as the form illustrated in FIGS. 2A to 6C.

Hereinafter, a software configuration of the electronic device according to various embodiments of the present disclosure is described in detail based on the hardware configuration of the electronic device described above.

Figure 7:
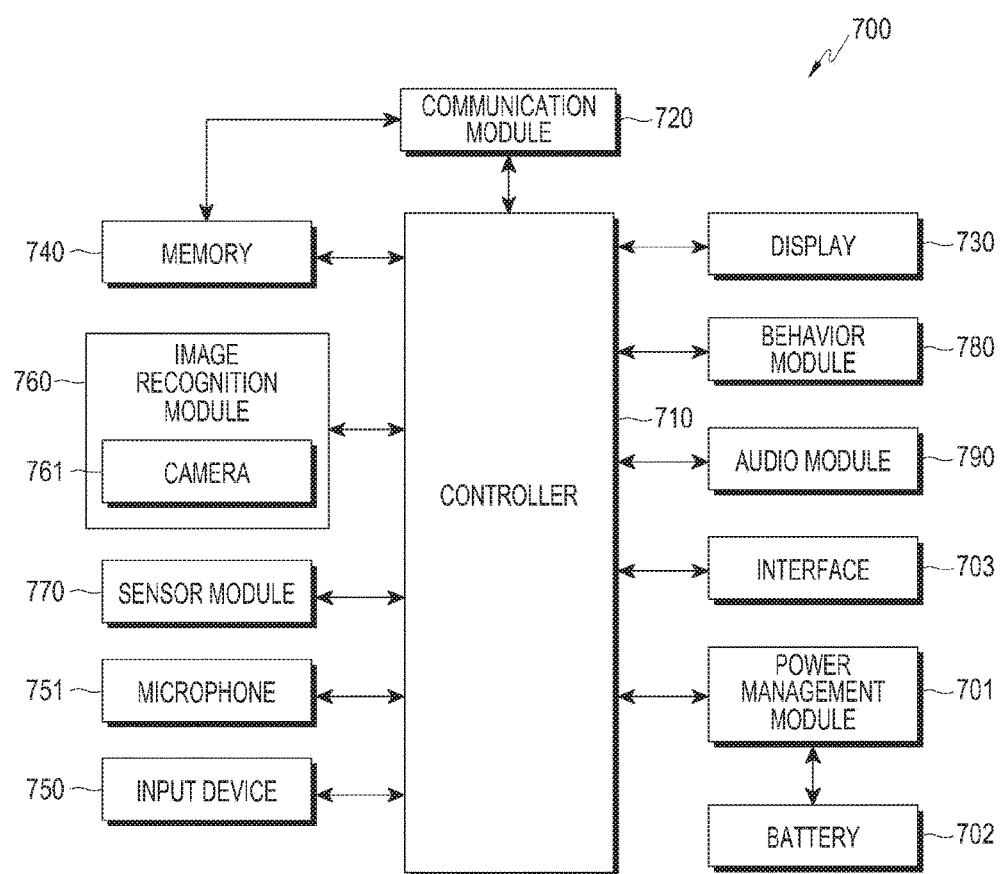
FIG. 7 is an electronic device according to an embodiment of the present disclosure.

FIG. 7 is an electronic device according to an embodiment of the present disclosure.

Referring to FIG. 7, an electronic device 700 (for example, the electronic device 101 of FIG. 1) may include at least one of a controller 710, a display 730, a communication module 720, a memory 740, an input device 750, an image recognition module 760, a sensor module 770, a behavior module 780, and an audio module 790. Further, the electronic device 700 may further include at least one of a power management module 701, a battery 702, an interface 703, and a microphone 751. In addition, the electronic device 700 may further include a subscriber identification module (SIM) card.

According to various embodiments of the present disclosure, the controller 710 (for example, the same as or similar to the processor 120 of FIG. 1) may control execution of information, a program, an application, or a function according to an operation of the electronic device 700. The controller 710 may make a control to perform communication with surrounding devices and to display various types of information (e.g., graphic elements, contents, or objects) in entire or some areas on the screen of the display 730.

Further, the controller 710 may grasp an electronic device use situation. The electronic device use situation is about a current operation situation of the electronic device and may refer to execution of the program, application, or function of the electronic device.

When executing a certain function of the electronic device 700, the controller 710 may control a movement of the display 730 coupled to the rotation member of the electronic device 700. When receiving input information from an external object, the controller 710 may track a location of the external object having made the input information and move the display 730 in a direction (e.g., a first direction) in which the external object is located. In this case, the controller 710 may transfer control signals to internal driving members (for example, the first and second rotation modules 222 and 223 and rotator 224 of FIG. 2A) to be driven in a first direction, so as to control the driving of the driving members. The input information may be information for initiating an interaction with an external object, and may include voice information of the external object (for example, a user), input information from the external object through a button or a touch pad, detection information of a particular motion of the external object, and information received through an external network.

When receiving the input information for initiating the interaction with the external object, the controller 710 may analyze the received input information, select an application executable in the electronic device corresponding to the analyzed input information as an interaction means, and execute the selected application. Further, the controller 710 may configure an initial screen of the executed application and display the configured initial screen on the display. Then, the controller 710 may make a control to output a notification for informing of a preparation for the interaction in the form of audio information through the audio module 790. Further, before or after the application is executed or simultaneously with the execution of the application, the controller 710 may determine a location where the input information is received through at least one sensor and drive the rotation member (for example, the rotation member 230 of FIGS. 2A to 2F) to the determined location, so as to control the display 730 to move in the first direction of the determined location.

If the display 730 moves in a first direction, the controller 710 may identify an external object located in the first direction through at least one sensor. According to various embodiments of the present disclosure, the electronic device may receive information on a user's facial image detected by the image recognition module 760 (for example, a camera 761) (for example, the sensor module 250 of FIG. 2B), extract registered information corresponding to the received information on the facial image, and compare the extracted registered information and the received information on the facial image, so as to recognize the user. The electronic device may identify the external object through at least one of a user's facial recognition, fingerprint recognition, iris recognition, authentication information (for example, a password) authorization, and voice recognition.

Further, after moving in the first direction, the controller 710 may recognize, for example, a user's face in order to identify the user and control internal driving members to rotate the rotation member in an up or down direction with respect to the horizontal axis (for example, A2 of FIG. 2A) of the rotation member, so as to move the display coupled to the rotation member in the recognized direction (e.g., a second direction).

The controller 710 may provide at least one function related to the external object identified by the electronic device.

According to various embodiments of the present disclosure, if a plurality of users are recognized in the first direction in which the display 730 has moved, the controller 710 may identify at least one of the plurality of users and provide information related to the identified user.

Further, according to various embodiments of the present disclosure, if input information corresponds to a control instruction of a surrounding device, the controller 710 may determine the surrounding device corresponding to the control instruction and display an object for the determined surrounding device on the moved display 730 such that the object faces the user. Then, the controller 710 may transmit the control instruction to the surrounding device.

According to various embodiments of the present disclosure, the controller 710 may measure a distance from the identified user. If the measured distance value is greater than or equal to a threshold value, the controller 710 may determine that the distance from the identified external object is long and provide information related to a first function to allow the user to intuitively recognize the object displayed on the display 730 from far away. For example, the object displayed on the display 730 may be provided as an image type object or audio information, and, if the object corresponds to characters, the displayed characters may be enlarged and displayed according to the function. If the distance between the user and the electronic device is greater than or equal to a predetermined distance, a physical input by the user is not possible. Accordingly, in the first function, only an input through a gesture or a voice may be activated and, for example, a touch pad may be deactivated.

Further, the controller 710 may determine that the distance from the identified external object is short and provide an object 2013 for a second function on a display 2010. For example, the controller 710 may make a control to also display objects, which should be displayed to be small, on the display 730. The controller 710 may configure a screen to include an object through which the user can directly control a physical instruction rather than a voice instruction and make a control to display the configured screen. The second function may be a function capable of the physical input by the user. When objects provided according to an operation of an executed application are configured by a plurality of pages, the controller 710 may make a control to sequentially or non-sequentially display the plurality of pages on the display 730. The plurality of pages may be displayed according to a control of the controller 710 such that a screen switching effect is made by at least one of a predetermined time, a user's gesture or voice information, and information detected through at least one sensor.

According to various embodiments of the present disclosure, if a notification event is generated during an operation of a particular application or in an idle state, the controller 710 may analyze received information according to the notification event, determine a corresponding user, track a location of the determined user, and move the display 730 in a direction (for example, first direction) in which the user is located. Further, when receiving a response message from the user identified in the first direction through an interaction according to the notification event, the controller 710 may make a control to transmit the received response message to a counterpart transmitting information on the notification event.

In addition, the controller 710 may receive and process information input for the interaction through at least one physical button or a touch pad located in an upper area of the rotation member in the idle state. If the controller 710 attempts the interaction through the physical button or the touch pad, the electronic device may detect proximity of a user's body through at least one sensor and controls an area, in which the physical input can be made, to be moved in a direction to face the user such that a user input is possible.

According to various embodiments of the present disclosure, the controller 710 may include at least one of an AP, a CP, a graphic processor (GP), a multi-chip package (MCP), and an image processor (IP) in order to drive the electronic device and process for service provision.

According to various embodiments of the present disclosure, the controller 710 may a control to move the rotation member to make not only the display 730 but also at least one sensor for sensing an image, at least one microphone 751 for acquiring a voice, a mechanical eye structure, or at least one hardware/software (H/W) or mechanical structure face the identified user in a direction of the interaction with the user. Further, if there is no direction distinguishment, the controller 710 may make a control to provide information through a light or a temporary mechanical change. Accordingly, the user can intuitively identify information.

According to various embodiments of the present disclosure, if it is determined that the received input information is to set instruction information, the controller 710 may execute an application for setting the instruction information. Then, the controller 710 may control the display 730 to face a first direction by controlling a movement of the rotation member, and identify the external object in the first direction. Further, in order to set the instruction information, the controller 710 may set an operation condition related to the identified external object and at least one operation control function and provide information related to the set operation condition and at least one operation control function as the instruction information of the identified external object.

When receiving voice information from the identified external object as interaction information, the controller 710 may extract a word related to a condition from the received voice information through a voice analysis algorithm and acquire a conditional sentence including the extracted word, or may extract a word related to the control and acquire a control sentence including extracted word. The controller 710 may set the operation condition based on the acquired conditional sentence or set the operation control function based on the acquired control sentence.

Further, in connection with the identified external object, the controller 710 may collect context information through context awareness and set the operation condition and the operation control function based on the collected context information. The controller 710 may generate conditional objects for setting the operation condition or generate objects related to the function for setting the operation control function based on the collected context information. The context information may refer to all pieces of information that can be used at a time point of the interaction with the user and may include information related to a person, a location of an object, an identification, an action, and a state. Further, the context information may refer to information that defines features of a situation such as a person, a place, an object, an entity, or a time influencing an interaction between a user, another user, a system, and an application of a device. More specifically, the context information may include computing context including a network connection state, a communication bandwidth, a printer, a display, and workstation, user context including a user profile, a user location, surrounding people, physical context including a lighting, a noise level, a traffic state, and a temperature, and time context including a time, a week, a month, and a season. Such context information may be grasped and collected by the system through various sensing devices and applications and used for providing various application services or may be grouped with other context information and used for inference to acquire a third result.

The controller 710 may display the generated conditional objects or the generated objects related to the function on the display so that the user can select the objects. The controller 710 may select at least one conditional object from the conditional objects displayed on the display and set a condition indicated by the selected conditional object as the operation condition. Further, the controller 710 may select at least one object from the objects related to the function displayed on the display and set a function indicated by the selected object as the operation control function. When selecting the displayed object, the controller 710 may select the displayed conditional object or the displayed object related to the function corresponding to a selection input detected through at least one sensor as the object for setting the operation condition or the operation control function. The conditional objects or the objects related to the function may be displayed in a list form in an area of the display 730 toward a first direction to face the external object. Further, the conditional objects or the objects related to the function may be moved and displayed from the set area of the display 730 to the area of the display 730 in the first direction facing the external object.

The controller 710 may configure integrated instruction information by linking the set operation condition and at least one operation control function and control the memory 740 to store the configured instruction information as the instruction information of the external object. The controller 710 may generate a card type image, a graphic element, or an object (e.g., an instruction card) including the instruction information to allow the user to intuitively identify the configured instruction information and control the memory 740 to store the generated instruction card as the instruction information of the external object. The controller 710 may display the generated instruction card on the display 730 or output the generated instruction card in the form of voice information through the audio module 790.

In connection with the set operation condition or the set operation control function, the controller 710 may search for at least one instruction card stored in the memory 740 and display the found instruction card on the display 730. The controller 710 may update instruction information included in the found instruction card based on the set operation condition or the set operation control function. If the number of found instruction cards is one or more, the controller 710 may configure the found instruction cards in a list form or a form of turning of the page, and display the configured instruction cards on the display 730.

The controller 710 may configure integrated instruction information by linking the set operation condition and at least one operation control function and generate an instruction card (hereinafter, referred to as a first instruction card) made in a card form from the configured instruction information. The controller 710 may search for at least one instruction card (e.g., a second instruction card) previously generated in the identified external object, combine the generated first instruction card and the found second instruction card to configure new instruction information of the identified external object, and generate a new third instruction card made in a card form from the new configured instruction information. When searching for the second instruction card, the electronic device may search for the second instruction card including information that is the same as or similar to at least one of the operation condition and the operation control function included in the first instruction card.

If the set operation condition is met, the controller 710 may execute at least one set operation control function according to the set operation condition. Before executing the operation control function, the controller 710 may grasp a current location of the external object, and, if it is determined that the external object is not located in an adjacent area, may limit the execution of the set operation control function to make the set operation control function not executed.

Further, the controller 710 may be at least the part of the processor, and may include, for example, a combination of one or more of hardware, software, firmware. The controller 710 may omit at least the part of the above elements or may further include another element for executing the function of the electronic device.

According to various embodiments of the present disclosure, at least some elements of the controller 710 of the electronic device 200 may include, in hardware, at least some of at least one processor including a CPU/micro processing unit (MPU), a memory (for example, a register and/or a random access memory (RAM)) to which at least one piece of memory loading data is loaded, and a bus for inputting/outputting at least one piece of data to the processor and the memory. Further, the processor 120 may include, in software, a predetermined program routine or program data which is loaded to the memory from a predetermined recording medium to perform a function defined in the electronic device and operation-processed by the processor.

According to various embodiments of the present disclosure, the display 730 (for example, similar to or the same as a partial configuration of the input/output interface 150 or the display 160 of FIG. 1, the display 240 of FIG. 2B, the display 611 of FIG. 6A, or the display 612 of FIG. 6B) of the electronic device may output information (for example, an object or a graphic element of at least one of a text, an image, and a video) related to an operation execution result according to a control of the controller 710.

The display 730 may display an input pad (for example, buttons) through which at least one of various characters, numbers, or figures can be input into an input box on the screen in various methods. Further, the display 730 may display a service execution screen according to an execution of various applications related to information transmission/reception.

The display 730 may be configured by a bendable display panel (for example, a flexible display). Further, if the display 730 is implemented in a touch screen type, the display 730 may correspond to a touch screen of the input device 750. If the display 730 is implemented together with the input device 750 in the touch screen type, the display 730 may display various pieces of information created according to a user's touch action.

The display 730 may be configured in the form, for example, illustrated in FIGS. 6A to 6C, and a display panel may be installed in an entire or partial area on the surface of the rotation member depending on a shape of the rotation member. Accordingly, the display 730 may move in an up/down or a left/right direction according to the rotation of the rotation member by driving members within the rotation member (for example, the rotation member 230 of FIGS. 2A to 2F) according to a control of the controller 710.

The display 730 may move in accordance with a movement of the rotation member such that a main area of the display 730 faces a first direction in which the external object is located according to a control of the controller 710. The display 730 may move again to face a second direction in which the main area of the display faces the identified external object and display graphic elements or objects for information related to the identified user.

According to a control of the controller 710, the display 730 may display current time information, graphic elements according to the time, and weather information on an idle screen in an idle state. The display 730 may change and display relevant graphic elements according to the lapse of time.

When the electronic device 700 switches from the idle state to an active state to perform an interaction as input information for initiating the interaction is received, the display 730 may display the switching to the active state, the input information, or an object related to a particular application executed based on the input information in the main area. Further, as a direction in which the main area faces changes according to the movement of the rotation member, the display 730 may display objects to create an effect as if the objects displayed in the main area moves in the movement direction. According to various embodiments of the present disclosure, if the electronic device does not include the rotation member or does not move by the rotation member, that is, if the display 730 is not movable, the display 730 may move and display objects to be displayed in an area facing the direction in which the identified external object is located.

The display 730 may display objects according to the performance of the interaction with the identified external object by an interaction means. Further, the display 730 may display objects related to the set operation condition and the set operation control function by the controller 710 and display instruction cards generated based on the set operation condition and the set operation control function or at least one found instruction card.

According to various embodiments, the display 730 of the electronic device may be configured by at least one of a LCD, a thin film transistor LCD (TFT-LCD), an OLED, LED, active matrix OLED (AMOLED), a flexible display, and a 3 dimensional display. Some of the displays may be implemented in a transparent type or a light transmission type so that the outside can be seen therethrough. The display may be implemented in a transparent display form including transparent OLED (TOLED).

According to various embodiments of the present disclosure, the electronic device 700 may further include another installed display (for example, an extendable display or a flexible display) other than the display 730 or a display of external another electronic device (for example, at least one of an external display device, a wearable device, and an external terminal device) linked to the electronic device. The further included display may perform an operation that is the same as or similar to that of the display 730.

According to various embodiments of the present disclosure, the communication module 720 (for example, the communication interface 170 of FIG. 1) of the electronic device may communicate with the electronic device 102 or 104 or the server 106 of FIG. 1 according to a control of the controller 710. The communication module 720 may transmit and receive data related to the executed operation to and from an external device according to a control of the controller 710. Through the communication interface, the communication module 720 may perform communicate through a network connection or a connection between devices using wireless communication or wired communication. The wireless communication may include at least one of, for example, Wi-Fi, Bluetooth (BT), ZigBee, z-wave, NFC, GPS and cellular communication (for example, LTE, LTE-A, CDMA, WCDMA, UMTS, WiBro, GSM or the like). The wired communication may include at least one of, for example, a USB, an HDMI, an RS-232, a POTS, a universal asynchronous receiver transmitter (UART), an inter-integrated circuit (I2C), a serial peripheral interface (SPI), and a controller area network (CAN). In addition to the above listed communication schemes, the communication module 730 may include all types of communication schemes that have been widely known or will be developed in the future.

The communication module 720 may transmit and receive information according to the performance of the interaction between external electronic devices connected through, for example, a home network. Further, the communication module 720 may transmit a control signal for controlling, for example, a surrounding home device within home to an external electronic device according to an instruction input through the interaction with the external object. In addition, the communication module 720 may be connected through various communication networks and may receive context information for configuring instruction information from external electronic devices.

According to various embodiments of the present disclosure, the memory 740 (for example, the same as or similar to the memory 130 of FIG. 1) of the electronic device may store various pieces of data generated during execution of programs including a program required for a function operation according to various embodiments. The memory 740 may largely include a program area and a data area. The program area may store pieces of information related to driving of the electronic device such as an OS that boots the electronic device. The data area may store transmitted/received data or generated data. Further, the memory 740 may include at least one storage medium of a flash memory, a hard disk, a multimedia card micro type memory (for example, an secure digital (SD) or extreme digital (XD) memory), a RAM, and a read only memory (ROM).

The memory 740 may store information related to applications executed in the electronic device 700, relevant information for identifying an external object, information related to behaviors of an external object collected by the behavior module 780, or context information. In addition, the memory 740 may store various pieces of information required for performing various embodiments of the present disclosure.

The memory 740 may store information according to the interaction with the identified external object. Further, the memory 740 may store information (for example, an operation condition card or an operation control function card) related to a set operation condition or a set operation control function and instruction information configured based on the set operation condition and the set operation control function. In addition, the memory 740 may store the instruction card made in a card form from the instruction information.

The input unit 750 (for example, the input/output interface 150 of FIG. 1) of the electronic device may transfer, to the controller 710, various pieces of information such as number and character information input from the user, various function settings, and signals which are input in connection with a control of functions of the electronic device. Further, the input device 750 may support a user input for executing modules or applications that support a particular function. The input device 750 may include at least one of a key input means such as a keyboard or a keypad, a touch input means such as a touch sensor or a touch pad, a sound input means, a camera, and various sensors, and also include a gesture input means. In addition, the input device 750 may include all types of input means that are being developed currently or will be developed in the future. The input device 750 may receive information from the user through the touch panel of the display 730 and transfer the input information to the controller 710.

The input device 750 may transfer information related to a user's gesture received through the camera 761 of the image recognition module 760 or the sensor module 770 including various sensors to the controller 710. Further, the input device 750 may transfer an input signal according to a selection of at least one object (for example, content) displayed on the screen to the controller 710.

The input device 750 may receive an input signal from an external object (a user or an object) through a sound input means, that is, the audio module 790 and transfer the received signal to the controller 710.

The input device 750 may include at least one of the image recognition module 760 including the camera 761, the sensor module 770 including various sensors, the microphone 751, and the interface 703 according to a configuration of the electronic device.

The electronic device may include the audio module 790 (for example, the same as or similar to the input/output interface 150 of FIG. 1 or the speaker 270 of FIG. 2A). The audio module 790 may output a sound and may include, for example, at least one of an audio codec, a microphone (MIC), a receiver, an earphone output (e.g., EAR_L), and a speaker. The audio module 790 may output audio information generated according to execution of a currently executed application, and may output audio information in a mute mode, a speaker mode, or an earphone mode according to each function of the executed application. Further, if the executed application executes a function corresponding to a modified form of the display 730, the audio module 790 may output audio information related to the executed function. For example, if a function currently corresponding to a modification type of the modified form of the display 730 is a speaker function, the audio module 790 may operate the speaker and output audio information through the speaker according to a control of the controller 710. If the audio module 790 has executed the speaker function and then the earphone mode or the mute mode is executed in accordance with the modified type, the audio module 790 may block or turn down the audio output made through the speaker or output the audio signal through earphones.

The electronic device may further include a means for outputting vibration or a means for outputting smell, and, if an executed application performs a function corresponding to a modified form of the display 730, the means for outputting vibration or smell may output information related to the performed function through vibration or smell.

Certain elements of the electronic device have been described through the electronic device of FIG. 7. However, not all the elements illustrated in FIG. 7 are necessary elements in various embodiments of the present disclosure. The electronic device may be implemented by more elements or less elements than illustrated in FIG. 7. Further, locations of the main elements of the electronic device described through FIG. 7 may be changed according to various embodiments. The electronic device of FIG. 2 may be driven according to the hardware configuration of FIGS. 2A to 2F, control the movement of the display 730 by rotating the rotation member by the driving of the electronic device as illustrated in FIG. 3, 4A, 4B, 5A, or 5B, provide a relevant function through the interaction with the identified external object according to the rotation of the rotation member, and control displaying of the object in accordance with the movement of the display 730 coupled to the rotation member.

The electronic device (the electronic device 101 of FIG. 1 or the electronic device 700 of FIG. 7) may analyze received voice information through various voice analysis algorithms. Further, the electronic device may acquire text through a result of the performance of voice recognition and may perform natural language understanding (NLU)/dialog management (DM) based on the text as a query. The electronic device may recognize the text as a sentence through the NLU and the DM. The electronic device may output a voice response (sound response) to the identified external object based on at least one language model. Accordingly, the electronic device may provide a dynamic result to the interacting external object (for example, user) according to a relation between at least one external object or a content to be delivered. The electronic device may determine various language models according to the identified external object. For example, if the relation with the identified external object is set as friendship by a pre-setting or learning, a language model for constructing words and sentences indicating intimacy may be selected, and an acoustic model having a rapid clear ton feature may be selected for an emergency message and converted into a language according to the message to be transferred to the external object. The electronic device may modulate a high frequency band voice into an acoustic model of a low frequency band voice based on information indicating the external object is weak at listening to the high frequency band voice and output the modulated voice.

The electronic device may analyze input information through a voice analysis algorithm in an idle state, determine an interaction means according to a result of the analysis, and execute an application related to the determined interaction means. If voice information is input as interaction information input by the interaction with the external object while the application is executed, the electronic device may analyze the input voice information through the voice analysis algorithm and provide a corresponding function according to a result of the analysis. Further, the electronic device may analyze voice information input by the interaction with the identified external object through the voice analysis algorithm while, for example, an instruction card application is executed, and recognize a sentence for setting an operation condition and an operation control function included in instruction information based on the analyzed voice information.

The controller of the electronic device (for example, the electronic device 101 of FIG. 1 or the electronic device 700 of FIG. 7) may correspond to a hardware module or a software module (for example, an application program) and may be a hardware component (e.g., a function) or a software element (e.g., a program) including at least one of various sensors included in the electronic device, a data measurement module, an input/output interface, a module for managing a state of the electronic device or an environment, and a communication module.

Figure 8:
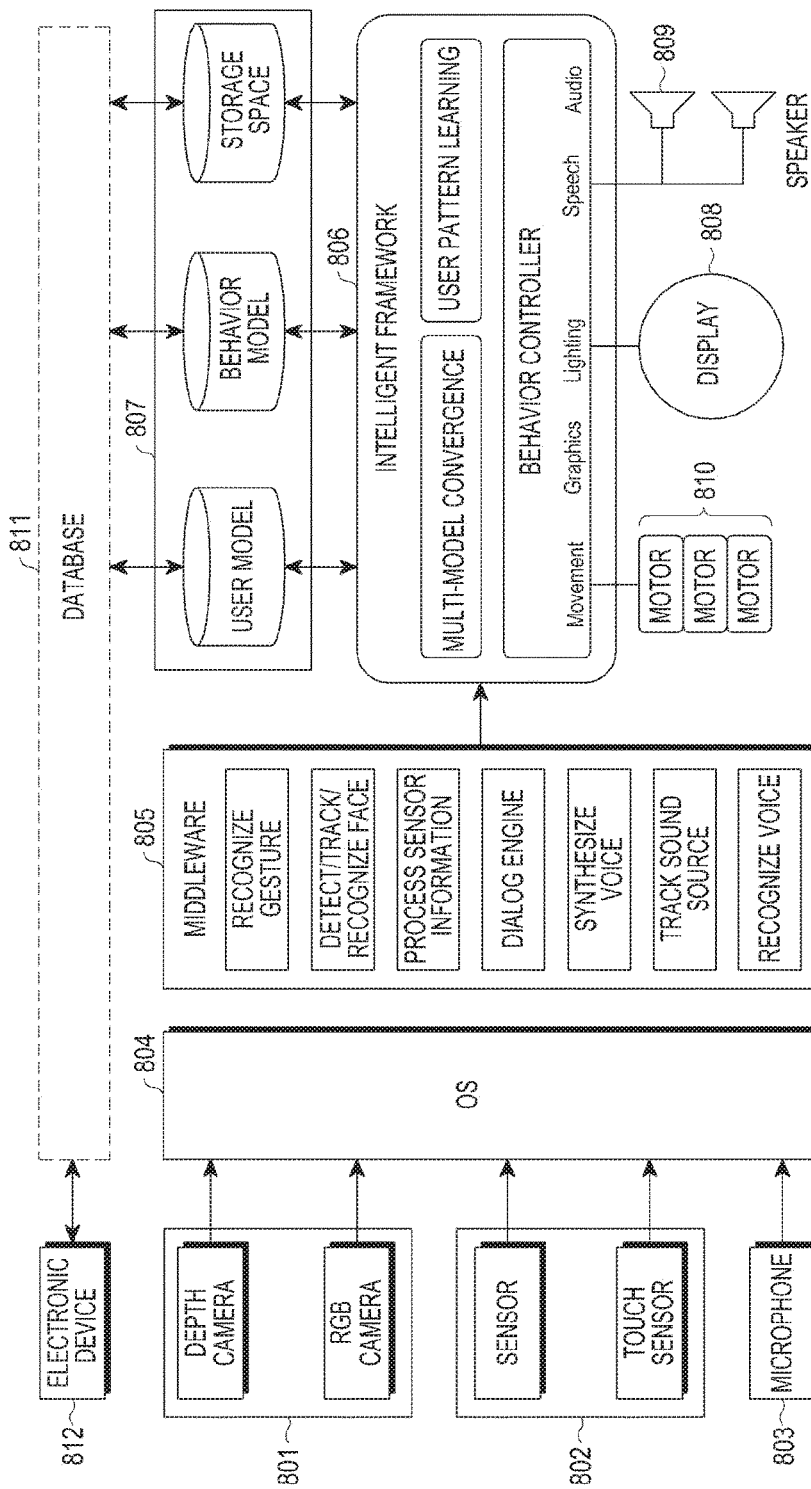
FIG. 8 is an electronic device according to an embodiment of the present disclosure.

FIG. 8 is an electronic device according to an embodiment of the present disclosure.

The controller of the electronic device may correspond to a hardware module or a software module (for example, an application program) and may be a hardware component (e.g., a function) or a software element (e.g., a program) including at least one of various sensors included in the electronic device, a data measurement module, an input/output interface, a module for managing a state of the electronic device or an environment, and a communication module. The hardware component (e.g., a function) or the software element (e.g., a program) may be added or deleted according to a configuration of the electronic device and a hardware configuration (e.g., a function).

Referring to FIG. 8, an OS (e.g., S/W) 804 of the electronic device may serve as a general operating system such as electronic device resource distribution and job scheduling process processing and also control various H/W devices (a camera 801, a sensor 802, and a microphone 803). Further, the OS 804 may serve to process signals input into the H/W devices.

A middleware 805 may detect a user's face location based on the signal-processed data and serve to perform an authentication through face recognition, recognize a user's 3D gesture, track an input location of an audio signal (direct of arrival (DOA)) (e.g., track a sound source), recognize a voice, synthesize voices, a dialog engine for processing a dialog (e.g., an interaction), or process sensing information detected through at least one sensor.

An intelligent framework 806 may perform a multimodal convergence function, a user pattern learning function, and a behavior control function. The multimodal convergence function may correspond to collecting and managing various types of information processed by the middleware 805. The user pattern learning function may correspond to extracting and learning useful information such as a user's life pattern or preference based on multimodal convergence module information. The behavior control function may correspond to expressing information which the electronic device feeds back to the user through a movement of the electronic device, graphics (e.g., UI/UX), lighting, a voice response (e.g., speech), and a sound (e.g., audio). Further, the intelligent framework may include a program operating as a part of a kernel for controlling a motor 810, a display 808, or a speaker 809 corresponding to a hardware element and may perform a relevant function based on data transmitted and received through the motor 810, the display 808, or the speaker 809.

The electronic device may include a memory 807 including a user model database (DB) for storing information learned by the intelligent framework 806 according to a user, a behavior model DB for controlling a behavior of the electronic device, and a storage space for storing other information. The DBs included in the memory 807 may be stored or shared through a network cloud database 811.

An electronic device may include a rotation support member, a support member configured to support the rotation support member, a rotation member movably coupled to the rotation support member, a display movably coupled to a surface of the rotation member, a driving module configured to drive the display, a memory, and a processor. The processor may control, if input information is received, driving of the rotation member to make the display corresponding to the received input information face a first direction, control, if the display moves to face the first direction, the driving of the rotation member to face a second direction for identifying an external object, identify, if the display is located to face the external object in the second direction, the external object, and display information on at least one function executed in connection with the identified external object on the display.

If the display moves in the first direction or the second direction in accordance with the driving of the rotation member in a state where previous information displayed in connection with the external object exists on the display, the processor may change a display location of at least one object for the previous information such that the at least one object for the displayed previous information is moved and displayed in a set direction according to the movement of the display, and, if the movement of the display stops, change the display location of the at least one object to an original location.

If the display moves in a third direction after the information on the executed function is displayed on the display, the processor may change the display location of the at least one object such that the at least one object for the information on the executed function is moved and displayed in a set direction according to the movement of the display in the third direction, and, if the movement of the display stops, change the display location of the at least one object to an original location.

If the function related to the identified external object is executed, the processor may collect information related to the executed function from surrounding electronic devices and provide information corresponding to context or interest of the external object based on the collected information.

If the input information corresponds to a control instruction, the processor may execute an application for the control instruction and transmit control information for controlling a surrounding electronic device corresponding to the control instruction to the surrounding electronic device through the executed application.

The processor may measure a distance from the identified external object, execute another function related to the identified external object according to a value of the measured distance, and display information on the executed function on the display.

If a notification event is generated while the function related to the external object is provided, the processor may determine a target external object of the notification event and controls driving of the rotation member to make the display face a direction in which the determined target external object is located, and, if response information is received from the target external object, provide information on an executed function corresponding to the received response information.

If the information on the at least one function includes a plurality of pages and the display moves in a requested direction according to a request for switching a displayed page, the processor may change a display location of a first page to make the first page displayed on the display disappear in the requested direction, and, if the display returns to an initial direction, change a display location of a second page to make the second page appear on the display from a direction opposite to the requested direction.

An electronic device according to one of the various embodiments of the present disclosure may include a rotation support member, a support member configured to support the rotation support member, a rotation member rotatably coupled to a surface of the rotation support member, first and second rotation modules included within the rotation support member and configured to rotate the rotation member in first and second directions, a display located on a surface of the rotation member, a driving module configured to drive the display, a memory, and a processor. The processor may control, if input information is received, rotation of the rotation member to make the display (e.g., a screen of the display) corresponding to the received input information rotates in the first and second directions, identify an external object located in the first and second directions through at least one sensor, and provide at least one function related to the identified external object.

The support member may include a first case having a speaker therein, and a second case having at least one discharge hole for discharging a sound of the speaker below the first case.

The support member may include a body comprising first and second housings, a first rotation module located within the body and configured to have a first driver and to rotate the rotation member in the first direction by the first driver, a second rotation module located within the body and configured to have a second driver and to rotate the rotation member in the second direction by the second driver, a rotate located with the body and coupled to the rotation member to rotate along with the rotation member, and at least one coupling piece located between the rotation member and the rotate and configured to couple the rotation member and the rotate.

The first rotation module may include the first driver located below the rotate and a second gear located on a bottom surface of the rotate and configured to engage with a first gear located on the first driver and to rotate the rotate and also rotate the rotation member in the first direction by transferring torque of the first driver to the rotate.

The second rotation module may include the second driver located on the rotate and a second gear located on a side surface of the rotate and configured to engage with a first gear located on the second driver and to rotate the rotate and also rotate the rotation member in the second direction by transferring torque of the second driver to the rotate.

The rotation member may include a first bracket having the display, a second bracket coupled to the first bracket, a first cover located on a surface of the first bracket and configured to have at least one sensor and an opening for exposing the display to the outside, and a second cover located on a surface of the second bracket and connected to the first cover. The display and the first cover may be located on a first surface of the first bracket, and a second surface opposite to the first surface of the first bracket may face and be rotatably coupled to the a surface of the rotation support member, and the second cover may located on a first surface of the second bracket, and a second surface opposite to the first surface of the second bracket may face and be rotatably coupled to the surface of the rotation support member.

The rotation member may include a ring rotation member.

A material of the first and second covers may include one of glass, transparent acryl, polyethylene, polyethylene terephthalate, and polycarbonate.

An electronic device according to one of the various embodiments of the present disclosure may include a rotation member, a rotation support member configured to support the rotation member, a body including a driving module for moving the rotation member, a display coupled to a surface of the rotation member, a processor configured to control the driving module to move the rotation member, and a memory configured to store instructions if being executed by the processor, wherein the processor may control a movement of the rotation member to make the display (a screen of the display) face a first direction in which an external object is located, identify the external object located in the first direction through at least one sensor, set an operation condition related to the identified external object and at least one operation control function related to the operation condition based on information received according to performance of an interaction with the identified external object, and provide information related to the set operation condition and the at least one set operation control function.

If the set operation condition is met, the processor may execute the at least one set operation control function related to the set operation condition.

If the display moves to face the first direction, the processor may control the movement of the rotation member again to face a second direction for identifying the external object, and, if the display faces the second direction, identify the external object facing the display through at least one sensor.

According to various embodiments of the present disclosure, the processor may configure integrated instruction information by linking the set operation condition and the at least one set operation control function, generate an instruction card including the configured instruction information in a card form, and display the generated instruction card on the display.

According to various embodiments of the present disclosure, if voice information is received from the identified external object, the processor may acquire a conditional sentence including a word related to a condition from the received voice information, set the operation condition based on the acquired conditional sentence, acquire a control sentence including a word related to a control from the received voice information, and set the at least one operation control function based on the acquired control sentence.

According to various embodiments of the present disclosure, in connection with the identified external object, the processor may generate conditional objects for setting the operation condition or objects related to a function for setting the operation control function based on context information collected through context recognition and display the generated conditional objects or the objects related to the function on the display.

According to various embodiments of the present disclosure, the processor may select at least one conditional object from the conditional objects for setting the operation condition displayed on the display and set a condition indicated by the selected conditional object as the operation condition.

According to various embodiments of the present disclosure, the processor may select at least one object from the objects related to the function for setting the operation control function displayed on the display and set a function indicated by the selected object as the operation control function.

According to various embodiments of the present disclosure, the processor may search for at least one instruction card related to the set operation condition or the set operation control function and update the found instruction card based on the set operation condition or the set operation control function.

According to various embodiments of the present disclosure, before executing the operation control function, the processor may grasp a current location of the external object, and, if the external object is not located in an adjacent area, limit the execution of the set operation control function. The set operation control function may include a function for controlling an operation of at least one external electronic device located around the electronic device or an operation for at least one application executed in the electronic device.

A method of providing information in the electronic device described above will be described in detail with reference to the accompanying drawings.

Figure 9:
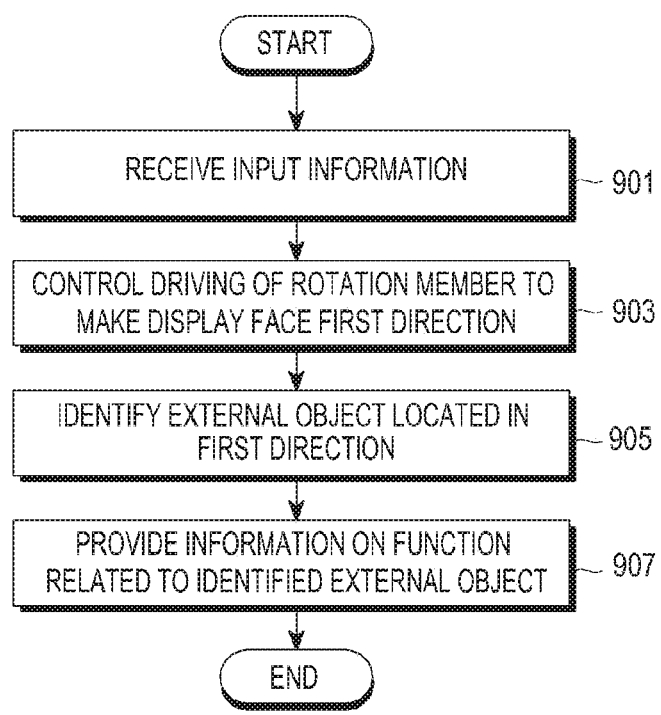
FIG. 9 is a flowchart of a method of an electronic device according to an embodiment of the present disclosure.

FIG. 9 is a flowchart of a method of an electronic device according to an embodiment of the present disclosure.

Referring to FIG. 9, the electronic device (for example, the electronic device 101 of FIG. 1, the electronic device 200 of FIGS. 2A to 2F, or the electronic device 700 of FIG. 7) may receive input information for initiating an interaction with the user in step 901. The input information may include voice information of an external object (for example, user), information input from the external object through a button or a touch pad, detection information of a particular motion of the external object, and information received through an external network. According to various embodiments of the present disclosure, the electronic device may receive the input information from at least one sensor or a microphone installed in at least one part of the support member (for example, the support member 210 of FIGS. 2A to 2F), the rotation support member (for example, the rotation support member 220 of FIGS. 2A to 2F), or the rotation member (for example, the rotation member 230 of FIGS. 2A to 2F).

If the electronic device receives the input information, the electronic device may determine a direction in which the input information is received based on the received input information and control driving of the rotation member (for example, the rotation member 230 of FIGS. 2A to 2F) coupled to the display (for example, the display 160 of FIG. 1, the display 240 of FIGS. 2A and 2B, the displays 611 and 612 of FIGS. 6A to 6C, or the display 730 of FIG. 7) such that the display faces the determined direction (for example, first direction) in step 903. According to various embodiments of the present disclosure, if the received input information corresponds to information received through the microphone, the electronic device may determine a direction in which a voice is input through an array of a plurality of microphones and control driving of the rotation member such that the display moves in the determined direction (for example, first direction). Further, the electronic device may control the display to rotate in left and right directions with respect to the vertical axis (for example, A1 of FIGS. 2A to 2F) of the rotation member so that the display can receive a 360 degree image as the input information and, if the rotation member can rotate 360 degrees, control the rotation member to rotate 360 degrees. In this case, the electronic device may analyze the 360 degree image and identify the external object in step 905.

In step 905, the electronic device may identify the external object located in the first direction based on a result of the analysis of the received input information or information detected through at least one sensor. According to various embodiments, the electronic device may receive a user's face image photographed by the image recognition module (for example, camera), pre-register a result of analysis of the received face image, and compare the stored registered information of the external object and the user's face image, so as to identify the user. The electronic device may identify the external object through at least one of a user's face recognition, fingerprint recognition, iris recognition, authentication information (for example, password) authorization, and voice recognition.

In step 907, the electronic device may provide at least one function related to the identified external object. Here, a detailed description of at least one function related to the external object is omitted.

Hereinafter, a detailed operation for providing at least one function related to the external object based on an operation procedure of the electronic device of FIG. 9 is described with reference to the drawings described below. The electronic device in the drawings described below may be configured and driven to be the same as or similar to, for example, the electronic device 200 of FIGS. 2A to 2F, the electronic device 700 of FIG. 7, or the electronic device of FIG. 8.

Figure 10:
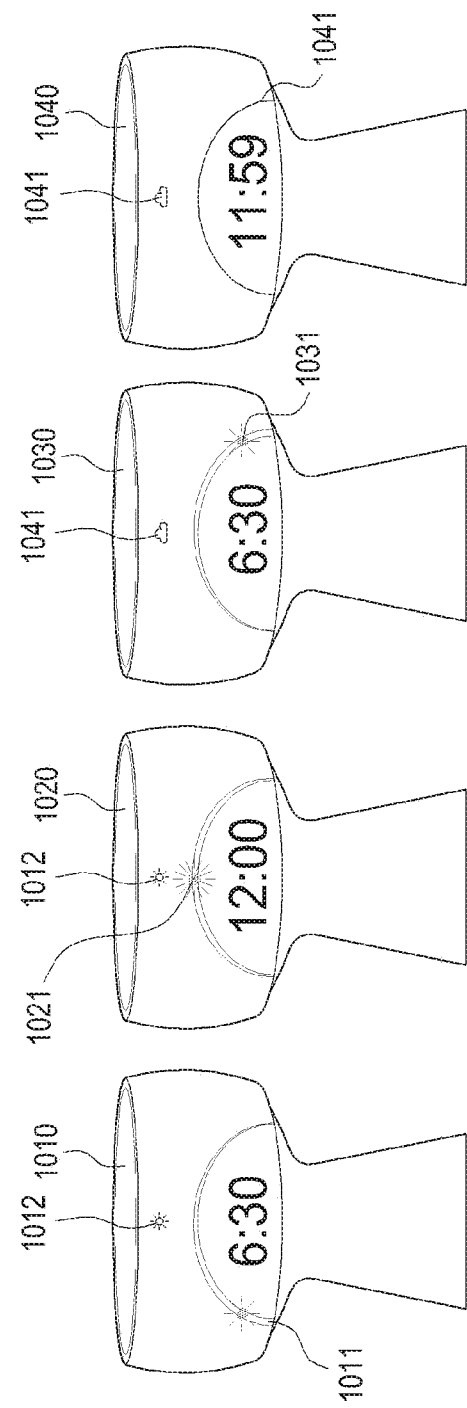
FIG. 10 illustrates an example of a display screen of an electronic device according to an embodiment of the present disclosure.

FIG. 10 illustrates an example of a display screen of an electronic device according to an embodiment of the present disclosure.

As described above, the electronic device may receive input information for initiating the interaction in an idle state (for example, a state where there is no interaction with the external object) in step 901 of FIG. 9. The electronic device may configure an idle screen and display the idle screen on the display in the idle state as illustrated in FIG. 10. The idle state may include an object actively configured according to at least one piece of time information, environment information, sensing information, user's situation information, and setting information.

Referring to FIG. 10, the electronic device may display current time information and graphic elements according to the time on an idle screen 1010, 1020, 1030, or 1040 including the graphic elements according to the time on the display. The electronic device may display, for example, time information (for example, 6:30), a graphic element 1011 (for example, a location of the sun according to the time) related to the time, and weather information related to the time on an idle screen 1010. Thereafter, the relevant graphic element 1021, 1031, 1041 may be changed and displayed according to the lapse of time.

Figure 11A:
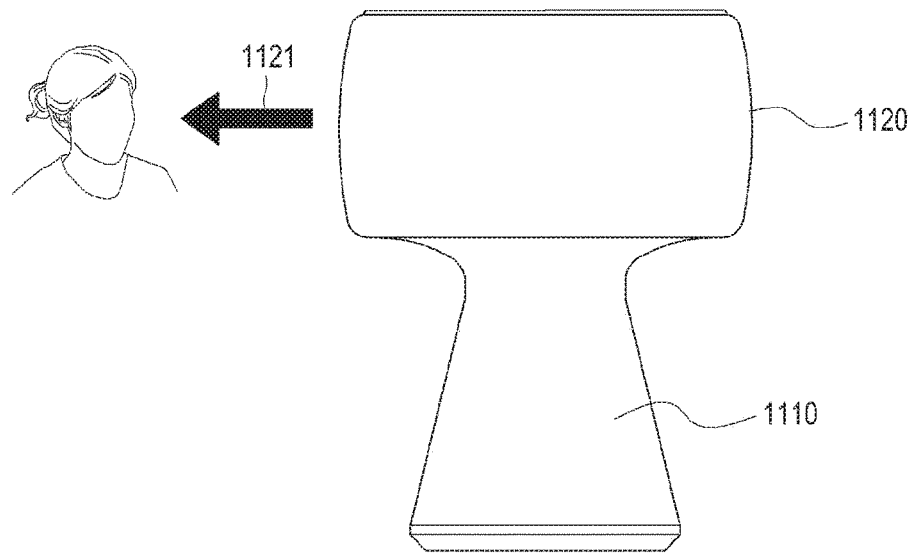
FIGS. 11A and 11B illustrate examples of a movement of a display of an electronic device according to various embodiments of the present disclosure.
Figure 11B:
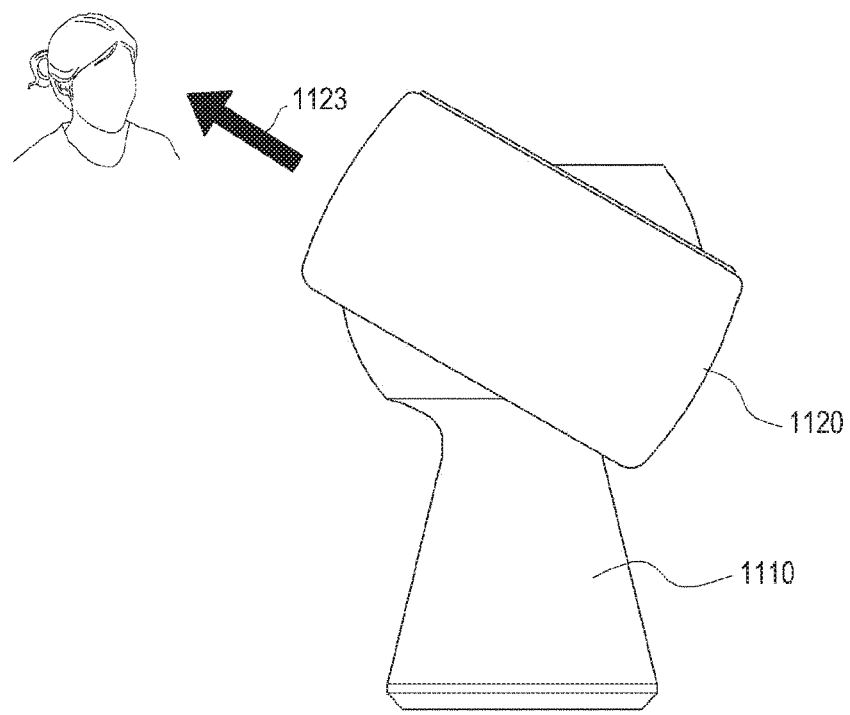

FIGS. 11A and 11B illustrate examples of a movement of a display of an electronic device according to various embodiments of the present disclosure.

The electronic device may identify an external object (for example, a user) through at least one sensor like in steps 903 and 905 of FIG. 9. For example, referring to FIG. 11A, the electronic device may detect a voice of the user corresponding to the external object, identify a location where the detected voice is input, and move a display 1120 coupled to a rotation member by driving members in a first direction 1121 (for example, left or right direction) of the identified location with respect to the vertical axis (for example, A1 of FIG. 2A) of a rotation support member 1110. Further, referring to FIG. 11B, the electronic device may recognize the user located in the first direction and move the rotation member in a direction of a user's face 1123 (for example, second direction corresponding to an up or down direction) with respect to the horizontal axis (for example, A2 of FIG. 2A) of the rotation support member 1110 to recognize the user's face. At this time, the electronic device may analyze an image generated by photographing the user's face and determine whether the analyzed image matches the pre-registered user's registration information, so as to identify the user. Further, the electronic device may control the direction of the rotation support member 1110 such that the display 1120 always faces the user's face.

As described above, although it has been described that the first direction of the user is determined by the voice in the embodiment illustrated in FIG. 11A, the first direction may be determined by vision through which the user can be identified, a sensor through which a user's body can be identified such as a UWB or a heat detection sensor, or various embodiments through which a direction can be estimated.

According to the embodiment illustrated in FIGS. 11A and 11B as described above, the electronic device may move the display coupled to the rotation support member by the driving members in the direction where the external object is located.

Figure 12:
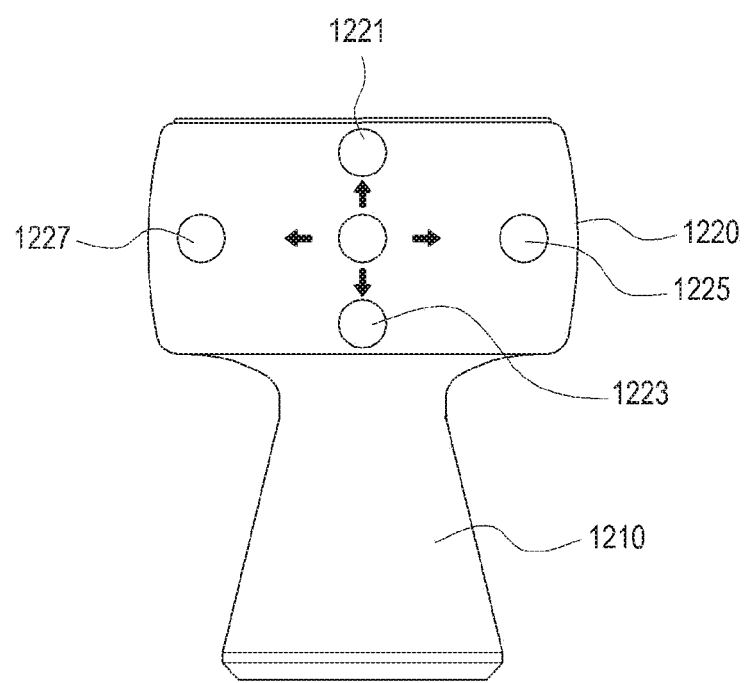
FIG. 12 illustrates an example of a movement of an object displayed on a display of an electronic device according to an embodiment of the present disclosure.

FIG. 12 illustrates an example of a movement of an object displayed on a display of an electronic device according to various embodiments of the present disclosure.

Referring to FIG. 12, according to another embodiment of the present disclosure, if the electronic device does not include driving members for moving the display, the electronic device (for example, the same as or similar to the electronic device 101 of FIG. 1, the electronic device 200 of FIGS. 2A to 2F, or the electronic device 700 of FIG. 7) may move and display an object (for example, an interaction object) displayed in a central area of the display in a direction 1221, 1223, 1227, 1225 (for example, an up, down, left, or right direction) in which the user is recognized to intuitively recognize that the user is currently ready to interact therewith in a state where the display 1220 is omni-directionally prepared. As illustrated in FIG. 12, the display 1220 may be configured to be coupled to the surface of the top of the support member 1210 in such a manner that the display panel circularly surrounds the support member. Accordingly, the electronic device may identify the user's location and move and display the object related to the user in a direction of the identified location. Further, the electronic device may continuously track the user's location according to a movement of the user and change and display the object displayed on the display 1220 in a direction where the user is located. The object changed according to the movement of the user corresponds to an object related to the user and may include all or some objects displayed on the display 1220. According to various embodiments, if objects related to a plurality of users are displayed on the display 1220, the electronic device may move and display each of the related objects in a direction of the identified location of each user. Further, if the electronic device recognizes a plurality of users in the same direction, the electronic device may sequentially provide user-specific information or split a screen area of the display panel in the same direction and provide user-specific information. In addition, if the electronic device desires to perform a multitasking interaction with the identified users, the electronic device may provide information on a plurality of executed functions related to the identified users. In this case, among information on the plurality of functions, the electronic device may move and display an object for information on a first function in a direction corresponding to the location of the identified user and output information on a second function through an audio module. The information on the second function may be displayed originally in a display screen area of an initially displayed location without any movement, and may be moved and displayed in a direction corresponding to the location of the identified user after a predetermined time passes or according to a user's request.

Figure 13:
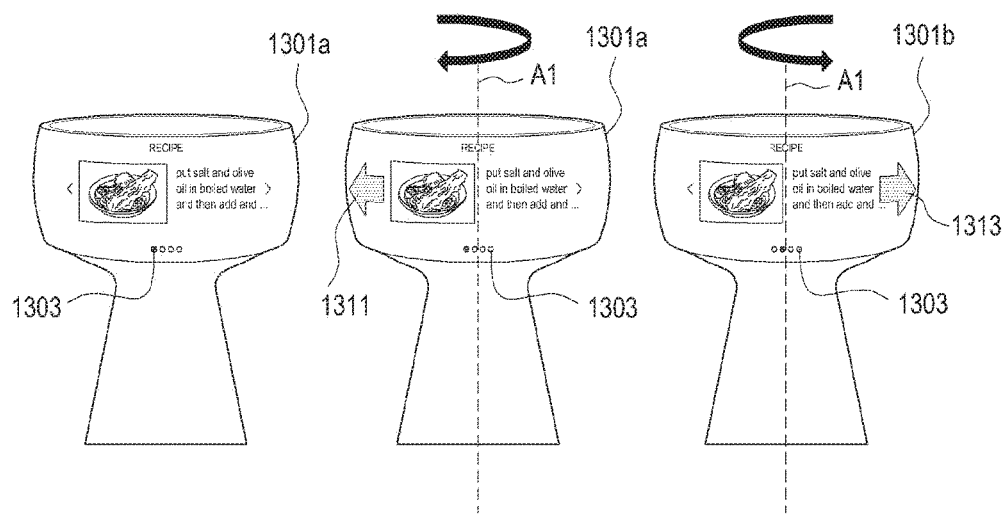
FIG. 13 illustrates an example of a movement of a display of an electronic device according to an embodiment of the present disclosure.

FIG. 13 illustrates an example of a movement of a display of an electronic device according to various embodiments of the present disclosure.

Referring to FIG. 13, according to various embodiments of the present disclosure, if providing information related to the identified external object (for example, user) like in step 907 of FIG. 9, the electronic device (the electronic device 101 of FIG. 1, the electronic device 200 of FIGS. 2A to 2F, or the electronic device 700 of FIG. 7) may configure objects for the provided information by a plurality of pages 1301a and 1301b and display the plurality of configured pages 1301a and 1301b on a display to make a screen switching effect. The electronic device may display an object for the first page 1301a displayed on the display and if the display is rotated in a left direction with respect to the vertical axis A1 according to the interaction with the identified external object, may display, for example, an object 1311 indicating a left movement and then display, for example, objects included in the second page 1301b. Further, if the display is rotated in a right direction with respect to the vertical axis A1, the electronic device may display an object 1313 indicating a right movement of the second page 1301b with respect to the vertical axis. In addition, the electronic device may receive a request for providing information from the user or by a pre-defined condition and, if it is determined that the corresponding information to be provided is configured by a plurality of pages, display information 1303 on the page to be displayed.

The electronic device may display, for example, a food recipe on the display by a user's request. For example, since the food recipe has a large amount of information to be provided, all pieces of information cannot be included in one page and thus the information may be displayed in a chronological order. Accordingly, if providing the corresponding information by the user's request, the electronic device may configure and provide a plurality of sequential pages.

If a corresponding page is switched, the electronic device may intuitively provide the user with a relative context between the second page to be switched and the currently provided first page. Further, the electronic device may display the display screen as if a current display screen disappears in a direction (for example, left direction) in which the display moves. Thereafter, the electronic device may return the display to the initial location by the driving members and then display objects on the second page through an effect (slide in) as if the second page appears from a right direction.

Further, if page switching is required, the electronic device may determine whether to control the driving members to move the display in a left or right direction according to a relation between the current page and the next page to be displayed and control the driving members along with the displayed page switching. If it is determined that a display movement direction is a left direction, the electronic device may simultaneously perform a movement control operation (instruction) of the display and expression of disappearing of the currently displayed page in the determined direction.

Figure 14A:
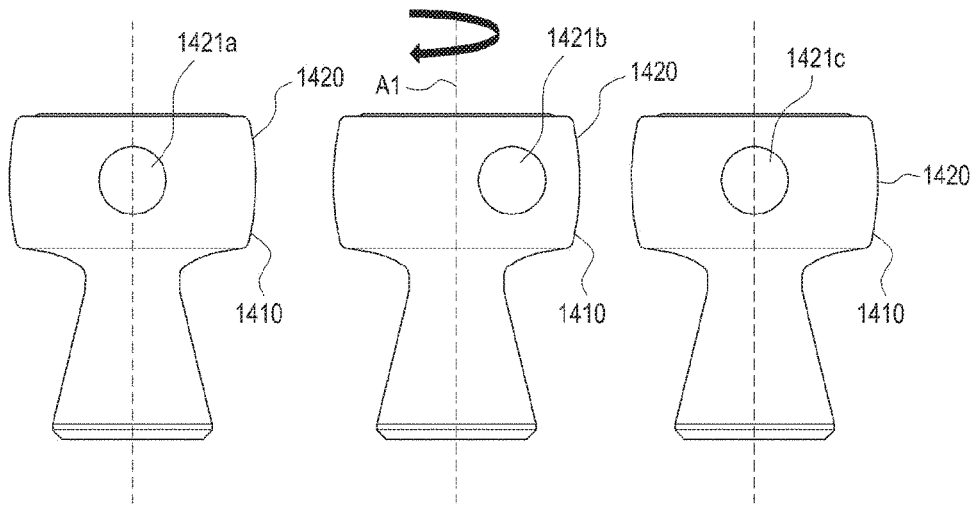
FIGS. 14A and 14B illustrate examples of a movement of a display of an electronic device according to various embodiments of the present disclosure.
Figure 14B:
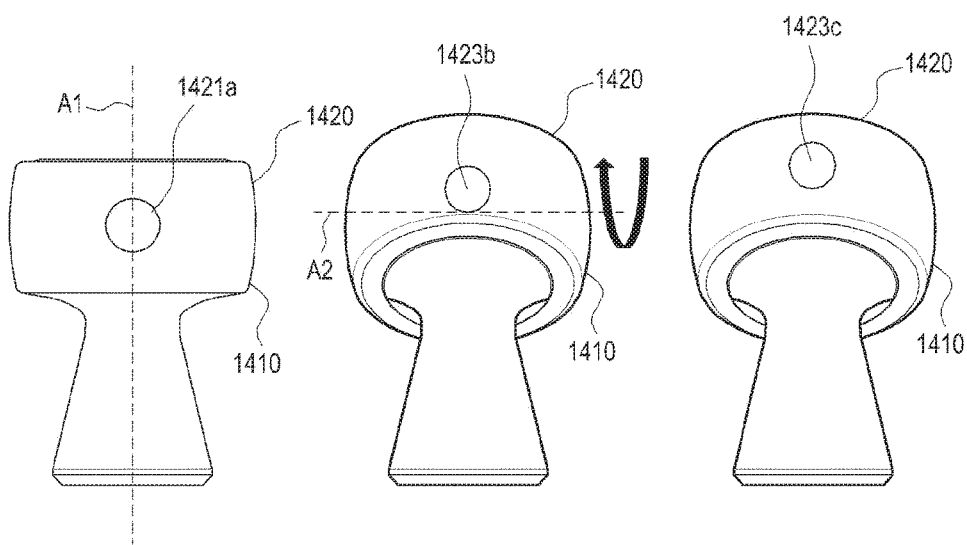
Figure 15A:
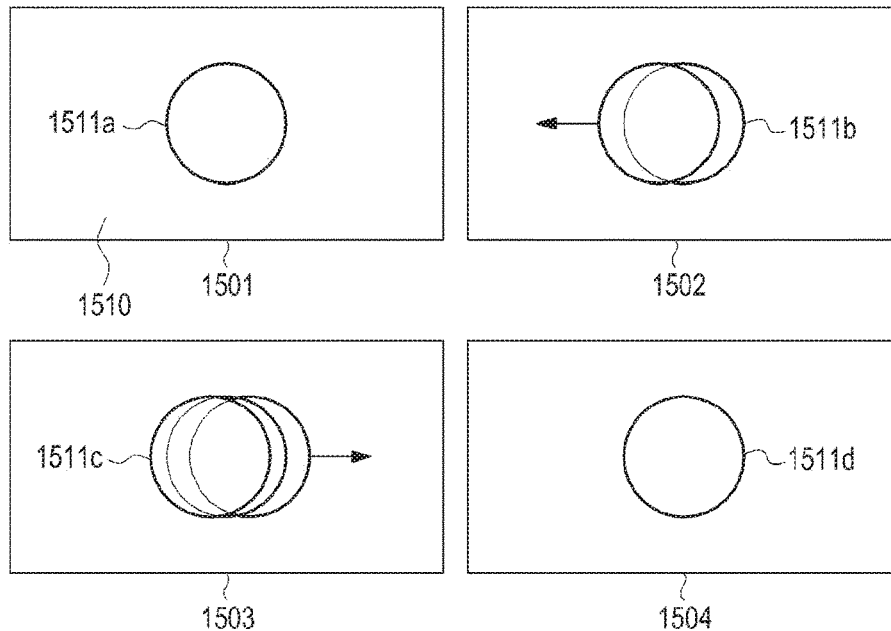
FIGS. 15A and 15B illustrate examples of a movement of a display of an electronic device according to various embodiments of the present disclosure.
Figure 15B:
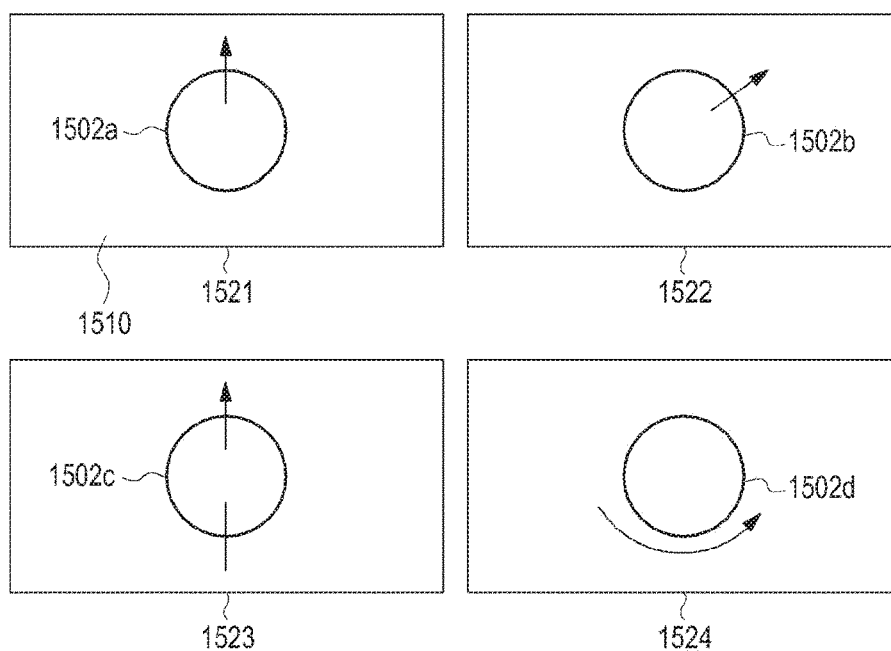

FIGS. 14A and 14B illustrate examples of a movement of a display of an electronic device according to various embodiments of the present disclosure, and FIGS. 15A and 15B illustrate examples of a movement of a display of an electronic device according to various embodiments of the present disclosure.

Referring to FIG. 14A, if the electronic device moves a display 1420 by rotating a rotation member 1410 in a left or right direction with respect to the vertical axis A1, the electronic device may control a first rotation module (a member for a movement in left and right directions) of the rotation member 1410 according to a user's input or sensing information. Further, if the display 1420 is moved in, for example, a left direction in a state where at least one object 1421a is displayed on the display 1420, the electronic device may make a control to move and display a location of the object 1421b displayed on the display 1420 in a right direction opposite to the movement direction corresponding to the movement direction of the display 1420. If the movement of the display 1420 is finished, the electronic device may change the display location of the object 1421c to the initial location on the display 1420 of the electronic device before the movement. Further, according to various embodiments, if the display 1420 moves in a left direction, the electronic device may move and display the object in the movement direction. If the control of the rotation member 1410 is terminated, the electronic device may display the object at the location before the movement of the display 1420.

Referring to FIG. 14B, the electronic device may control the display 1420 to move in an up or down direction with respect to the horizontal axis A2 and control a change in the object location by changing a parameter for the displayed object 1423b. According to various embodiments, as the rotation member 1410 rotates in an up direction, the electronic device may move the object 1421a displayed on the display 1420 to a lower area of the display in a direction opposite to the movement direction and display the moved object 1423b and, if the rotation of the rotation member 1410 is finished, display the object 1423c at the original location on the display.

As illustrated in FIGS. 14A and 14B, the electronic device may change and display the location of the object displayed to be linked to the movement of the display according to the rotation of the rotation member and determine a parameter for changing and displaying the location of the object. The electronic device illustrated in FIGS. 14A and 14B may move a display 1510 coupled to the rotation member by controlling the rotation of the rotation member (for example, the rotation member 230 of FIGS. 2A to 2F) and determine parameters for displaying the object according to the movement of the display 1510 as illustrated in FIGS. 15A and 15B. The electronic device may control displaying of at least one object displayed on the display 1510 based on the determined parameters and, if the movement of the display is finished, make a control to display the object, which is displayed at the changed location according to the determined parameters, at the original location.

Referring to FIG. 15A, in operation 1501, the electronic device may display an object 1511a on the display 1510 in an idle state corresponding to a state where there no separate operation. In connection with the parameters for displaying the object 1511a, for example, a rotation member location (body_location) may be determined as n, a movement speed may be determined as 0, and an object display location (UI_location) may be determined as a coordinate of n,n.

In operation 1502, if a call of an external object (for example, user) is generated in the idle state, the electronic device may rotate the rotation member and move the display 1510 in the rotation direction (for example, right direction). Accordingly, the electronic device may determine parameters to move the object 1511a in a direction (for example, left direction) opposite to the call direction in the idle state and display the moved object 1511b on the display 1510 according to the determined parameters. In connection with the parameters for displaying the object 1511b, for example, a rotation member location (body_location) may be determined as +n, a movement speed may be determined as 1, and an object display location (UI_location) may be determined as a coordinate of −n,n.

In step 1503, if the electronic device recognizes the user as an operation for recognizing the user according to the user's call is performed, the electronic device may stop the movement of the display 1510 by making a control to stop the rotation of the rotation member. Accordingly, the electronic device may determine parameters for displaying the object 1511b, which has been moved and displayed in the direction opposite to the rotation direction, on the stopped display 1510 in the rotation direction (for example, right direction) and display the moved object 1511c on the display 1510 according to the determined parameters. In connection with the parameters for displaying the object 1511c, for example, a rotation member location (body_location) may be determined as 0, a movement speed may be determined as 0, and an object display location (UI_location) may be determined as a coordinate of +n,n.

In step 1504, as the movement of the display 1510 stops, the electronic device may determine parameters to re-arrange and display the object 1511c, which has been moved and displayed in the right direction, at the original location, and display the object 1511d at the original location on the display 1510 according to the determined parameters. In connection with the parameters for displaying the object 1511d, for example, a rotation member location (body_location) may be determined as 0, a movement speed may be determined as 0, and an object display location (UI_location) may be determined as a coordinate of n,n.

As described above, the operations illustrated in FIG. 15A may be continuous operations.

Referring to FIG. 15B, in step 1521, the electronic device (for example, the electronic device 400 of FIG. 5A) may move the display 1510 in an up direction as the rotation member rotates (for example, the rotation member rotates an up direction with respect to the horizontal axis A2 in a front view). Accordingly, the electronic device may determine parameters to move and display an object 1502a on the display 1510 in the up direction. In connection with the parameters for displaying the object 1502a, for example, a rotation member location (body_location) may be determined as n, a movement speed may be determined as n, and an object display location (UI_location) may be determined as a coordinate of n,+n.

In operation 1522, the electronic device (for example, the electronic device 400 of FIGS. 4A and 4B) may move the display 1510 in a diagonal direction as the rotation member rotates (for example, the rotation member rotates in an up/down direction with respect to the horizontal axis A2 in a side view). Accordingly, the electronic device may determine parameters to move and display an object 1502b on the display 1510 in the diagonal direction. In connection with the parameters for displaying the object 1502b, for example, a rotation member location (body_location) may be determined as n, a movement speed may be determined as n, and an object display location (UI_location) may be determined as a diagonal coordinate of (+n,+n), (+n,−n), (−n,+n), or (−n,−n).

In operation 1523, if the rotation operation is finished after the rotation member rotates (for example, the rotation member rotates in the up direction with respect to the horizontal axis A2 in a front view), the electronic device (for example, the electronic device 400 of FIGS. 5A and 5B) may determine parameters to display an object 1502c at the original location of the display 1510 while repeatedly moving the object in the up and down directions as the movement of the display 1510 is stopped. In connection with the parameters for displaying the object 1502c, for example, a rotation member location (body_location) may be determined as 0, a movement speed may be determined as 0, and an object display location (UI_location) may be determined as a coordinate value (for example, 0,+n, or 0,−n).

In operation 1524, if the rotation operation is finished after the rotation member rotates (for example, the rotation member rotates in the up/down direction with respect to the horizontal axis A2 in a side view), the electronic device (for example, the electronic device 400 of FIGS. 4A and 4B) may determine parameters to move and display an object 1502d at the original location on the display 1510 as the movement of the display 1510 is stopped. For example, in operation 1524, the electronic device may determine parameters to move and display the object 1502d at the original location while rotating the object 1502d in order to make a 3D effect as if the displayed object 1502d rotates in place. If the object 1502d is moved to, for example, the left and stopped on the display 1510, the object 1502d may be displayed on the display 1510 such that the object 1502d has a 3D rotation by rotational inertia for a predetermined time and then is stopped. In connection with the parameters for displaying the object 1502d, for example, a rotation member location (body_location) may be determined as 0, a rotation speed of the rotation member may be determined as 0, and an object display location (UI_location) may be determined as a coordinate value (for example, +n,+n or −n,−n).

The operation of the electronic device illustrated in FIG. 14A, 14B, 15A, or 15B as described above may be applied to an operation procedure of FIG. 9 described above, or FIG. 17, 19, 24, 27, 31, or 33 described below.

FIGS. 16A to 16D illustrate examples of a display screen of an electronic device according to various embodiments of the present disclosure.

Figure 16A:
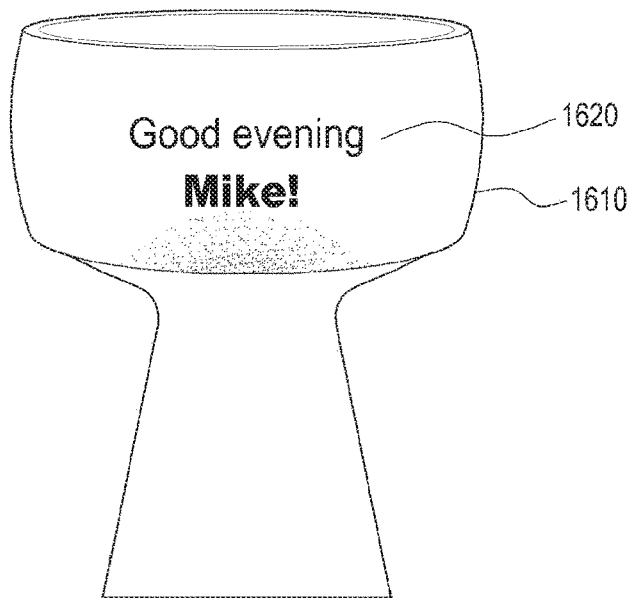
FIGS. 16A, 16B, 16C, and 16D illustrate examples of a display screen of an electronic device according to various embodiments of the present disclosure.

Referring to FIG. 16A, the electronic device may recognize an external object (for example, user) like in the operation procedure described in FIG. 9, determine greetings suitable for the recognized user, and display the determined greetings through a display object or output the determined greetings through a voice. For example, there may be one or more people around the electronic device. In this case, the electronic device may select a direction to move for an interaction through at least one sensor and move a display by controlling driving members in the corresponding direction. Accordingly, the electronic device may identify the user in the movement direction, select an interaction means related to the corresponding identified user, and provide proper information through the selected interaction means. For example, as illustrated in FIG. 16, if a display 1610 moves in a direction corresponding to a location of the identified user after the electronic device switches from an idle state to an active state for the interaction, the electronic device may display information suitable for the identified user (e.g., Mike), for example, "Good evening Mike!" 1620 on the display screen that faces the user.

Figure 16B:
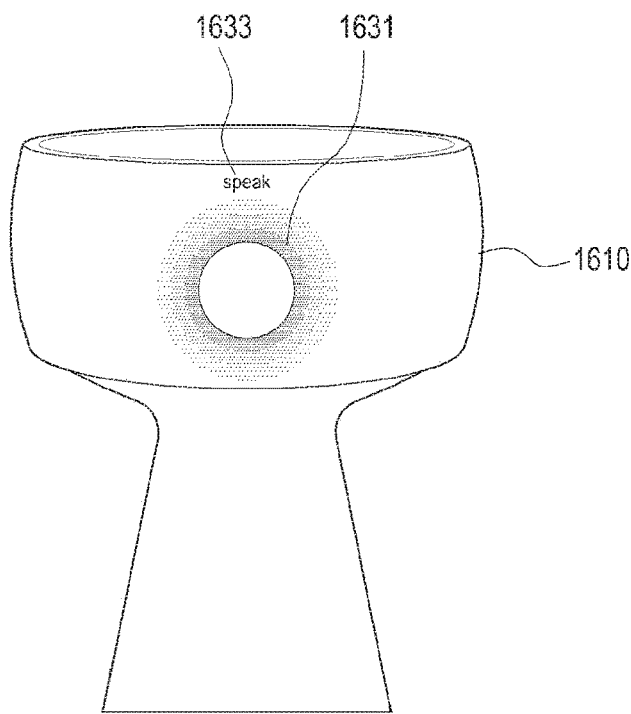

Referring to FIG. 16B, the electronic device may display an idle screen 1631 with no interaction with the user on the display 1610. The electronic device may perform, for example, a function for recognizing a sound and display an object 1633 (for example, "speak") that informs of a preparation for the recognition of the sound on the display 1610. Further, the electronic device may display an object 1631 that changes according to a particular condition on the display 1610 based on at least one piece of environment information, sensing information, time information, and user setting information.

Figure 16C:
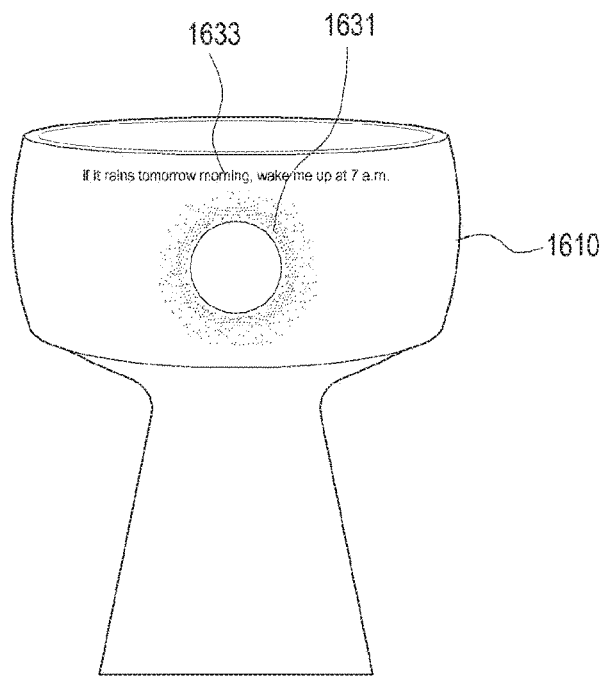
Figure 16D:
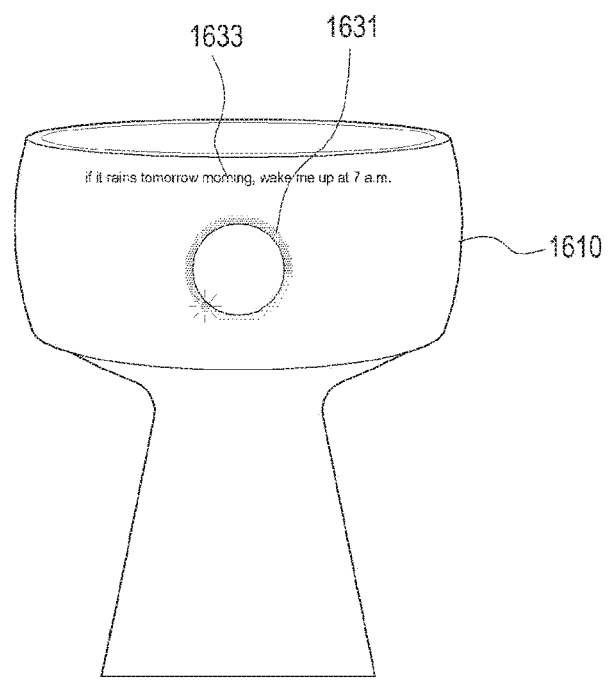

Referring to FIGS. 16C and 16D, if receiving a sound from the external object (for example, user), the electronic device may move the display 1610 in a direction in which the sound is received by controlling driving members in the direction in which the sound is received.

After moving the display 1610, the electronic device may display an object 1631 indicating that a user's voice input is being received. Further, if the user performs the voice input, the electronic device may immediately display an object 1633 corresponding to the recognized voice input by the user on the display 1610. In addition, as time passes, the electronic device may change the displayed object and display the changed object 1631. If it is determined that the voice input is finished, the electronic device may inform the user that the voice input is finished FIG. 17 is a flowchart of a method of an electronic device according to an embodiment of the present disclosure, and FIG. 18 illustrates an example of a display screen of an electronic device according to an embodiment of the present disclosure.

Figure 17:
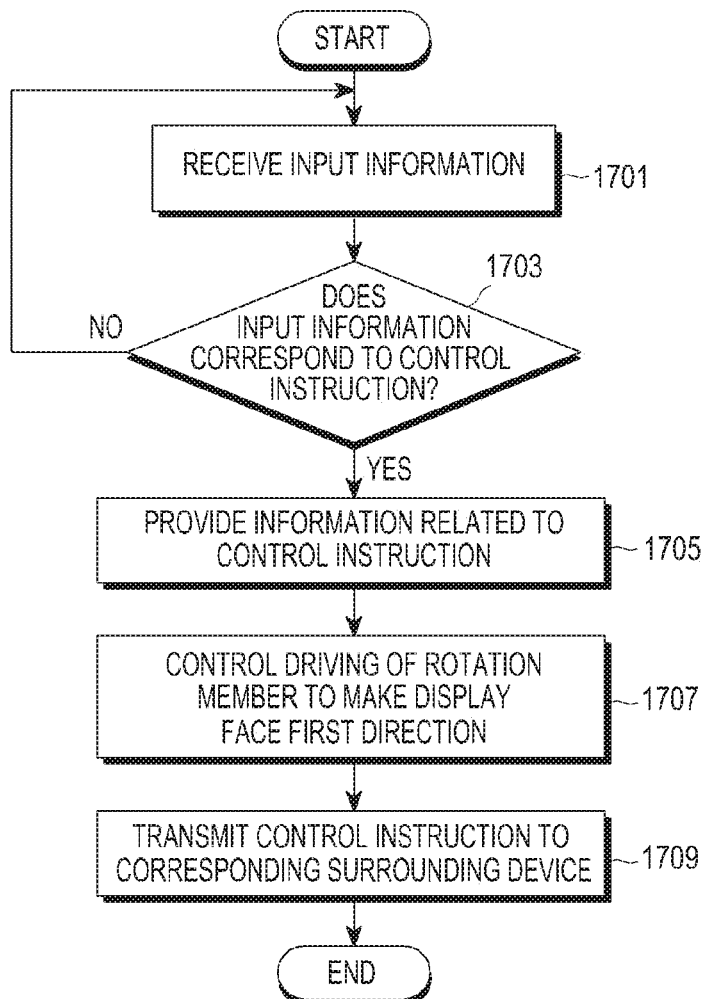
FIG. 17 is a flowchart of a method of an electronic device according to an embodiment of the present disclosure.
Figure 18:
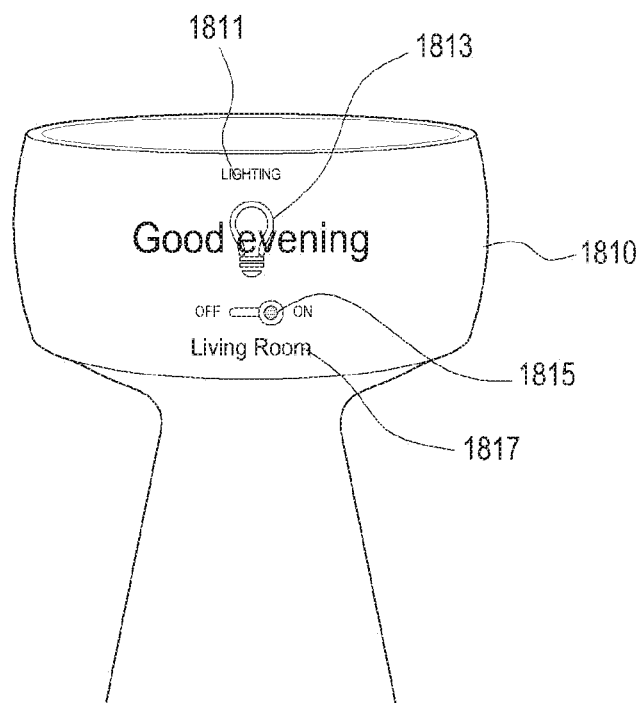
FIG. 18 illustrates an example of a display screen of an electronic device according to an embodiment of the present disclosure.

Referring to FIG. 17, the electronic device (for example, the electronic device 101 of FIG. 1 or the electronic device 200 of FIG. 2) may receive input information for an interaction with a user and analyze the received input information in step 1701. The input information may include voice information of an external object (for example, user), information input from the external object through a button or a touch pad, detection information of a particular motion of the external object, and information received through an external network.

In step 1703, the electronic device may determine whether the analyzed input information is a control instruction for controlling a surrounding device (for example, a surrounding home device). If a result of the determination corresponds to the control instruction, the electronic device may perform step 1705. In contrast, if the result of the determination does not correspond to the instruction for controlling the surrounding device, the electronic device may wait for receiving input information in step 1701, or may select an interaction means according to a result of the analysis and perform an operation according to the selected interaction means.

In step 1705, the electronic device may activate the interaction means (for example, a home network application or function for controlling the surrounding device) for controlling the surrounding device and provide information related to the control instruction. For example, the electronic device may display an object for the control instruction ("lighting") for controlling the surrounding device on the display and output a sound for the object through an audio module.

Referring to FIG. 18, the electronic device may display an object 1811 (for example, a voice instruction "lighting" for turning off the light in the living room) indicating the control instruction on a display 1810, extract an object related to the control instruction, and display the extracted object, for example, a bulb image 1813, a current state 1815 of the corresponding surrounding device, and a location 1817 (for example, living room) of the corresponding surrounding device.

In step 1707 in FIG. 17, the electronic device may identify a location where the control instruction is input and move the display in a direction (e.g., a first direction) of the identified location. Further, the electronic device may identify the external object (for example, a user) having made the input information and move the display again in a direction for an interaction with the identified external object, for example, a direction (e.g., a second direction) that faces a user's face. The electronic device may identify the external object through at least one of a user's facial recognition, fingerprint recognition, iris recognition, authentication information (for example, password) authorization, and voice recognition.

Further, if the display of the electronic device does not move and a display panel is formed to surround a circular support member, the electronic device may move and display at least one omni-directionally displayed object in a display area of a direction in which the identified external object is located in step 1707.

In step 1709, the electronic device may transmit a control signal including an instruction for controlling the surrounding device to the corresponding surrounding device through a network (e.g., home network communication or short-range wireless communication).

Referring to FIG. 18, if it is determined that a user's voice input is an input for turning off the light in the living room according to the above described operation procedure, the electronic device may display the object 1811 for the user's control instruction, the object 1813 indicating the bulb image, and the object 1817 indicating a place (for example, living room) related to the control instruction. Further, the electronic device may display an object 1815 indicating an on or off state of the surrounding device to be controlled. Thereafter, after transmitting the control signal, the electronic device may receive a response signal from the surrounding device or identify a current state of the corresponding surrounding device through sensing information detected through at least one sensor (for example, an illumination sensor) and display an object actually related to the light control on the display 1810 while providing the identified information, that is, information for changing the corresponding on state into the off state.

Figure 19:
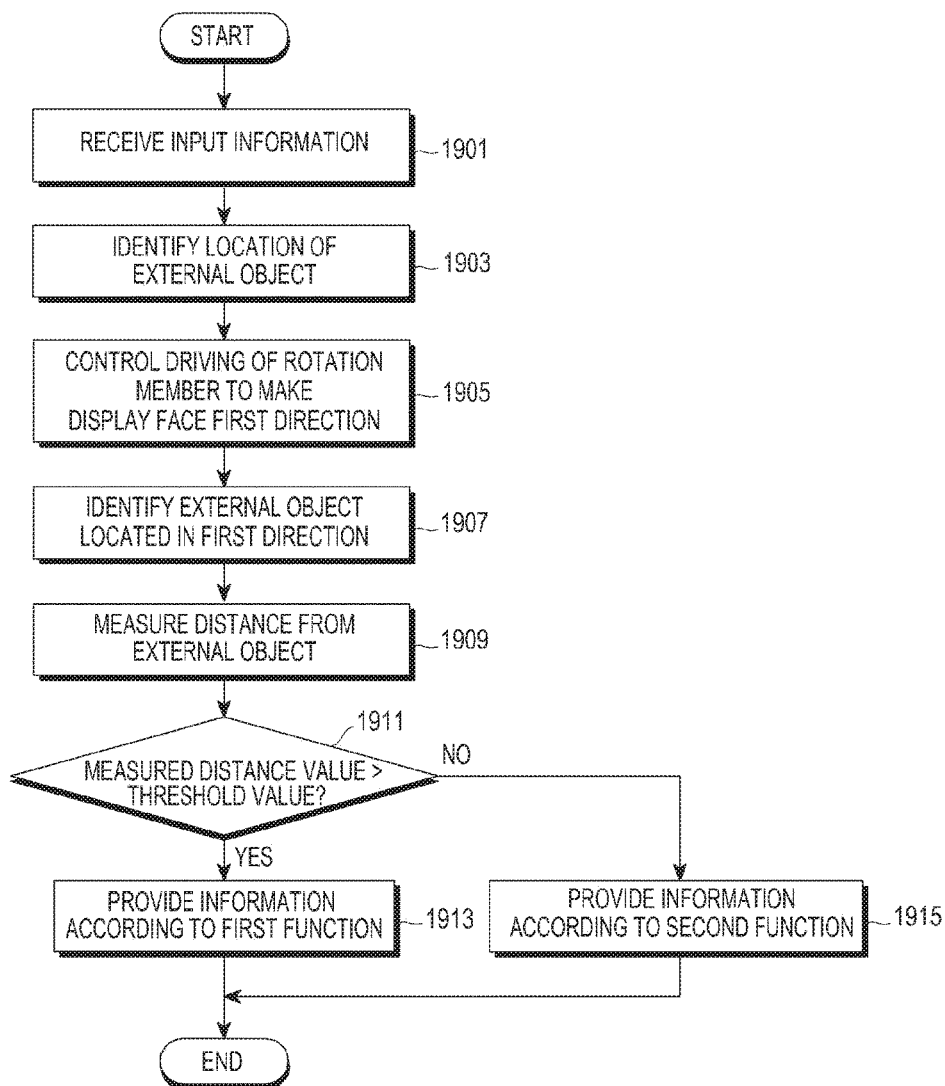
FIG. 19 is a flowchart of a method of an electronic device according to an embodiment of the present disclosure.
Figure 20A:
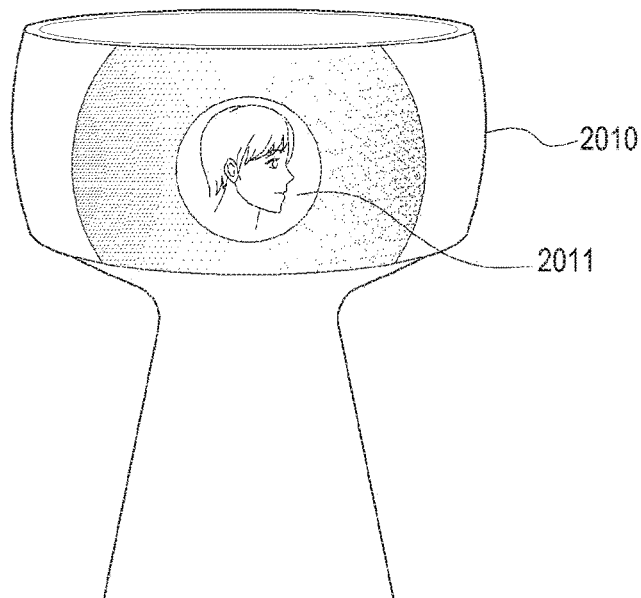
FIGS. 20A and 20B illustrate examples of a display screen of an electronic device according to various embodiments of the present disclosure.
Figure 20B:
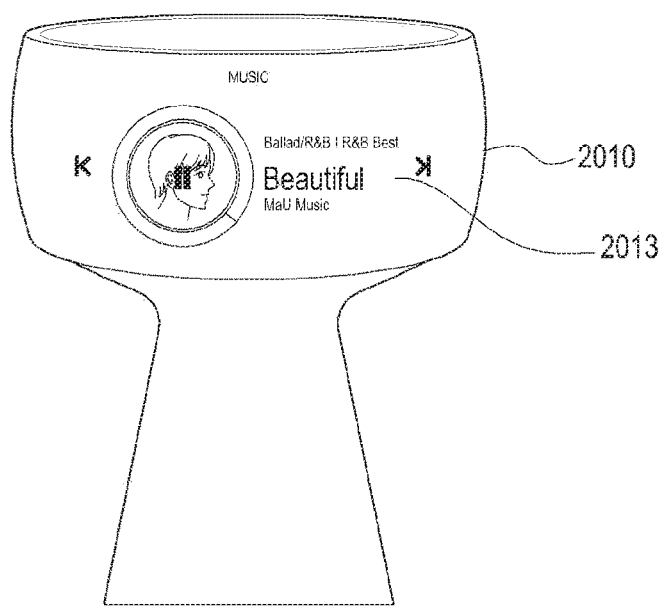

FIG. 19 illustrates a flowchart of a method of an electronic device according to an embodiment of the present disclosure, and FIGS. 20A and 20B illustrate examples of a display screen of an electronic device according to an embodiment of the present disclosure.

Referring to FIG. 19, the electronic device (for example, the electronic device 101 of FIG. 1 or the electronic device 200 of FIG. 2) may receive input information for an interaction with a user and analyze the received input information in step 1901. The input information may include voice information of an external object (for example, user), information input from the external object through a button or a touch pad, detection information of a particular motion of the external object, and information received through an external network.

If the reception of the input information is detected in an idle state, the electronic device may switch to an active state and execute an interaction means, for example, a music play application according to a result of the analysis of the input information. The electronic device may display an object of an initial screen for the currently executed music play application on the display. Then, the display may provide the initial screen for the music play application at an initially set location and output voice information according to the execution of the music play application through an audio module.

In step 1903, the electronic device may identify a location of the external object through an algorithm that tracks the location of the external object having made the input information.

In step 1905, the electronic device may control driving of a rotation support member coupled to the display to move the display in a direction (for example, first direction) corresponding to the identified location of the external object. Further, according to various embodiments, if the display of the electronic device does not move and a display panel is formed to surround a circular support member, the electronic device may move and display at least one object, which is displayed at the initially set location, in a display area of a direction in which the identified external object is located in step 1903.

In step 1907, the electronic device may identify the external object (for example, user) having made the input information. Then, the electronic device may move the display again in a direction for the interaction with the identified external object, for example, a direction (e.g., a second direction) that faces a user's face. The electronic device may identify the external object through at least one of a user's face recognition, fingerprint recognition, iris recognition, authentication information (for example, a password) authorization, and voice recognition.

In step 1909, the electronic device may measure a distance from the identified user.

In step 1911, the electronic device may determine whether the measured distance value is greater than a set threshold value. The electronic device may perform step 1913 if the measured distance value is greater than the set threshold value based on a result of the determination, and perform step 1915 if the measured distance value is equal to or less than the set threshold value.

If the measured distance value is greater than the set threshold value, the electronic device may provide a first function of the music play application in step 1913. As illustrated in FIG. 20A, the electronic device may determine that a distance from the identified external object is great, and thus may configure and provide an object 2011 for the first function displayed on a display 2010 to be intuitively recognized even from far away. For example, the object 2011 displayed on the display 2010 may be provided as an image type object or audio information, and, if the object 2011 corresponds to characters, the displayed characters may be enlarged and displayed according to a function. If the distance between the user and the electronic device is longer than or equal to a predetermined distance, a physical input by the user is not possible. Accordingly, in the first function, only an input through a gesture or a voice may be activated and, for example, a touch pad may be deactivated.

If the measured distance value is less than or equal to the set threshold value, the electronic device may provide a second function of the music play application in step 1915. As illustrated in FIG. 20B, the electronic device may determine that the distance from the identified external object is short and provide an object 2013 for the second function on the display 2010. For example, the electronic device may also display objects, which should be displayed to be small, on the display 2010. The electronic device may configure and display a screen to include an object through which the user can directly control a physical instruction rather than a voice instruction. The second function may be a function capable of the physical input by the user.

Figure 21:
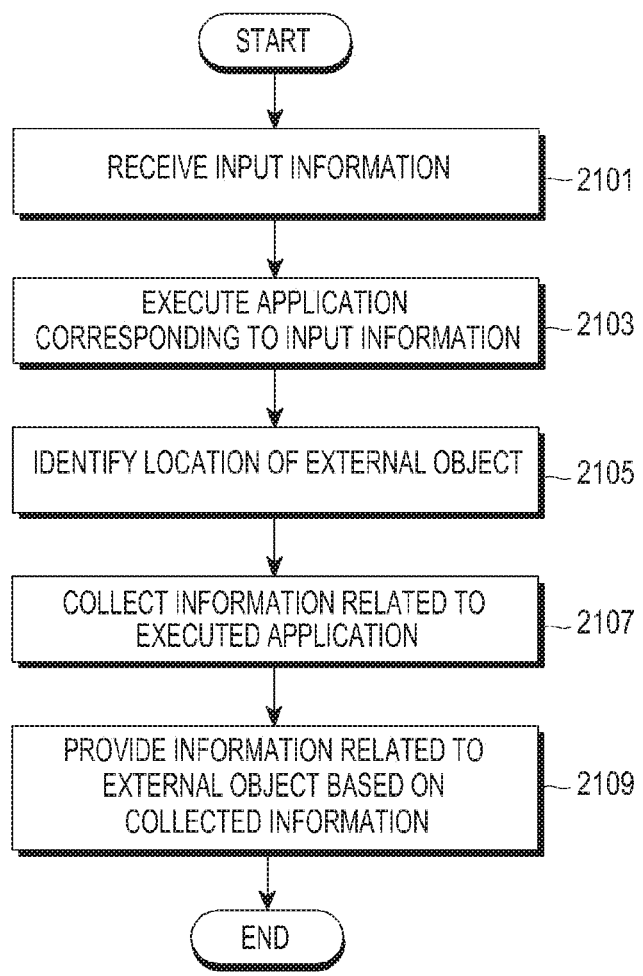
FIG. 21 is a flowchart of a method of an electronic device according to an embodiment of the present disclosure.

FIG. 21 is a flowchart of a method of an electronic device according to an embodiment of the present disclosure.

Referring to FIG. 21, the electronic device (for example, the electronic device 101 of FIG. 1 or the electronic device 200 of FIG. 21) may receive input information for an interaction with a user and analyze the received input information in step 2101. The input information may include voice information of an external object (for example, user), information input from the external object through a button or a touch pad, detection information of a particular motion of the external object, and information received through an external network.

If the reception of the input information is detected in an idle state, the electronic device may switch to an active state and activate an interaction means according to a result of the analysis of the input information in step 2103. For example, the electronic device may execute an application that provides cooking information as the interaction means. The electronic device may display an object of an initial screen for the currently executed application on the display. At this time, the electronic device may output voice information according to the executed application through an audio module.

In step 2105, the electronic device may identify a location of the external object through an algorithm that tracks the location of the external object having made the input information. The electronic device may control driving a rotation support member coupled to the display to move the display in a direction (e.g., a first direction) corresponding to the identified location of the external object. Further, if the display of the electronic device does not move and a display panel is formed to surround a circular support member, the electronic device may move and display at least one object, which is displayed at the initially set location, in a display area of a direction in which the identified external object is located in step 2105.

In addition, the electronic device may identify the external object (for example, user) having made the input information. Then, the electronic device may move the display again in a direction for the interaction with the identified external object, for example, a direction (e.g., a second direction) that faces a user's face. The electronic device may identify the external object through at least one of a user's face recognition, fingerprint recognition, iris recognition, authentication information (for example, a password) authorization, and voice recognition.

In step 2107, the electronic device may collect information related to the executed application. The electronic device may collect information (for example, information on food stuffs reserved in a refrigerator, a cooking method, or a cooking program) from surrounding devices that communicate through a home network.

In step 2109, the electronic device may provide information on an executed application suitable for the identified external object, that is, the user based on the collected information.

FIGS. 22A to 22D illustrate examples of a display screen of an electronic device according to various embodiments of the present disclosure.

Figure 22A:
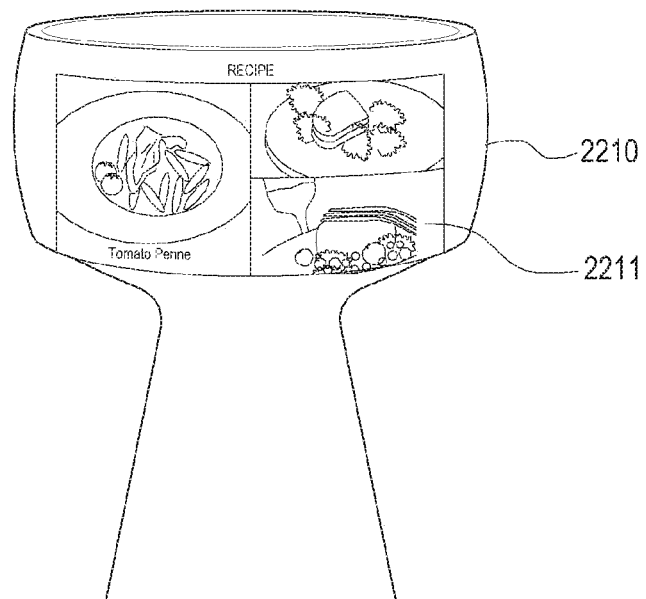
FIGS. 22A, 22B, 22C, and 22D illustrate examples of a display screen of an electronic device according to various embodiments of the present disclosure.

Referring to FIG. 22A, the electronic device may execute an interaction means, for example, an application for providing cooling information according to received input information and display an object 2211 related to the executed application on a display 2210.

Figure 22B:
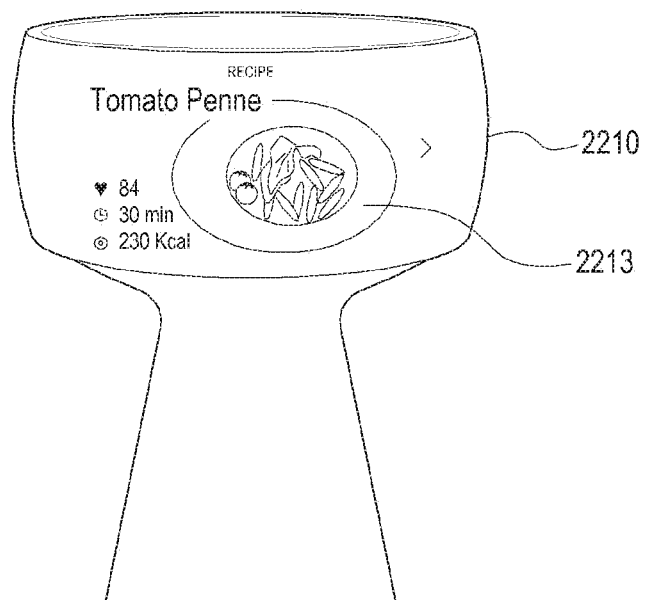

Referring to FIG. 22B, the electronic device may display an object 2213 related to food information suitable for the identified user on the display 2210. For example, if the user selects at least one of the foods provided on the screen of the executed application, the electronic device may provide information on the selected food through an information exchange with a plurality of electronic devices within the home. Further, according to various embodiments, the electronic device may first provide food information suitable for the user collectively based on food stuffs currently existing within the home, weather, and user information existing within the home through an information exchange with a plurality of electronic devices within the home or a server.

In providing food information, the electronic device may further provide additional information such as an explanation and an image of the corresponding food, a time spent for cooking the corresponding food, or calories of the food. If displaying the time spent for cooking the food, the electronic device may further determine a skill of the corresponding user based on the recognized user, and provide the corresponding user with different cooking time according to a result of the determination. Further, the electronic device may provide a recipe changed according to a health state through an additional or removal of required food stuffs based on additional information of the user, information on taken medicine, health information, and context information.

Figure 22C:
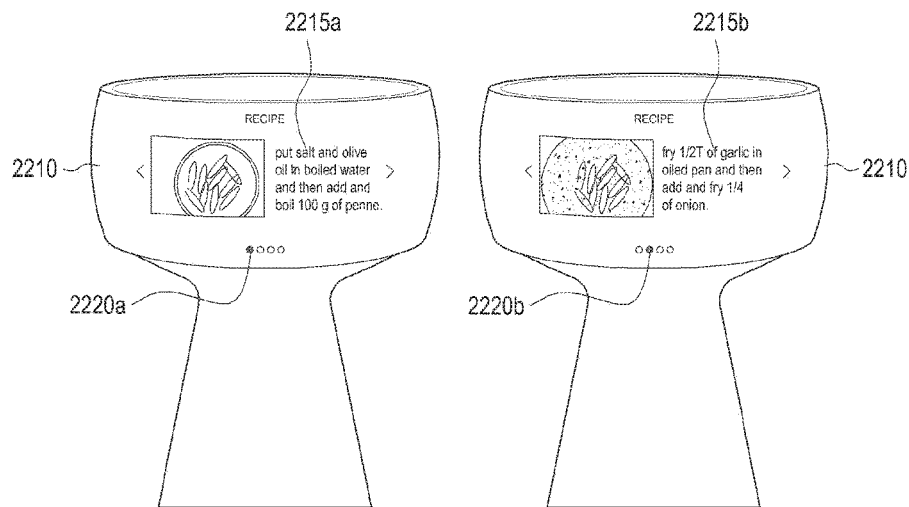
Figure 22D:
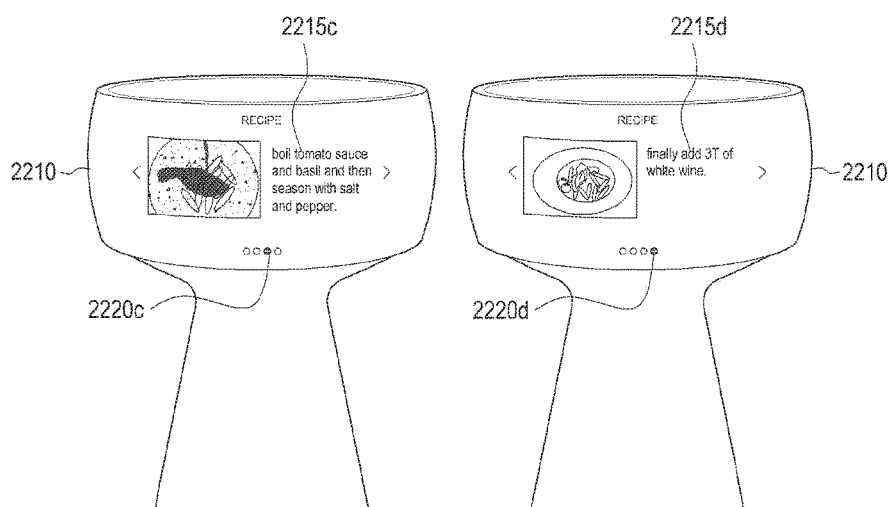

Referring to FIGS. 22C and 22D, if a cooking method is configured by a plurality of pages 2215a, 2215b, 2215c, and 2215d including one or more pieces of information, the electronic device may provide an image of each cooking step and a page showing the cooking method that matches the image if providing the cooking method. Then, the electronic device may display sequentially or non-sequentially display the plurality of pages on the display 2210 according to a user's gesture, a voice instruction, a time preset according to each cooking process on each page, or an input of preset particular information. Further, the electronic device may display an object 2220a, 2220b, 2220c, or 2220d indicating a currently shown page on the display 2210. The electronic device may output information related to the plurality of pages for the cooking method through audio information. The electronic device may receive information generated by photographing the external object (for example, user) through an image sensor and determine whether the user has conducted the information provided by the currently displayed page based on the received photographed information. Accordingly, if it is determined that the user has conducted the currently provided information, the electronic device may automatically switch the page and display the next page on the display 2210. If the electronic device sequentially or non-sequentially displays the plurality of pages 2215a, 2215b, 2215c, and 2215d including one or more pieces of information, the user may move while cooking according to the currently displayed page. In this case, the electronic device may detect the movement of the user and rotate the display in a direction in which the user is located by controlling a rotation member according to the detection of the movement of the user. Accordingly, if the display 221 coupled to the rotation member moves, the electronic device may control displaying of one or more pieces of information (e.g., objects) displayed on the display 221 in accordance with the movement of the display 221. For example, as illustrated in FIGS. 15A and 15B, the electronic device may determine parameters for displaying the object and change and display the location of the displayed object based on the determined parameters, so that an effect may be created as if the display moves according to the movement of the user and the object also moves according to the movement of the display. Accordingly, even in the state where the user moves during cooking, the user may rapidly check cooking information provided by the display without performing another operation for checking the cooking information as described in the aforementioned embodiment.

Figure 23A:
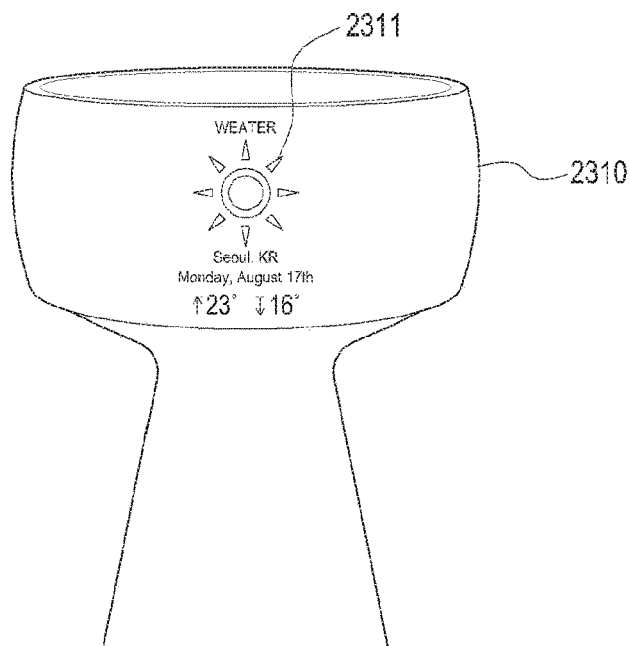
FIGS. 23A and 23B illustrate examples of a display screen of an electronic device according to various embodiments of the present disclosure.
Figure 23B:
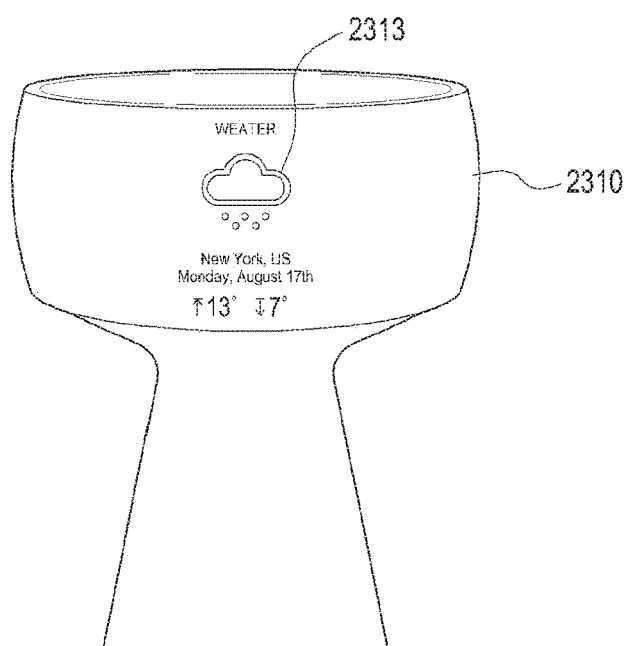

FIGS. 23A and 23B illustrate examples of a display screen of an electronic device according to various embodiments of the present disclosure.

Referring to FIG. 23A, the electronic device may provide weather information 2311 or 2313 suitable for the identified external object (for example, user) based on the operation procedure of FIG. 21. According to various embodiments, if the identified user makes input information such as "weather", the electronic device may display an object 2311 for weather information of a place in which the user is currently located on the display 2310 or output the weather information in the form of audio information through an audio module.

Referring to FIG. 23B, after providing the weather information of the place in which the user is currently located as illustrated in FIG. 23A, the electronic device may display the object 2313 for weather information of another region (for example, New York) on the display 2310 according to a condition set by the user or information received through an interaction with the user or output the weather information in the form of audio information through the audio module.

Figure 24:
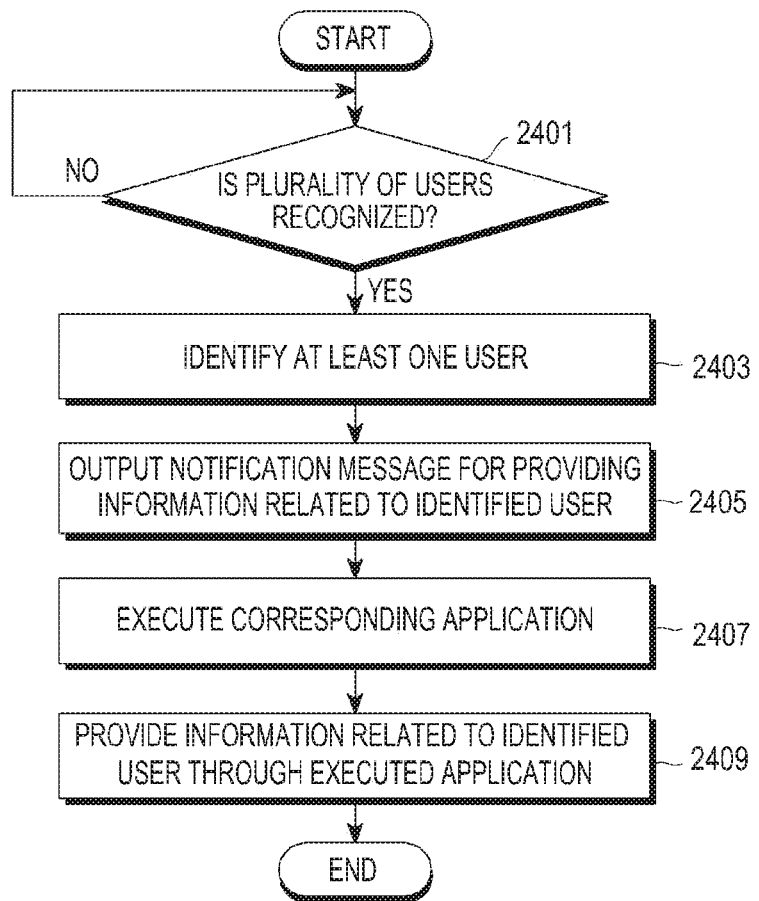
FIG. 24 is a flowchart of a method of an electronic device according to an embodiment of the present disclosure.

FIG. 24 is a flowchart of a method of an electronic device according to an embodiment of the present disclosure.

Referring to FIG. 24, the electronic device (the electronic device 101 of FIG. 1 or the electronic device 700 of FIG. 7) may determine whether a plurality of users exist in one space in step 2401. The electronic device may perform step 2403 if the plurality of users exist based on a result of the determination, and perform step 2401 again while maintaining an idle state if the plurality of users do not exist.

If the plurality of users exist in a direction in which the display currently faces, the electronic device may identify at least one of the plurality of users in step 2403. An operation for identifying the user may be the same as or similar to that described in the aforementioned various embodiments. If the plurality of users are detected based on received information, the electronic device may determine a user having an intention among the plurality of users and make a control to rotate a rotation member in a direction in which the determined user is located.

In step 2405, the electronic device may display a notification message for informing of provision of information related to the identified user on the display or output the notification message through audio information.

In step 2407, the electronic device may select and execute an application preset by the identified user or an interesting application as an interaction means based on collected information.

In step 2409, the electronic device may provide the information related to the identified user through a function of the currently executed application.

Figure 25:
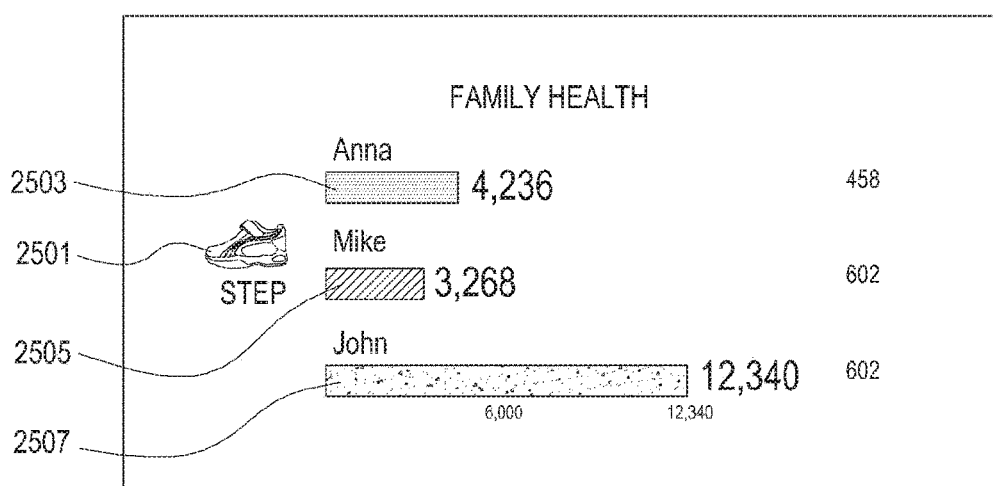
FIGS. 25 and 26 illustrate examples of a display screen of an electronic device according to various embodiments of the present disclosure.
Figure 26:
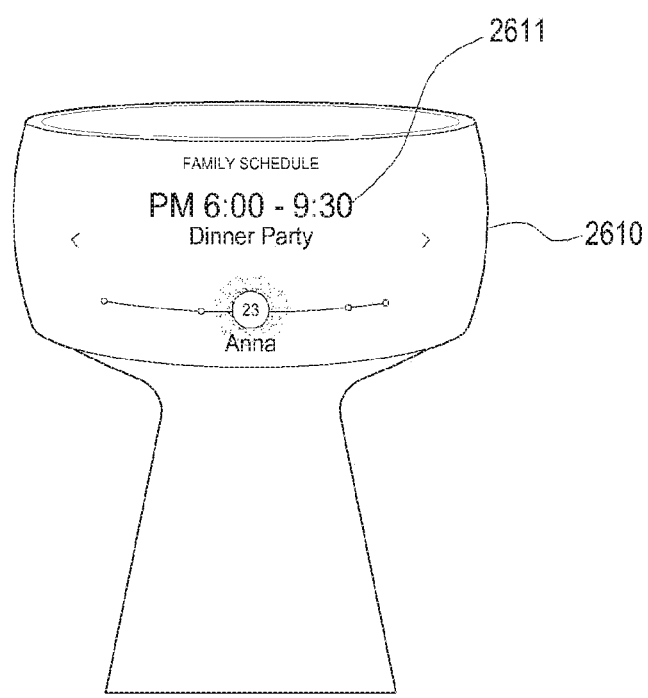

FIGS. 25 and 26 illustrate examples of a display screen of an electronic device according to various embodiments of the present disclosure.

Based on the operation procedure of FIG. 24 described above, the electronic device may identify at least one of a plurality of users and provide information related to the identified user. Referring to FIG. 25, if the identified user (for example, Mike) makes input information such as "health", the electronic device may execute a function 2501 (for example, step) of an application corresponding to the input information. Further, the electronic device may acquire family information related to the identified user (for example, Mike) for the function 2501 of the executed application and provide health information 2503 or 2507 of family members (for example, Anna and John), and health information 2505 of the identified user (for example, Mike) based on the acquired family information.

Based on the operation procedure of FIG. 24 described above, if a plurality of users are identified according to various embodiments, the electronic device may provide weather information sequentially or at one time based on information in which each of the plurality of identified users is interested. The electronic device may be connected to electronic devices of the plurality of users or collect information on the plurality of registered users from a server and may update the information on the plurality of registered users in real time based on the collected information. The electronic device may sequentially or non-sequentially provide information related to the plurality of users. The electronic device may configure and display the information related to the plurality of users as one screen or configure and display a plurality of user-specific pages. The electronic device may track a location according to a movement of each user and move and display information related to the corresponding user in a display area that faces a direction of the corresponding location.

Based on the operation procedure of FIG. 24 described above, the electronic device may provide schedule information 2611 to the identified user as illustrated in FIG. 26. The electronic device may recognize another connected electronic device or a user's voice, store schedule information of at least one user, and provide the schedule information to corresponding user. The electronic device may recognize a particular user (for example, Anna) during the operation, check whether there is a schedule to be provided in connection with the recognized user (for example, Anna) and, if there is the schedule to be provided, display the identified schedule information 2611 on a display 2610. Further, the electronic device may output the identified schedule information through audio information.

Figure 27:
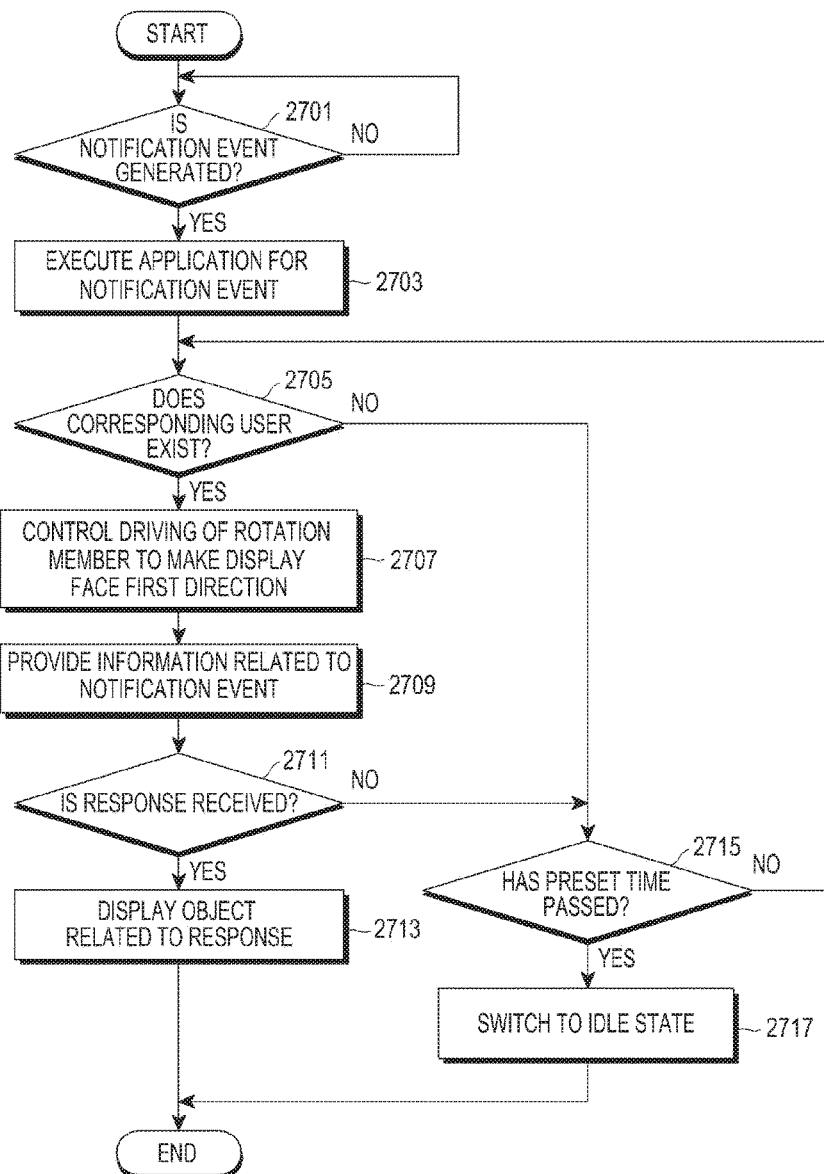
FIG. 27 is a flowchart of a method of an electronic device according to an embodiment of the present disclosure.
Figure 28:
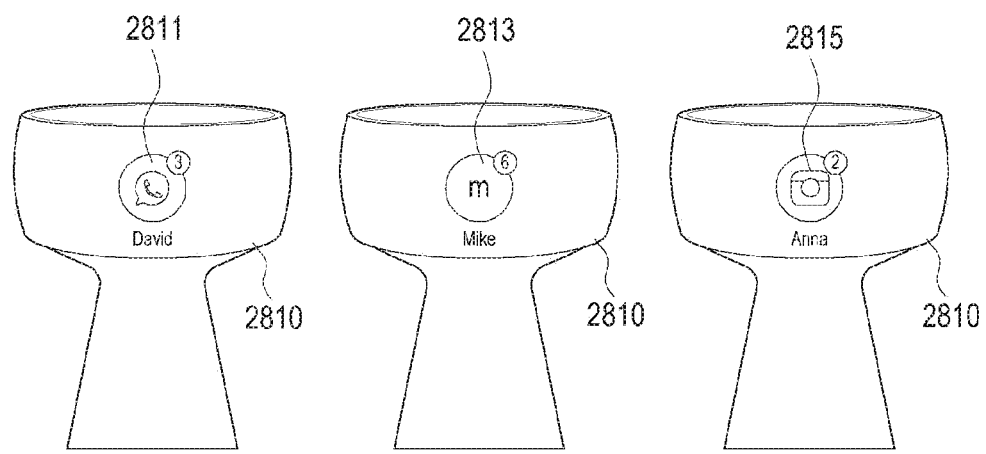
FIGS. 28, 29A, and 29B illustrate examples of a display screen of an electronic device according to various embodiments of the present disclosure.

FIG. 27 is a flowchart of a method of an electronic device according to an embodiment of the present disclosure, and FIG. 28 illustrates an example of a display screen of an electronic device according to an embodiment of the present disclosure.

Referring to FIG. 27, the electronic device (for example, the electronic device 101 of FIG. 1 or the electronic device 200 of FIG. 2) may identify whether an event of which a notification should be provided is generated in step 2701. If the notification event is generated based on a result of the identification, the electronic device may perform step 2703. The electronic device may identify whether an event for receiving a message through various types of communication is generated regardless of a request of the external object located within the home. For example, the received message may be a message received through a voice call, a video call, a messenger service, or an SMS.

If the notification event is generated in an idle state, the electronic device may execute an application for the generated notification event in step 2703. The electronic device may display an object that informs of the generation of the notification event on the display through the executed application or output the object in the form of audio information through an audio module.

In step 2705, the electronic device may determine whether there is a user to which the generated notification event should be provided. The electronic device may perform step 2715 if there is no corresponding user based on a result of the determination, and perform step 2707 if there is the corresponding user.

In step 2707, the electronic device may track a location of the corresponding user and move the display in a first direction in which the user is located. The electronic device may control driving a rotation support member coupled to the display to move the display in the direction (e.g., a first direction) corresponding to the identified location of the external object. Further, in order to identify the corresponding user, the electronic device may move the display again in a direction (e,g., a second direction) that faces the user. The electronic device may identify the external object through at least one of a user's face recognition, fingerprint recognition, iris recognition, authentication information (for example, password) authorization, and voice recognition.

In step 2709, the electronic device may provide information related to the notification event. Further, if the display of the electronic device does not move and a display panel is formed to surround a circular support member, the electronic device may move and display the information related to the notification event in a display area of a direction in which the identified external object is located. According to various embodiments, as illustrated in FIG. 28, the electronic device may display icons of applications for the notification event and objects 2811, 2813, and 2815 on a display 2810 in the form of expressing additional information in the corresponding icon. The electronic device may provide user information (for example, a name) related to the generated notification event along with the objects 2811, 2813, and 2815 of the displayed icons.

The electronic device may determine whether a response is received from the corresponding user in step 2711. The electronic device may perform step 2715 if the response is not received, and perform step 2713 if the response is received.

In step 2713, the electronic device may display the object related to the received response information, and output detailed information on the notification event or output the detailed information through audio information.

In step 2715, the electronic device may determine whether a preset time passes after the notification event is generated. If the response, that is, interaction selection is not received from the corresponding user until the preset time passes based on a result of the determination or it is determined that the corresponding user is not identified, the electronic device may switch to the idle state and wait for receiving the notification event or input information of the external object in step 2717. For example, if user goes far away from the electronic device even though the user identifies the display, the electronic device may stop the event notification without providing additional information to the user. Further, in this case, the electronic device may store information on the notification event and, if the corresponding user is recognized later, track a location of the recognized user. If the user is identified, the electronic device may move the display or the object to face the identified user and provide notification information or detailed information on the stored notification event.

Figure 29A:
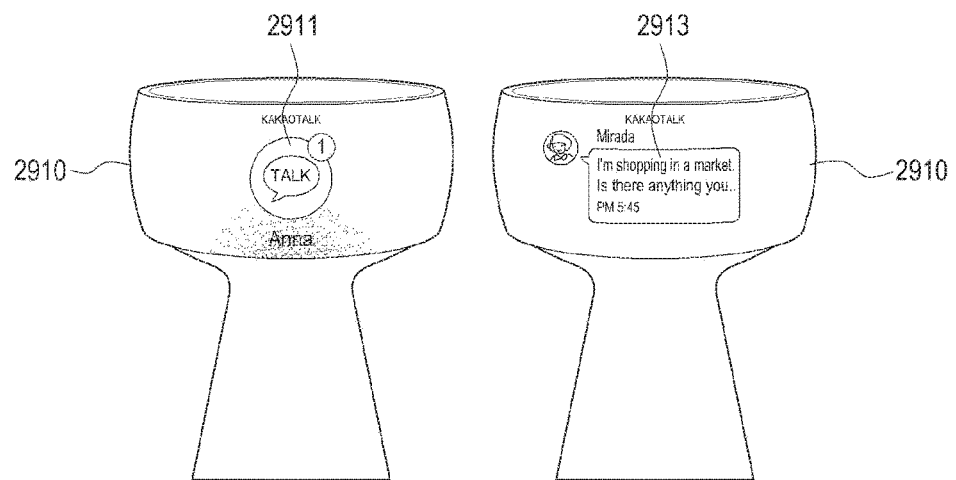
Figure 29B:
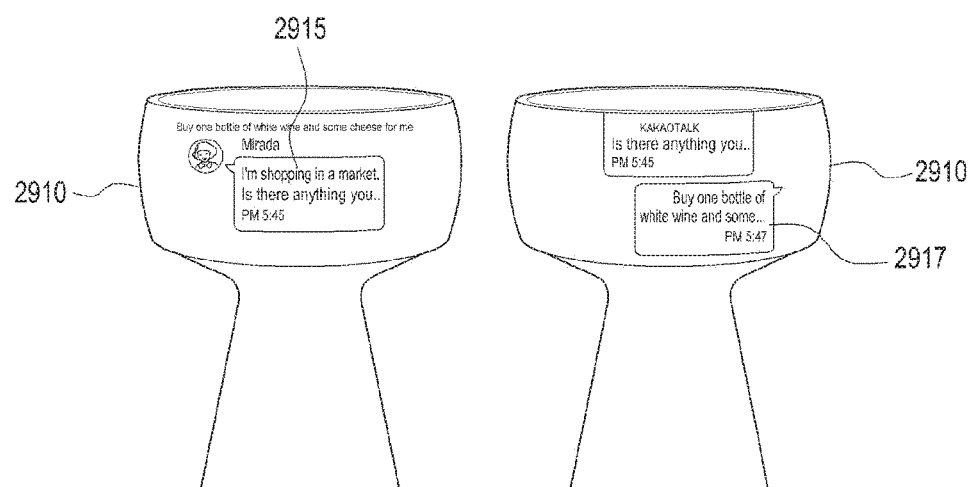

FIGS. 29A and 29B illustrate examples of a display screen of an electronic device according to various embodiments of the present disclosure.

Based on the method of FIG. 27 described above, the electronic device may output a voice such as "Anna has got a text message" through an audio module or display the object 2911 for notification information on the display 2910 according to generation of the notification event as illustrated in FIG. 29A. Then, if the user makes an additional voice instruction such as "show me" or "read to me" or a response, that is, an interaction such as an action of approaching the electronic device is detected, the electronic device may provide the user with detailed information 2913 on a relevant event through a voice or the display 2910.

Referring to FIG. 29B, if the electronic device receives a response message 2915 (voice information or character input information) for the notification event from the user after selecting the interaction corresponding to the user's response, the electronic device may transmit the received response message. Further, the electronic device may display an object 2917 according to a result of the transmission of the response message on the display 2910. At this time, if the electronic device can directly perform communication for a messenger service, the electronic device may directly transmit the response message input by the user to a counterpart. If the electronic device cannot directly perform the communication for the messenger service, the electronic device may transmit the input response message to an external electronic device capable of performing the messenger service and make a request for transferring the response message to the counterpart.

Figure 30A:
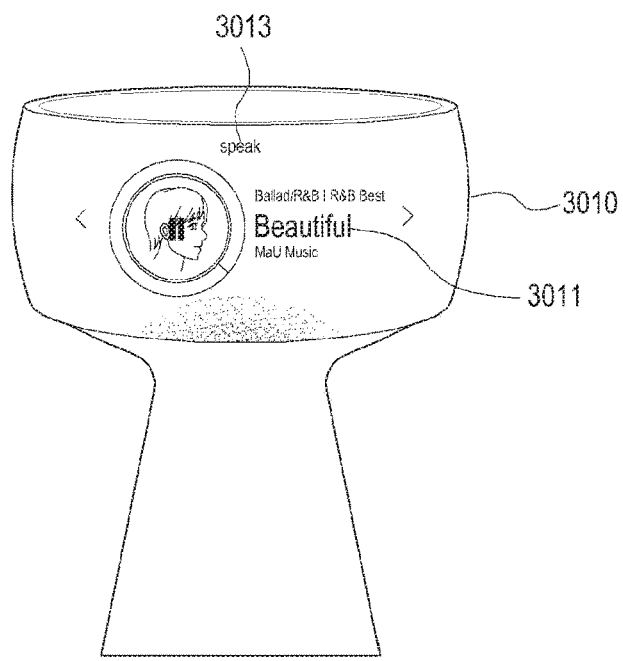
FIGS. 30A and 30B illustrate examples of a display screen of an electronic device according to various embodiments of the present disclosure.
Figure 30B:
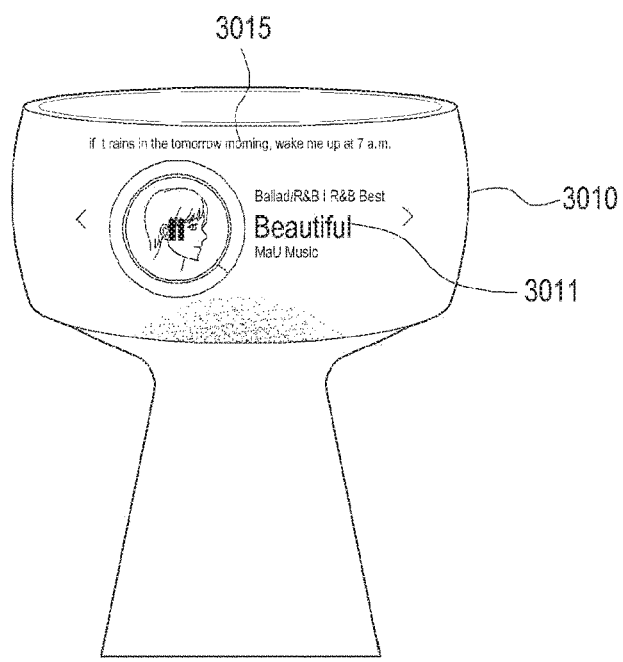

FIGS. 30A and 30B illustrate examples of a display screen of an electronic device according to various embodiments of the present disclosure.

Referring to FIGS. 30A and 30B, if the electronic device receives a request for another function while performing a particular function 3011, the electronic device may display an object 3013 for the other function, for example, an additional voice instruction of the user on a display 3010 displaying the object 3011 for the particular function. If the electronic device receives a voice input (for example, "hey buddy") from the user in a state where music is played by a music player program as indicated by the reference numeral 3011, the electronic device may activate a function for voice recognition during the performance of a particular operation. Then, a module for the voice input may be activated and the electronic device may additionally display an object 3013 of "speak" on a part of the current music player screen. Thereafter, if the user speaks "if it rains in the tomorrow morning, wake me up at 7 a.m." 3015, the electronic device may additionally display a screen for recognizing the corresponding speaking in the current music player 3011. Further, if it is required to provide a corresponding processing result to the user, the electronic device may additionally configure and provide a corresponding result screen on the current music player screen A method of providing information in an electronic device including a rotation support member, a support member configured to support the rotation support member, and a rotation member movably coupled to the rotation support member according to one of the various embodiments of the present disclosure may include, an operation of controlling, if input information is received, driving of the rotation member to make a display coupled to the rotation member corresponding to the received input information face a first direction, an operation of, if the display moves to face the first direction, controlling the driving of the rotation member to face a second direction for identifying an external object, an operation of, if the display is located to face the external object in the second direction, identifying the external object, and an operation of displaying information on at least one function executed in connection with the identified external object on the display.

The method may further include an operation of, if the display moves in the first direction or the second direction in accordance with the driving of the rotation member in a state where previous information displayed in connection with the external object exists on the display, changing a display location of at least one object for the previous information such that the at least one object for the displayed previous information is moved and displayed in a set direction according to the movement of the display, and an operation of, if the movement of the display stops, changing the display location of the at least one object to an original location.

The method may further include an operation of, if the display moves in a third direction after the information on the executed function is displayed on the display, changing the display location of the at least one object such that the at least one object for the information on the executed function is moved and displayed in a set direction according to the movement of the display, and an operation of, if the movement of the display stops, changing the display location of the at least one object to an original location.

The method may further include an operation of, if the information on the at least one function includes a plurality of pages and the display moves in a requested direction according to a request for switching a displayed page, changing a display location of a first page to make the first page displayed on the display disappear in the requested direction, and an operation of, if the display returns to an initial direction, changing a display location of a second page to make the second page appear on the display from a direction opposite to the requested direction.

The method may further include an operation of, if the input information corresponds to a control instruction, executing an application for the control instruction, and an operation of transmitting control information for controlling a surrounding electronic device corresponding to the control instruction to the surrounding electronic device through the executed application.

The operation of displaying the information on the at least one function executed in connection with the identified external object on the display may include an operation of measuring a distance from the identified external object, an operation of, if a value of the measured distance is greater than a preset threshold value, providing a first function related to the identified external object, and an operation of, if the value of the measured distance is not greater than the preset threshold value, providing a second function related to the identified external object.

The operation of displaying the information on the at least one function executed in connection with the identified external object on the display may include an operation of, if a notification event is generated while the function related to the external object is provided, determining a target external object of the notification event, an operation of controlling driving of the rotation member to make the display move in a direction in which the determined target external object is located, and an operation of, if response information is received from the target external object, providing information on an executed function corresponding to the received response information.

Figure 31:
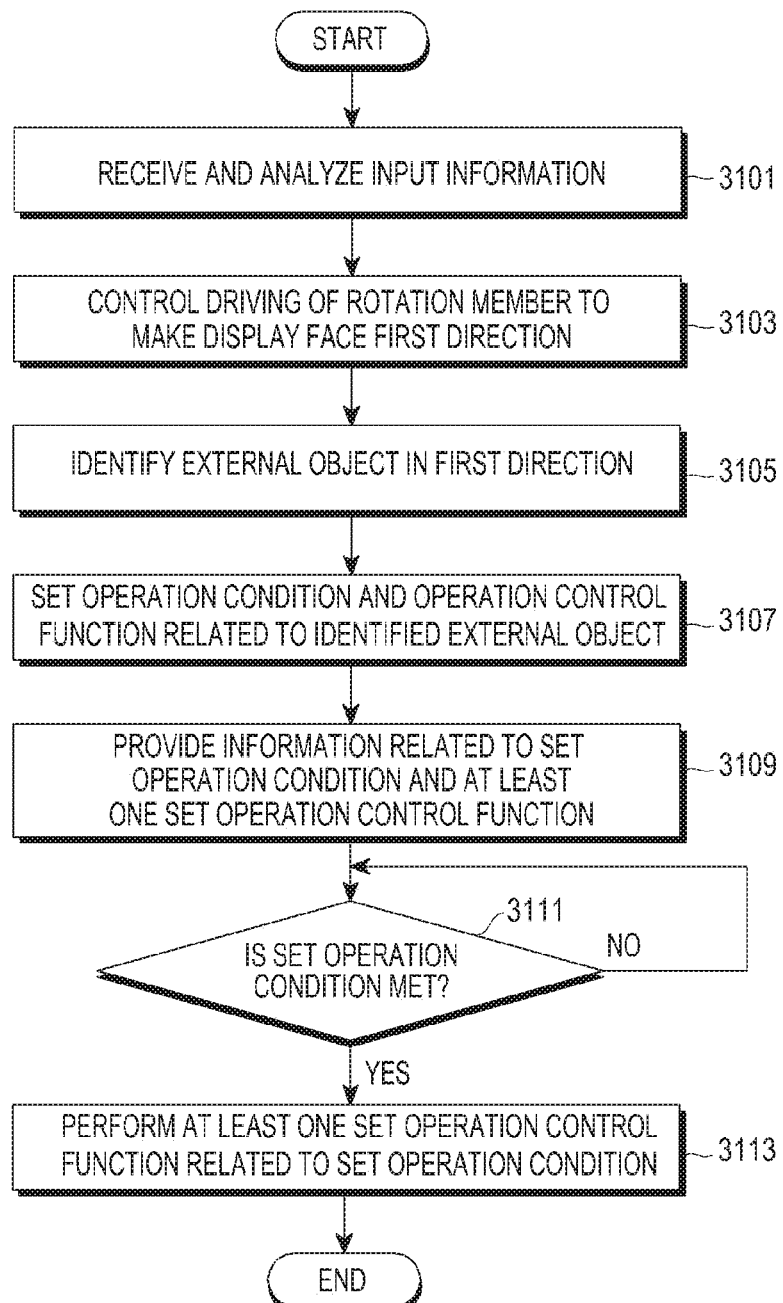
FIG. 31 is a flowchart of a method of an electronic device according to an embodiment of the present disclosure.

FIG. 31 is a flowchart of a method of an electronic device according to an embodiment of the present disclosure.

Referring to FIG. 31, the electronic device (the electronic device 101 of FIG. 1 or the electronic device 700 of FIG. 7) may receive input information for initiating an interaction with the user in step 3101. The input information may include voice information of an external object (for example, the user or an object), information input from the external object through a button or a touch pad, detection information of a particular motion of the external object, and information received through an external network. Further, the electronic device may analyze the received input information and execute a corresponding application according to a result of the analysis. For example, if receiving the input information in an idle state, the electronic device may switch to an active state and execute the corresponding application corresponding to the received input information. Further, the electronic device may display an object related to the execution of the corresponding application on the display.

If the electronic device receives the input information and thus the corresponding application is executed, the electronic device may determine a movement direction of the display, that is, a first direction based on the received input information and control driving of the rotation member to make the display face the first direction in step 3103.

In step 3105, the electronic device may identify the external object located in the first direction through at least one sensor. The electronic device may receive a user's face image photographed by an image recognition module (for example, a camera), analyze the received face image, and extract information corresponding to the analyzed information from pre-registered and stored information on the external object, so as to identify the user. The electronic device may identify the external object through at least one of a user's face recognition, fingerprint recognition, iris recognition, authentication information (for example, password) authorization, and voice recognition.

In step 3107, the electronic device may set an operation condition and an operation control function related to the identified external object. Further, the electronic device may output voice information related to the set operation condition and the set operation control function through an audio module. The set operation control function may be set to be linked with the operation condition, and may include a function for controlling an operation of at least one external electronic device located around the electronic device or controlling an operation of at least one application executed in the electronic device.

In step 3107, if the information received from the external object is, for example, voice information, the electronic device may extract a sentence including a word related to the condition or the control from the received voice information through a voice analysis algorithm. The electronic device may set the operation condition based on the extracted sentence for the condition and set the operation control function based on the extracted sentence for the control.

In step 3107, in connection with the identified external object, the electronic device may generate conditional objects for setting the operation condition or objects related to a function for setting the operation control function based on context information collected through context recognition and display the generated conditional objects or objects related to the function on the display. The electronic device may select at least one of the conditional objects or the objects related to the function displayed on the display, and may set the operation condition based on the selected conditional object or set the operation control function based on the selected object related to the function.

In step 3109, the electronic device may provide information on the set operation condition and at least one set operation control function associated with the operation condition. The electronic device may display an object (for example, operation condition card) for the set operation condition and an object (for example, operation control function card) for the set operation control function on the display. Further, the electronic device may output voice information related to the set operation condition and the set operation control function through the audio module. The electronic device may generate an instruction card as an integrated instruction through a link of the set operation condition and the at least one set operation control function and store the generated instruction card as instruction information of the identified external object. The electronic device may display the generated instruction card or output the generated instruction card through voice information. By checking the displayed or output instruction card, the external object may change the operation condition and the operation control function included in the instruction card or make a request for adding a new operation condition or operation control function. If receiving the request, the electronic device may update the instruction card according to the request.

In step 3111, the electronic device may determine whether the set operation condition is met. If the set operation condition is met based on a result of the determination, the electronic device may perform step 3133. If the set operation condition is not met, the electronic device may perform step 3111 again.

In step 3133, the electronic device may execute at least one operation control function set to be linked to the set operation condition.

Before performing the operation control function (e.g., step 3113), the electronic device may grasp a current location of the external object and, if the external object is not located in an adjacent area (for example, within the home) limit the execution of the set operation control function.

FIGS. 32A to 32D illustrate examples of a display screen of an electronic device according to various embodiments of the present disclosure.

An example for providing the information related to the operation condition and the operation control function generated based on the operation procedure of the electronic device of FIG. 31 described above will be described with reference to FIGS. 32A to 32D. For example, the user will be described as the external object.

Figure 32A:
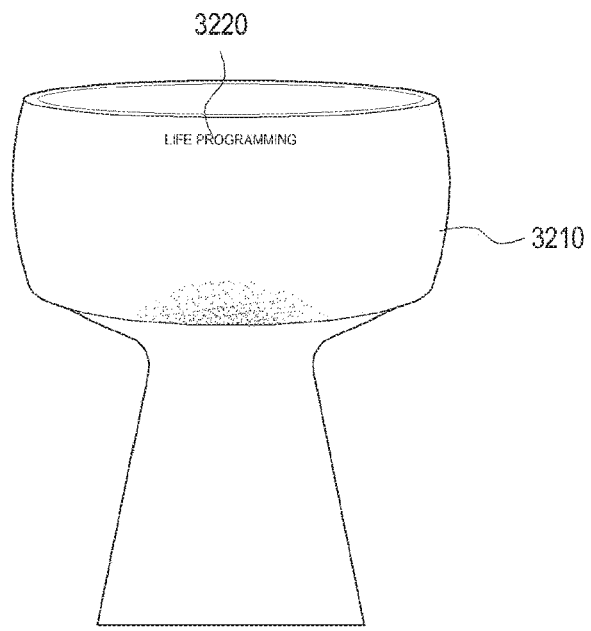
FIGS. 32A, 32B, 32C, and 32D illustrate examples of a display screen of an electronic device according to various embodiments of the present disclosure.

Referring to FIG. 32A, as the electronic device receives input information for initiating an interaction from the user in an idle state, the electronic device may execute an application for setting and performing an operation condition and an operation control function and display an object 3220 related to the executed application on a display 3210. Further, the electronic device may wait for the interaction by the user.

Figure 32B:
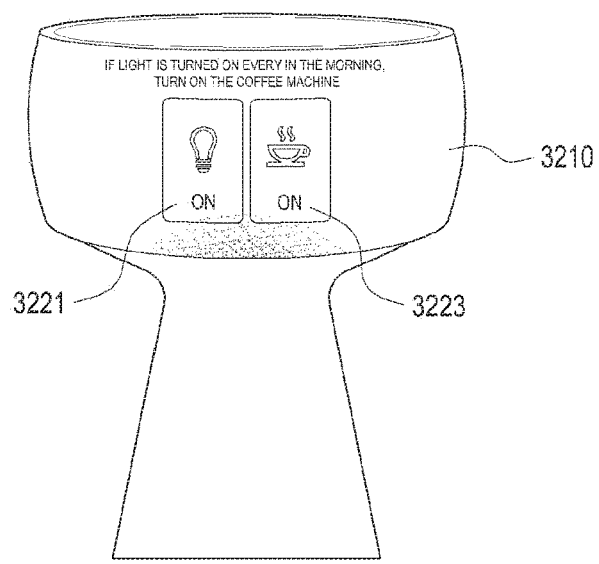

Referring to FIG. 32B, if the interaction by the identified user is generated, for example, if voice information (for example, "if light is turned on every in the morning, turn on the coffee machine") is input, the electronic device may display the input voice information on a current screen of the display 3210. The electronic device may analyze the voice information and extract a condition or a control instruction. The electronic device may provide information on the extracted condition or information on the extracted control instruction to the identified user as relevant information. For example, the electronic device may generate an operation condition card 3221 (for example, an object indicating turning-on of a light in the Mike's room) indicating the information on the extracted condition, and generate an operation control function card 3223 (for example, an object indicating the operation of the coffee machine) indicating the information on the extracted control instruction. The electronic device may display the generated operation condition card 3221 and the generated operation control function card 3223 on the display 3210.

Figure 32C:
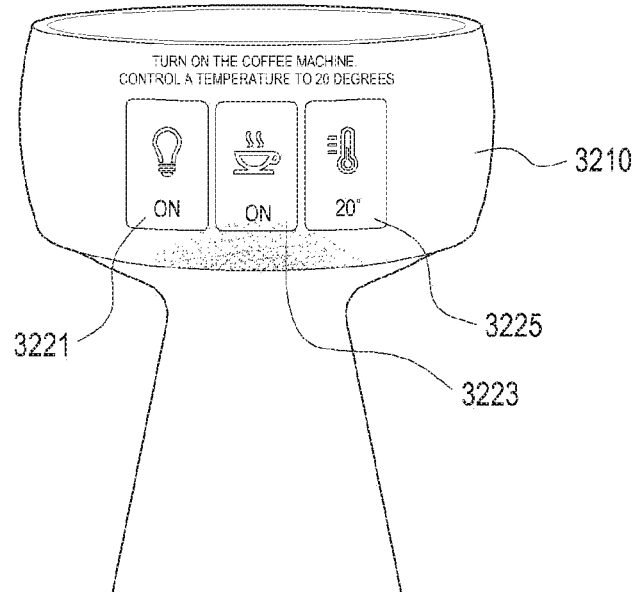

Referring to FIG. 32C, if information on an additional control instruction is generated after the generated operation condition card 3221 and the operation control function card 3223 are provided as illustrated in FIG. 32B, the electronic device may generate an additional operation control function card 3225 indicating information on the additional control instruction and display the generated additional operation control function card 3225 on the display 3210.

Figure 32D:
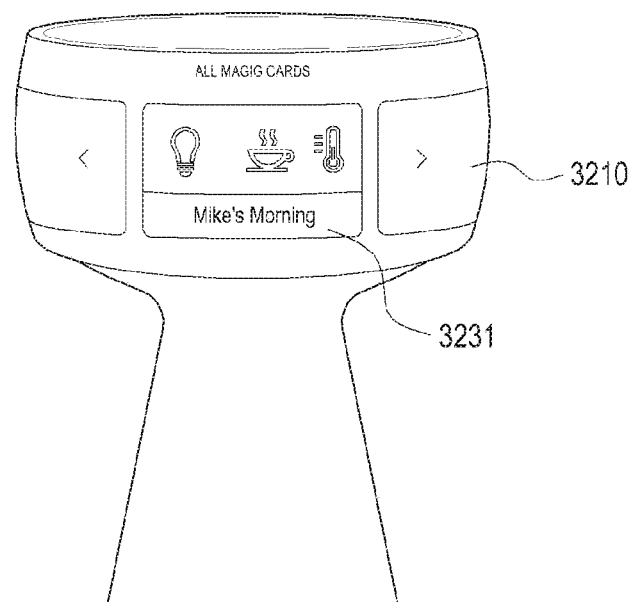

Referring to FIG. 32D, the electronic device may configure integrated instruction information by linking the generated operation condition card 3221 and the generated operation control function cards 3223 and 3225 as illustrated in FIG. 32C and display an instruction card 3231 indicating the configured instruction information on the display 3210.

Figure 33:
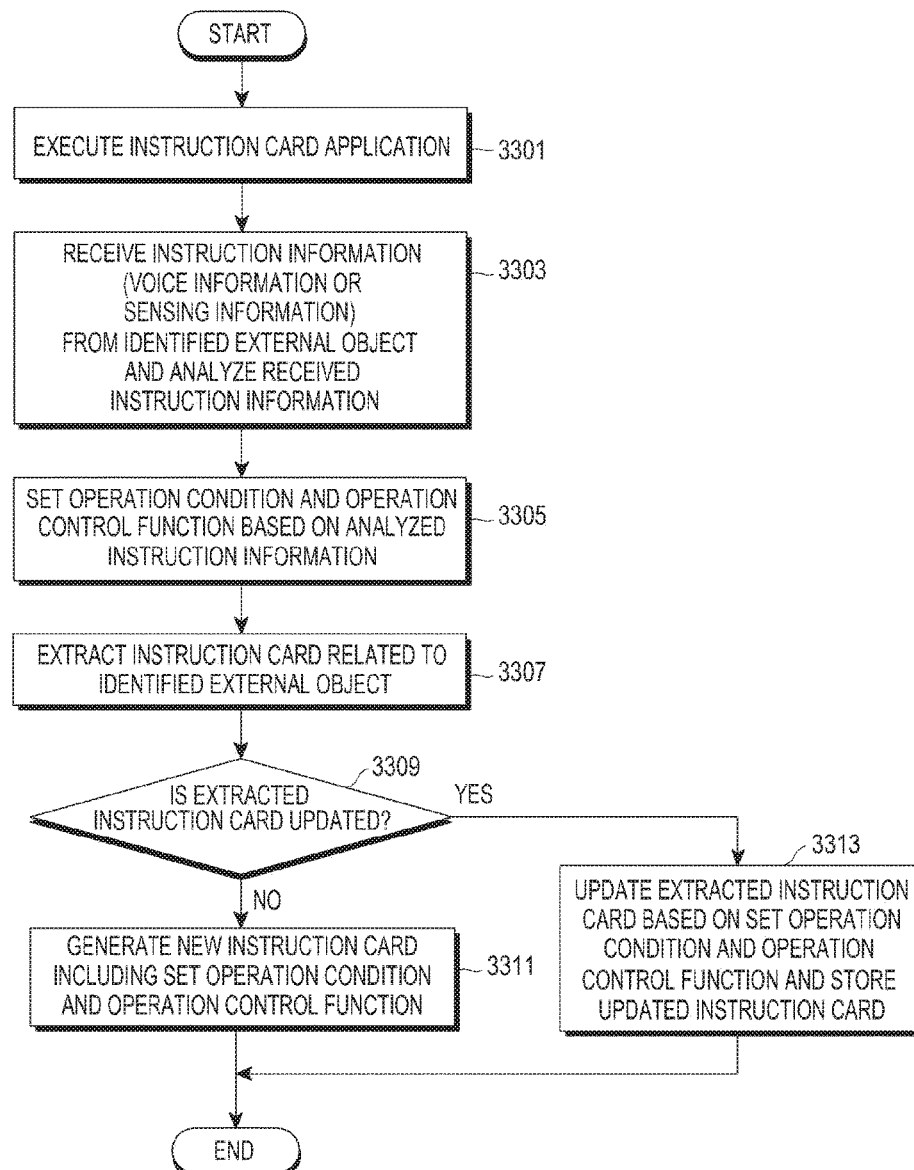
FIG. 33 is a flowchart of a method of an electronic device according to an embodiment of the present disclosure.

FIG. 33 is a flowchart of a method of an electronic device according to various embodiments of the present disclosure.

Referring to FIG. 33, as the electronic device receives input information for initiating an interaction, the electronic device may execute an application (for example, an instruction card application) for setting instruction information in step 3301.

In step 3303, the electronic device may receive interaction information for generating an instruction card through the interaction with the identified external object, analyze the received interaction information, and extract information on a condition or/and a control instruction from the interaction information. For example, the interaction information may be voice information received from the external object or sensing information detected by at least one sensor.

In step 3305, the electronic device may set an operation condition and an operation control function based on information on the extracted condition or/and control instruction. The description of step 3305 may be the same as or similar to the detailed description of step 3107 of FIG. 31 for setting the operation condition and the operation control function.

In step 3307, the electronic device may search for at least one instruction card previously generated to be linked with the identified external object. If searching for at least one previously generated instruction card, the electronic device may search for instruction cards including information that is the same as or similar to at least one of the set operation condition and the set operation control function.

In step 3309, the electronic device may determine whether to update the found instruction card. If it is determined to update the instruction card, the electronic device may perform step 3313. If it is determined to not update the instruction card, the electronic device may perform step 3311.

In step 3311, the electronic device may generate and store an instruction card indicating integrated instruction information through the link of the set operation condition and the set operation control function and provide the generated instruction card.

In step 3313, the electronic device may update the found instruction card based on the set operation condition and the set operation control function and store the updated instruction card in the memory.

Figure 34:
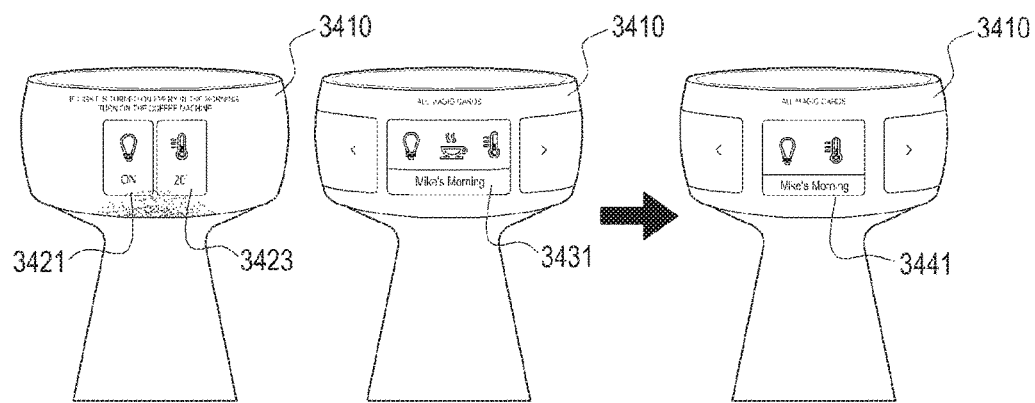
FIG. 34 illustrates an example of a display screen of an electronic device according to an embodiment of the present disclosure.

FIG. 34 illustrates an example of a display screen of an electronic device according to various embodiments of the present disclosure.

An example for providing the information related to the operation condition and the operation control function generated based on the operation procedure of the electronic device of FIG. 33 described above will be described with reference to FIG. 34. For example, the user will be described as the external object.

Referring to FIG. 34, according to various embodiments of the present disclosure, the electronic device may receive, for example, voice information from the user as interaction information, generate an operation condition card 3421 (for example, an object indicating turning-on of a light in the Mike's room) indicating information on a condition extracted from the voice information, and generate an operation control function card 3423 (for example, an object indicating a temperature control to 20 degrees) indicating information on an extracted control instruction. The electronic device may display the generated operation condition card 3421 and the generated operation control function card 3423 on the display 3410.

The electronic device may search for an instruction card related to at least one of the generated operation condition card 3421 and the generated operation control function card 3423 and display the found instruction card 3431 on the display 3410. If displaying the found instruction card 3431, the electronic device may move the displayed operation condition card 3421 and operation control function card 3423 to disappear from the display 3410 through the page turning effect as illustrated in FIGS. 14A to 15B or may display the operation condition card 3421 and the operation control function card 3423 in a display area spaced far away from the display area of the current direction (for example, first direction). Then, the electronic device may display the found instruction card 3431 in the display area of the current direction.

The electronic device may identify that an operation condition included in the found instruction card 3431 matches the operation condition card 3421, configure integrated instruction information by changing an operation control function linked to the included operation condition to the generated operation control function card 3423, and update the found instruction card 3441 to include the configured instruction information.

Figure 35:
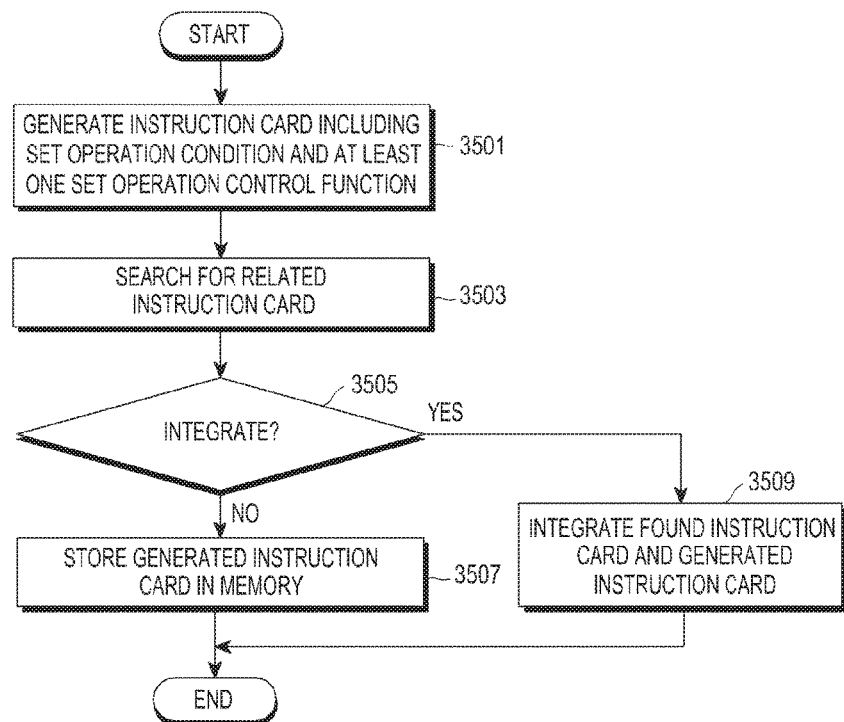
FIG. 35 is a flowchart of a method of an electronic device according to an embodiment of the present disclosure.

FIG. 35 is a flowchart of a method of an electronic device according to various embodiments of the present disclosure.

If the electronic device receives interaction information if executing an application (for example, an instruction card application) for setting instruction information, the electronic device may extract information on a condition or/and a control instruction from the received interaction information and set an operation condition and an operation control function based on the extracted information on the condition or/and the control instruction (for example, the same as or similar to steps 3301 to 3305 of FIG. 33).

Referring to FIG. 35, in step 3501, the electronic device may generate an instruction card including the set operation condition and at least one set operation control function. The electronic device may configure instruction information by integrating the at least one set operation control function liked to the set operation condition and generate an instruction card (hereinafter, referred to as a first instruction card) including the configured instruction information.

In step 3503, the electronic device may search for at least one instruction card previously generated in connection with the identified external object (hereinafter, referred to as a second instruction card). If searching for the second instruction card, the electronic device may search for a second instruction card including information that is the same as or similar to at least one of the operation condition and the operation control function included in the first instruction card.

In step 3305, the electronic device may determine whether to integrate the generated first instruction card and the found second instruction card. The electronic device may perform step 3507 if it is determined to not integrate the two instruction cards, and perform step 3509 if it is determined to integrate the two instruction cards.

In step 3507, the electronic device may store the first instruction card in the memory as instruction information of the identified external object.

In step 3509, the electronic device may generate a new third instruction card by integrating the first instruction card and the second instruction card and store the generated third instruction card in the memory as instruction information of the identified external object. The first instruction card may not be stored and the second instruction card may be deleted or maintained.

Figure 36:
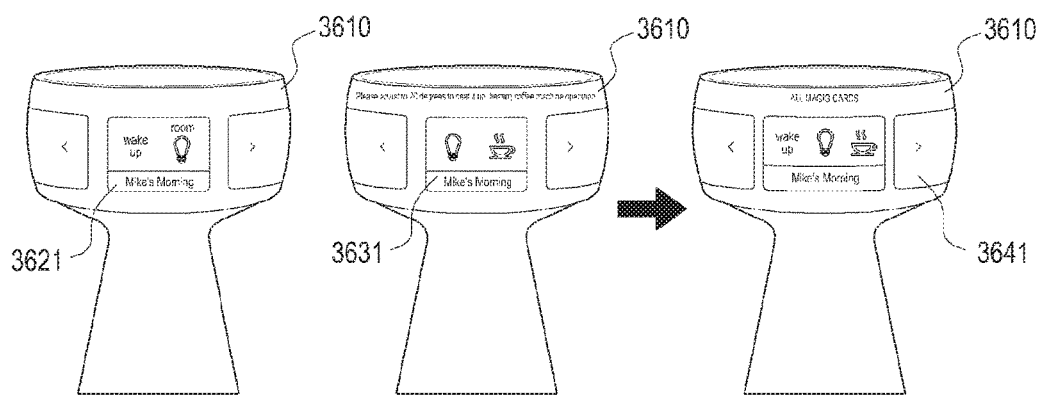
FIG. 36 illustrates an example of a display screen of an electronic device according to an embodiment of the present disclosure.

FIG. 36 illustrates an example of a display screen of an electronic device according to various embodiments of the present disclosure.

An example for providing the information related to the operation condition and the operation control function generated based on the operation procedure of the electronic device of FIG. 35 described above will be described with reference to FIG. 36. For example, the user will be described as the external object.

Referring to FIG. 36, according to various embodiments of the present disclosure, the electronic device may receive, for example, voice information from the user as interaction information, configure integrated instruction information by linking an operation condition (for example, an object indicating a wake-up alarm of Mike) indicating information on a condition extracted from the voice information and an operation control function (for example, an object for turning on light in a bedroom) indicating information on an extracted control instruction, and generate a first instruction card 3621 including the configured instruction information in a card form. The electronic device may display the generated first instruction card 3621 on a display 3610.

The electronic device may search for an instruction card related to the identified external object. The electronic device may search for a second instruction card related to at least one of the operation condition and the operation control function included in the first instruction card 3621. The electronic device may display at least one found second instruction card 3631 on the display 3610. If the number of pre-found second instruction cards 3631 is plural, the electronic device may display the plurality of second instruction cards 3631 through the paging turning effect as illustrated in FIGS. 14A to 15B.

Referring to FIG. 36, the electronic device may generate a new third instruction card 3641 by integrating an operation condition and an operation control function included in the first instruction card 3621, and an operation condition (e.g., an object indicating a condition for turning on light in a Mike's bedroom) and an operation control function (for example, an object indicating an operation of a coffee machine) included in the found second instruction cards 3631. As the operation control function (for example, the object indicating turning-on of a light in the bedroom) included in the first instruction card 3621 is the same or similar, the electronic device may set the operation condition (the object indicating the condition for the wake-up alarm of Mike) of the first instruction card as an operation condition of the third instruction card 3641 and set an operation control function linked to the set operation condition. The electronic device may set operation control functions linked to the set operation condition by integrating the operation control function (for example, the object indicating the turning-on of a light in the bedroom) of the first instruction card 3621 and the operation control function (for example, the object indicating the operation of the coffee machine) of the second instruction card 3631. The electronic device may configure instruction information including the set operation condition and operation control functions linked to the operation condition and display the third instruction card 3641 generated from the configured instruction information in a card form on the display 3610.

Figure 37:
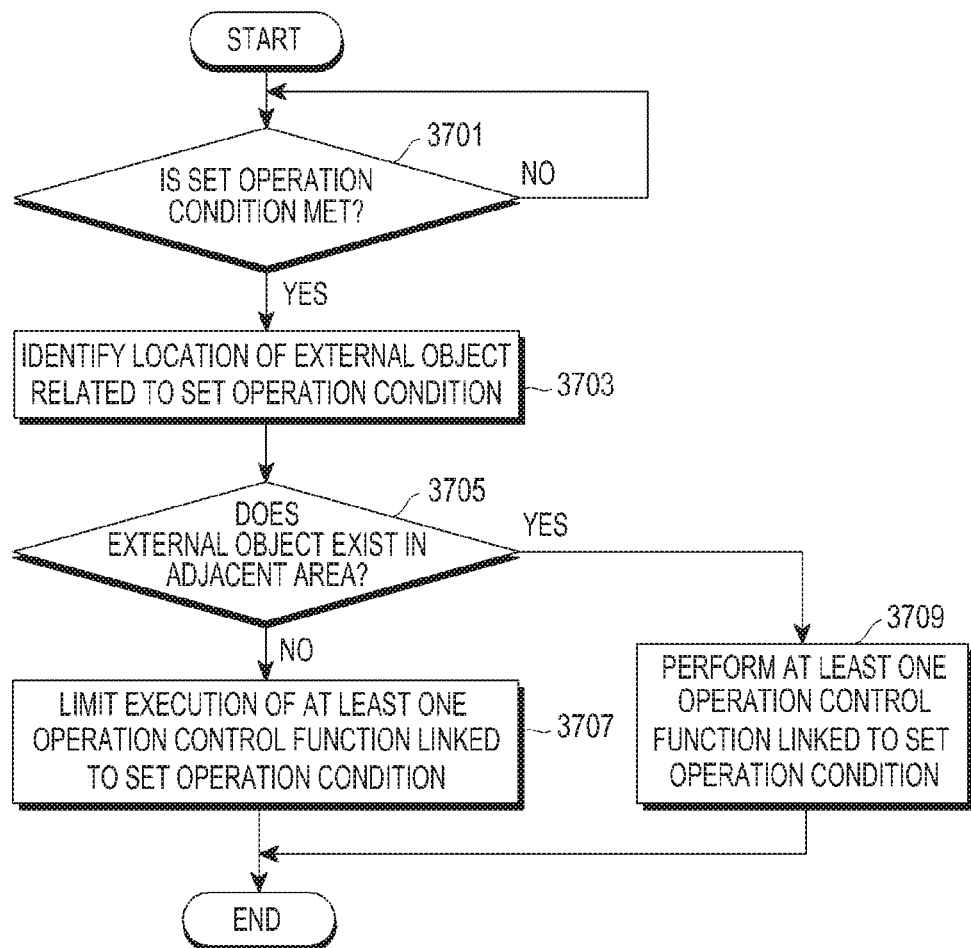
FIG. 37 is a flowchart of a method of an electronic device according to an embodiment of the present disclosure.

FIG. 37 is a flowchart of a method of an electronic device according to various embodiments of the present disclosure.

Referring to FIG. 37, the electronic device may identify whether the operation condition set in at least one of the operation procedures of FIGS. 31, 33, and 35 is met in operation 3701. If the set operation condition is met based on a result of the identification, the electronic device may perform step 3703. If the set operation condition is not met, the electronic device may perform step 3701 again.

If the set operation condition is met, the electronic device may determine a corresponding external object corresponding to the set operation condition and track a location of the determined external object in step 3703. The electronic device may identify the external object based on sensing information detected through at least one sensor or collected context information.

In step 3705, the electronic device may determine whether the external object exists in an adjacent area (for example, within the home). The electronic device may perform step 3707 if the external object does not exist in the adjacent area based on a result of the determination, and perform step 3709 if the external object exists in the adjacent area.

As the electronic device determines that the external object does not exist in the adjacent area, the electronic device may limit execution of at least one operation control function linked to the set operation condition in step 3707. While displaying the instruction card including the set operation condition on the display, the electronic device may display information indicating that the operation control function included in the instruction card cannot be executed and then switch to an idle state after a predetermined time passes. At this time, the electronic device may transmit, to the external object, a notification message indicating that the instruction card or the operation control function included in the instruction card is not executed. For example, if the external object is the user, the electronic device may transmit the notification message to a mobile phone of the user. According to various embodiments, if the electronic device is interacting with another external object, the electronic device may not display the instruction card for the set operation condition and a relevant object.

As it is determined that the external object exist in the adjacent area, the electronic device may execute at least one operation control function linked to the set operation condition in step 3709. The electronic device may display the instruction card including the set operation condition and the object related to the execution of the operation control function on the display or output the instruction card and the object as audio information.

A method of providing information in an electronic device including a rotation member, a rotation support member configured to support the rotation member, and a body including a driving module for moving the rotation member according to one of the various embodiments of the present disclosure may include an operation of controlling a movement of the rotation member to make a display (a screen of the display) coupled to a surface of the rotation member face a first direction in which an external object is located, an operation of identifying the external object located in the first direction through at least one sensor, an operation of setting an operation condition related to the identified external object and at least one operation control function based on information received according to performance of an interaction with the identified external object, and an operation of providing information related to the set operation condition and the at least one set operation control function.

The method may further include an operation of, if the set operation condition is met, performing the at least one set operation control function according to the set operation condition.

The operation of identifying the external object may include an operation of, if the display moves to face the first direction, controlling a movement of the rotation member again to face a second direction for identifying the external object and an operation of, if the display faces the second direction, identifying the external object facing the display through at least one sensor.

The operation of setting the operation condition and the at least one operation control function related to the identified external object may include an operation of receiving voice information from the identified external object, an operation of acquiring a conditional sentence including a word related to a condition from the received voice information, an operation of setting the operation condition based on the acquired conditional sentence, an operation of acquiring a control sentence including a word related to a control from the received voice information, and an operation of setting the at least one operation control function based on the acquired control sentence.

The operation of setting the operation condition and the at least one operation control function related to the identified external object may include an operation of collecting context information through context recognition in connection with the identified external object, an operation of generating conditional objects for setting the operation condition or objects related to a function for setting the operation control function based on the collected context information, and an operation of displaying the generated conditional objects or the objects related to the function on the display.

The operation of setting the operation condition and the at least one operation control function related to the identified external object may further include an operation of selecting at least one conditional object from the conditional objects for setting the operation condition displayed on the display and an operation of setting a condition indicated by the selected conditional object as the operation condition.

The operation of setting the operation condition and the at least one operation control function related to the identified external object may further include an operation of selecting at least one object from the objects related to the function for setting the operation control function displayed on the display and an operation of setting a function indicated by the selected object as the operation control function.

The operation of providing the information related to the set operation condition and the at least one set operation control function may include an operation of configuring integrated instruction information by liking the set operation condition and the at least one set operation control function, an operation of generating an instruction card including the configured instruction information in a card form, and an operation of displaying the generated instruction card on the display.

The operation of providing the information related to the set operation condition and the at least one set operation control function may further include an operation of searching for at least one instruction card related to the set operation condition or the set operation control function and an operation of updating the found instruction card based on the set operation condition or the set operation control function.

The operation control function may include a function for controlling an operation of at least one external electronic device located around the electronic device or an operation for at least one application executed in the electronic device.

Figure 38:
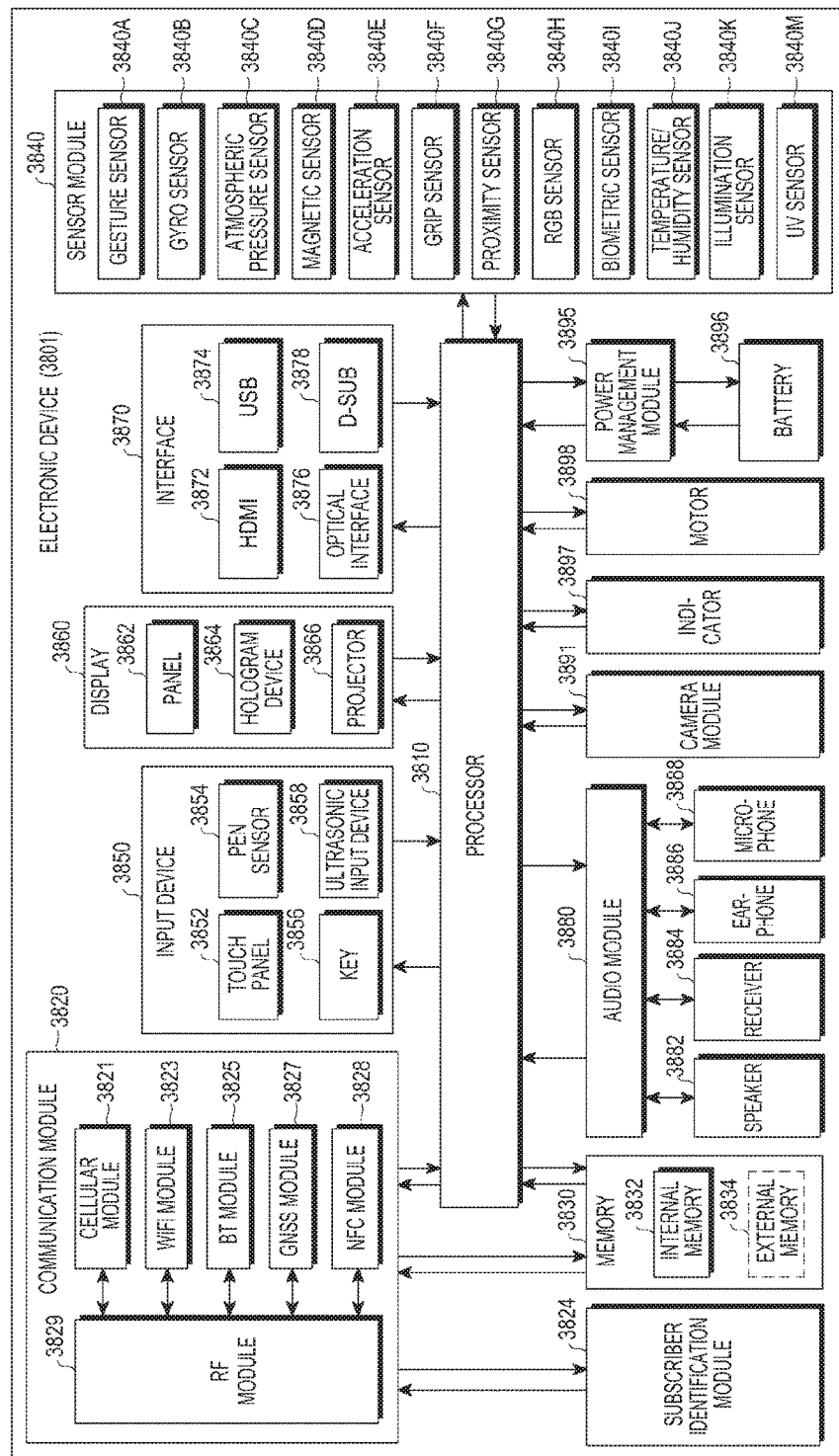
FIG. 38 is a block diagram of an electronic device according to an embodiment of the present disclosure.

FIG. 38 is a block diagram of an electronic device according to an embodiment of the present disclosure. The electronic device 3801 may include, for example, the whole or part of the electronic device 101 illustrated in FIG. 1. The electronic device 3801 may include at least one processor 3810 (e.g., an AP), a communication module 3820, a subscriber identification module 3824, a memory 3830, a sensor module 3840, an input device 3850, a display 3860, an interface 3870, an audio module 3880, a camera module 3891, a power management module 3895, a battery 3896, an indicator 3897, and a motor 3898.

The processor 3810 may control a plurality of hardware or software elements connected thereto and may perform various data processing and operations by driving an operating system or an application program. The processor 3810 may be embodied, for example, as a system on chip (SoC). The processor 3810 may further include a graphics processing unit (GPU) and/or an image signal processor. The processor 3810 may also include at least some (for example, a cellular module 3821) of the elements illustrated in FIG. 38. The processor 3810 may load, in a volatile memory, instructions or data received from at least one of the other elements (for example, a non-volatile memory) to process the loaded instructions or data, and may store various types of data in the non-volatile memory.

The communication module 3820 may have a configuration equal or similar to that of the communication interface 170 of FIG. 1. The communication module 3820 may include, for example, the cellular module 3821, a Wi-Fi module 3823, a BT module 3825, a GNSS module 3827 (for example, a GPS module, a Glonass module, a Beidou module, or a Galileo module), an NFC module 3828, and a radio frequency (RF) module 3829.

The cellular module 3821 may provide, for example, a voice call, a video call, a text message service, an Internet service, or the like through a communication network. The cellular module 3820 may identify and authenticate the electronic device 3801 within a communication network using the subscriber identification module 3824 (for example, a SIM card). The cellular module 3821 may perform at least some of the functions that the processor 3810 may provide. The cellular module 3821 may include a CP.

The Wi-Fi module 3823, the BT module 3825, the GNSS module 3827, or the NFC module 3828 may include, for example, a processor for processing data that is transmitted and received through the corresponding module. At least some (for example, two or more) of the cellular module 3821, the Wi-Fi module 3823, the BT module 3825, the GNSS module 3827, and the NFC module 3828 may be included in one integrated circuit (IC) or IC package.

The RF module 3829, for example, may transmit/receive a communication signal (for example, an RF signal). The RF module 3829 may include, for example, a transceiver, a power amplifier module (PAM), a frequency filter, a low noise amplifier (LNA), an antenna, and the like. At least one of the cellular module 3821, the Wi-Fi module 3823, the BT module 3825, the GNSS module 3827, and the NFC module 3828 may transmit/receive an RF signal through a separate RF module.

The subscriber identification module 3824 may include, for example, a card that includes a subscriber identification module and/or an embedded SIM, and may contain unique identification information (for example, an IC card identifier (ICCID)) or subscriber information (for example, an international mobile subscriber identity (IMP).

The memory 3830 (for example, the memory 130) may include, for example, an internal memory 3832 or an external memory 3834. The internal memory 3832 may include, for example, at least one of a volatile memory (for example, a dynamic random access memory (DRAM), a static RAM (SRAM), a synchronous DRAM (SDRAM), and the like) and a non-volatile memory (for example, a one-time programmable ROM (OTPROM), a programmable ROM (PROM), an erasable PROM (EPROM), an electrically erasable PROM (EEPROM), a mask ROM, a flash ROM, a flash memory (for example, a NAND flash memory or a NOR flash memory), a hard disc drive, a solid state drive (SSD), and the like).

The external memory 3834 may further include a flash drive, for example, a compact flash (CF), an SD, a micro SD (Micro-SD), a mini SD (Mini-SD), an xD, an MMC, a memory stick, or the like. The external memory 3834 may be functionally and/or physically connected to the electronic device 3801 through various interfaces.

The sensor module 3840 may, for example, measure a physical quantity or detect the operating state of the electronic device 3801 and may convert the measured or detected information into an electrical signal. The sensor module 3840 may include, for example, at least one of a gesture sensor 3840A, a gyro sensor 3840B, an atmospheric pressure sensor 3840C, a magnetic sensor 3840D, an acceleration sensor 3840E, a grip sensor 3840F, a proximity sensor 3840G, a color sensor 840H (for example, an RGB sensor), a biometric sensor 3840I, a temperature/humidity sensor 3840J, an illumination sensor 3840K, and a ultraviolet (UV) light sensor 3840M. Additionally or alternatively, the sensor module 3840 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 3840 may further include a control circuit for controlling one or more sensors included therein. The electronic device 3801 may further include a processor, which is configured to control the sensor module 3840, as a part of the processor 3810 or separately from the processor 120 in order to control the sensor module 3840 while the processor 3810 is in a reduced power or sleep state.

The input device 3850 may include, for example, a touch panel 3852, a (digital) pen sensor 3854, a key 3856, or an ultrasonic input device 3858. The touch panel 3852 may use, for example, at least one of a capacitive type, a resistive type, an infrared type, and an ultrasonic type. Furthermore, the touch panel 3852 may further include a control circuit. The touch panel 3852 may further include a tactile layer to provide a tactile reaction to a user.

The (digital) pen sensor 3854 may include, for example, a recognition sheet that is a part of, or separate from, the touch panel. The key 3856 may include, for example, a physical button, an optical key, or a keypad. The ultrasonic input device 3858 may detect ultrasonic waves, which are generated by an input tool, through a microphone (for example, a microphone 3888) to identify data corresponding to the detected ultrasonic waves.

The display 3860 (for example, the display 160) may include a panel 3862, a hologram device 3864 or a projector 3866. The panel 3862 may have a configuration that is the same as, or similar to, that of the display 160 illustrated in FIG. 1. The panel 3862 may be implemented to be, for example, flexible, transparent, or wearable. The panel 3862, together with the touch panel 3852, may be implemented as one module. The hologram device 3864 may show a three dimensional image in the air by using an interference of light. The projector 3866 may display an image by projecting light onto a screen. The screen may be located, for example, in the interior of, or on the exterior of, the electronic device 3801. The display 3860 may further include a control circuit for controlling the panel 3862, the hologram device 3864, or the projector 3866.

The interface 3870 may include, for example, an HDMI 3872, a USB 3874, an optical interface 3876, or a D-sub-miniature (D-sub) connector 3878. The interface 3870 may be included, for example, in the communication interface 170 illustrated in FIG. 1. Additionally or alternatively, the interface 3870 may include, for example, a mobile high definition link (MHL) interface, an SD card/MMC card interface, or an Infrared Data Association (IrDA) standard interface.

The audio module 3880 may convert, for example, a sound into an electrical signal, and vice versa. At least some elements of the audio module 3880 may be included, for example, in the input/output interface 150 illustrated in FIG. 1. The audio module 3880 may process sound information that is input or output through, for example, a speaker 3882, a receiver 3884, an earphone 3886, the microphone 3888, and the like.

The camera module 3891 is a device that can photograph a still image and a dynamic image. The camera module 3891 may include one or more image sensors (for example, a front sensor or a rear sensor), a lens, an ISP, or a flash (for example, an LED, a xenon lamp, and the like).

The power management module 3895 may manage, for example, the power of the electronic device 3801. The power management module 3895 may include a power management IC (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 3896 and a voltage, current, or temperature while charging. The battery 3896 may include, for example, a rechargeable battery and/or a solar battery.

The indicator 3897 may indicate a particular state (for example, a booting state, a message state, a charging state, and the like) of the electronic device 3801 or a part (for example, the processor 3810) thereof. The motor 3898 may convert an electrical signal into a mechanical vibration and may generate a vibration, a haptic effect, and the like. The electronic device 3801 may include a processing unit (for example, a GPU) for supporting mobile TV. The processing unit for supporting the mobile TV may process media data according to a standard, such as digital multimedia broadcasting (DMB), digital video broadcasting (DVB), Media-Flom, and the like.

Each of the above-described component elements of hardware according to the present disclosure may be configured with one or more components, and the names of the corresponding component elements may vary based on the type of electronic device. The electronic device may include at least one of the aforementioned elements. Some elements may be omitted or other additional elements may be further included in the electronic device. Also, some of the hardware components may be combined into one entity, which may perform functions identical to those of the relevant components before the combination.

Figure 39:
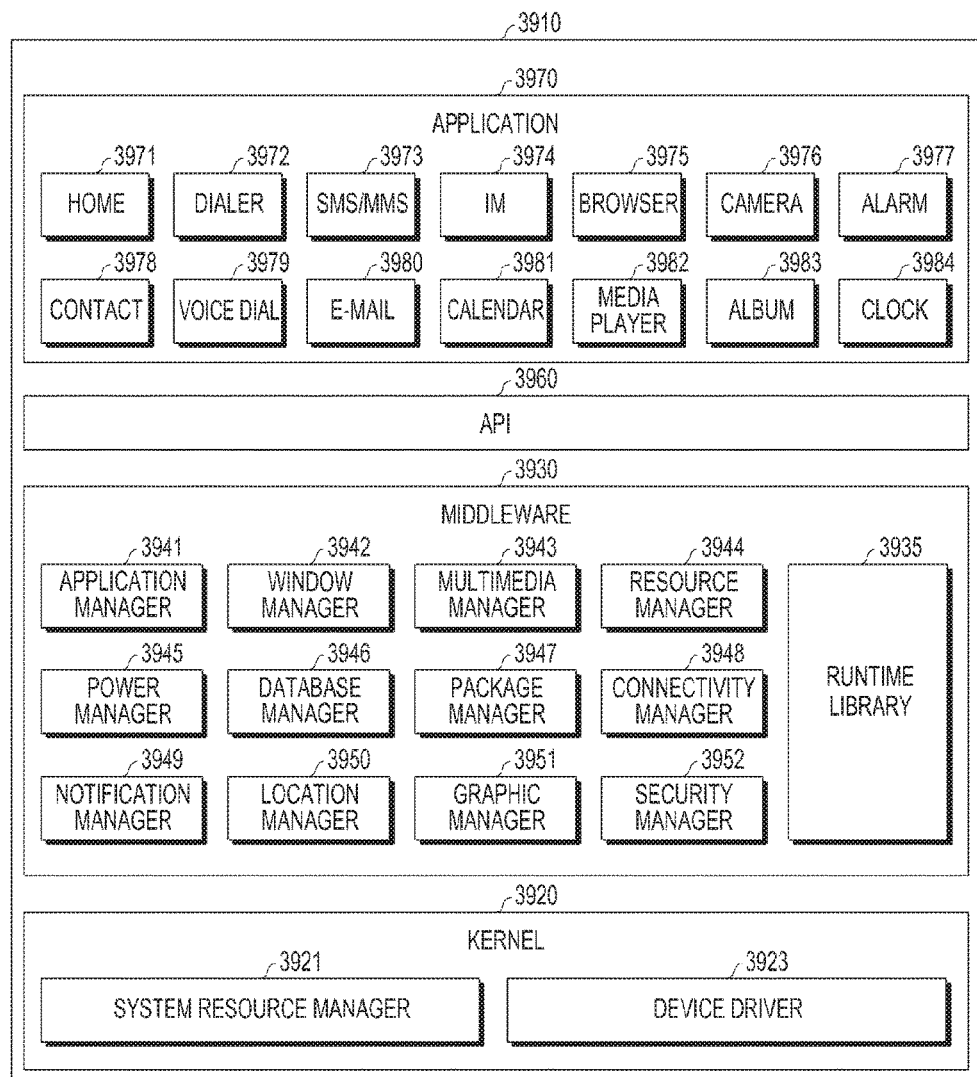
FIG. 39 is a block diagram of a program module according to an embodiment of the present disclosure.

FIG. 39 is a block diagram of a program module according to an embodiment of the present disclosure.

Referring to FIG. 39, the program module 3910 (for example, the program 140) may include an OS that controls resources relating to an electronic device (for example, the electronic device 101) and/or various applications (for example, the application programs 147) that are executed in the OS. The OS may be, for example, Android®, iOS®, Windows®, Symbian®, Tizen®, Bada™, and the like The program module 3910 may include a kernel 3920, middleware 3930, an API 3960, and/or an application 3970. At least a part of the program module 3910 may be preloaded on the electronic device, or may be downloaded from an external electronic device (for example, the electronic device 102 or 104, or the server 106).

The kernel 3920 (for example, the kernel 141) may include, for example, a system resource manager 3921 and/or a device driver 3923. The system resource manager 3921 may control, allocate, or retrieve system resources. The system resource manager 3921 may include a process manager, a memory manager, or a file system manager. The device driver 3923 may include, for example, a display driver, a camera driver, a Bluetooth driver, a shared memory driver, a USB driver, a keypad driver, a Wi-Fi driver, an audio driver, or an inter-process communication (IPC) driver.

The middleware 3930 may provide a function required by the application 3970 in common or provide various functions to the application 3970 through the API 3960 so that the application 3970 may efficiently use limited system resources within the electronic device. The middleware 3930 (for example, the middleware 143) may include, for example, at least one of a runtime library 3935, an application manager 3941, a window manager 3942, a multimedia manager 3943, a resource manager 3944, a power manager 3945, a database manager 3946, a package manager 3947, a connectivity manager 3948, a notification manager 3949, a location manager 3950, a graphic manager 3951, and a security manager 3952.

The runtime library 3935 may include, for example, a library module that a compiler uses in order to add a new function through a programming language while the application 3970 are being executed. The runtime library 3935 may perform input/output management, memory management, the functionality for an arithmetic function, and the like.

The application manager 3941 may manage, for example, the life cycle of at least one of the applications 3970. The window manager 3942 may manage graphical user interface (GUI) resources used on a screen. The multimedia manager 3943 may determine formats required to reproduce various media files and may encode or decode a media file using a coder/decoder (codec) appropriate for the corresponding format. The resource manager 3944 may manage resources, such as the source code, the memory, the storage space, and the like of at least one of the applications 3970.

The power manager 3945 may operate together with, for example, a basic input/output system (BIOS) to manage a battery or power and provide power information required for the operation of the electronic device. The database manager 3946 may generate, search for, or change a database to be used by at least one of the applications 3970. The package manager 3947 may manage the installation or update of an application that is distributed in the form of a package file.

The connectivity manager 3948 may manage a wireless connection, such as Wi-Fi, Bluetooth, and the like. The notification manager 3949 may display or notify of an event, such as an arrival message, an appointment, a proximity notification, and the like, in such a manner that a user is not disturbed. The location manager 3950 may manage the location information of the electronic device. The graphic manager 3951 may manage a graphic effect to be provided to a user or a user interface relating to the graphic effect.

The security manager 3952 may provide various security functions required for system security, user authentication, and the like. In a case where the electronic device (for example, the electronic device 101) has a telephone call function, the middleware 3930 may further include a telephony manager for managing a voice or video call function of the electronic device.

The middleware 3930 may include a middleware module that forms a combination of various functions of the above-described elements. The middleware 3930 may provide specialized modules according to the types of operating systems in order to provide differentiated functions. Furthermore, the middleware 3930 may dynamically remove some of the existing elements, or may add new elements.

The API 3960 (for example, the API 145) is, for example, a set of API programming functions, and may be provided with different configurations according to operating systems. For example, in the case of Android® or iOS®, one API set may be provided for each platform, and in the case of Tizen®, two or more API sets may be provided for each platform.

The application 3970 (for example, the application programs 147) may include one or more applications that can perform functions, for example, a home application 3971, a dialer application 3972, an SMS/MMS application 3973, an instant messaging (IM) application 3974, a browser application 3975, a camera 3976, an alarm application 3977, a contacts application 3978, a voice dial application 3979, an e-mail application 3980, a calendar application 3981, a media player application 3982, an album application 3983, a clock application 3984, a health care application (for example, measuring an quantity of exercise or a blood sugar level), and provision of environmental information (for example, atmospheric pressure, humidity, temperature information, and the like).

The application 3970 may include an application (e.g., information exchange application) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

The application 3970 may include applications (for example, a health care application of a mobile medical appliance, and the like) that are specified according to attributes of an external electronic device (for example, the electronic device 102 or 104). The application 3970 may include an application received from the external electronic device (for example, the server 106, or the electronic device 102 or 104). The application 3970 may include preloaded applications or third-party applications that can be downloaded from a server. Names of the elements of the program module 3910, according to the above-described embodiments of the present disclosure, may change depending on the type of OS.

At least a part of the program module 3910 may be implemented in software, firmware, hardware, or a combination of two or more thereof. At least some of the program module 3910 may be implemented (for example, executed) by, for example, the processor (for example, the processor 710). At least some of the program module 3910 may include, for example, a module, a program, a routine, a set of instructions, and/or a process for performing one or more functions.

The term "module" as used herein may, for example, indicate a unit including one of hardware, software, and firmware or a combination of two or more of them. The term "module" may be interchangeably used with, for example, the terms "unit", "logic", "logical block", "component", and "circuit". The term "module" may indicate a minimum unit of an integrated component element or a part thereof. The term "module" may indicate a minimum unit for performing one or more functions or a part thereof. The term "module" may indicate a device that may be mechanically or electronically implemented. For example, the term "module" may indicate a device that includes at least one of an application specific IC (ASIC), a field programmable gate array (FPGA), and a programmable-logic device for performing operations which has been known or are to be developed hereinafter.

At least some of the devices (for example, modules or functions thereof) or the method (for example, operations) may be implemented by a command stored in a non-transitory computer-readable storage medium in a programming module form. The instruction, if executed by a processor (e.g., the processor 120), may cause the one or more processors to execute the function corresponding to the instruction. The non-transitory computer-readable storage medium may be, for example, the memory 130.

The non-transitory computer-readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high level language code, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. A non-transitory computer-readable recording medium having a program therein to be executed on a computer is provided. The program may include executable instructions to cause, if being executed by a processor, the processor to perform operations. The operations may include an operation of, if input information is received, controlling driving of the rotation member to make a display coupled to the rotation member corresponding to the received input information face a first direction, an operation of, if the display moves to face the first direction, controlling the driving of the rotation member to face a second direction for identifying an external object, an operation of, if the display is located to face the external object in the second direction, identifying the external object, and an operation of displaying information on at least one function executed in connection with the identified external object on the display.

Various embodiments disclosed herein are provided merely to easily describe technical details of the present disclosure and to help the understanding of the present disclosure, and are not intended to limit the scope of the present disclosure. Accordingly, it is intended that the present disclosure include all modifications or various other embodiments within the scope of the present disclosure, as defined by the appended claims and their equivalents.

What is claimed is:

1. An electronic device, comprising:
a rotation support member;
a support member configured to support the rotation support member;
a rotation member movably coupled to the rotation support member;
a display movably coupled to a surface of the rotation member;
a driving device configured to drive the display;
a memory; and
a processor,
wherein the processor is configured to control, if input information is received, driving of the rotation member to make the display corresponding to the received input information face a first direction,
control, if the display moves to face the first direction, driving the rotation member to face a second direction for identifying an external object,
identify, if the display is located to face the external object in the second direction, the external object, and
display information on at least one function executed in connection with the identified external object on the display.

2. The electronic device of claim 1, wherein, if the display moves in the first direction or the second direction in accordance with the driving of the rotation member in a state where previous information displayed in connection with the external object exists on the display, the processor is further configured to change a display location of at least one object for the previous information such that the at least one object for the displayed previous information is moved and displayed in a set direction according to movement of the display, and, if the display stops moving, change the display location of the at least one object to an original location.

3. The electronic device of claim 1, wherein, if the display moves in a third direction after the information on the at least one executed function is displayed on the display, the processor is further configured to change a display location of at least one object such that the at least one object for the information on the executed function is moved and displayed in a set direction according to movement of the display in the third direction, and, if the display stops moving, change the display location of the at least one object to an original location.

4. The electronic device of claim 1, wherein, if the at least one function related to the identified external object is executed, the processor is further configured to collect information related to the at least one executed function from surrounding electronic devices and provide information corresponding to context or interest of the external object based on the collected information.

5. The electronic device of claim 1, wherein, if the input information corresponds to a control instruction, the processor is further configured to execute an application for the control instruction and transmit control information for controlling a surrounding electronic device corresponding to the control instruction to the surrounding electronic device through the executed application.

6. The electronic device of claim 1, wherein the processor is further configured to measure a distance from the identified external object, execute another function related to the identified external object according to a value of the measured distance, and display information on the executed function on the display.

7. The electronic device of claim 1, wherein, if a notification event is generated while the function related to the external object is provided, the processor is further configured to determine a target external object of the notification event and control driving of the rotation member to make the display face a direction in which the determined target external object is located, and, if response information is received from the target external object, provide information on an executed function corresponding to the received response information.

8. The electronic device of claim 1, wherein, if the information on the at least one function includes a plurality of pages and the display moves in a requested direction according to a request for switching a displayed page, the processor is further configured to change a display location of a first page to make the first page displayed on the display disappear in the requested direction, and, if the display returns to an initial direction, change a display location of a second page to make the second page appear on the display from a direction opposite to the requested direction.

9. A method of an electronic device comprising a rotation support member; a support member configured to support the rotation support member; and a rotation member movably coupled to the rotation support member, the method comprising:
if input information is received, controlling, by a processor, driving of the rotation member to make a display coupled to the rotation member corresponding to the received input information face a first direction;
if the display moves to face the first direction, controlling, by the processor, the driving of the rotation member to face a second direction for identifying an external object;
if the display is located to face the external object in the second direction, identifying, by the processor, the external object; and
displaying, by the processor, information on at least one function executed in connection with the identified external object on the display.

10. The method of claim 9, further comprising:
if the display moves in the first direction or the second direction in accordance with the driving of the rotation member in a state where previous information displayed in connection with the external object exists on the display, changing, by the processor, a display location of at least one object for the previous information such that the at least one object for the displayed previous information is moved and displayed in a set direction according to the movement of the display; and
if the movement of the display stops, changing, by the processor, the display location of the at least one object to an original location.

11. The method of claim 9, further comprising:
if the display moves in a third direction after the information on the executed function is displayed on the display, changing, by the processor, the display location of the at least one object such that the at least one object for the information on the executed function is moved and displayed in a set direction according to the movement of the display; and if the movement of the display stops, changing, by the processor, the display location of the at least one object to an original location.

12. The method of claim 9, further comprising:
if the information on the at least one function includes a plurality of pages and the display moves in a requested direction according to a request for switching a displayed page, changing, by the processor, a display location of a first page to make the first page displayed on the display disappear in the requested direction; and
if the display returns to an initial direction, changing, by the processor, a display location of a second page to make the second page appear on the display from a direction opposite to the requested direction.

13. The method of claim 9, further comprising:
if the input information corresponds to a control instruction, executing, by the processor, an application for the control instruction; and
transmitting, by the processor, control information for controlling a surrounding electronic device corresponding to the control instruction to the surrounding electronic device through the executed application.

14. The method of claim 9, wherein displaying, by the processor, information on the at least one function executed in connection with the identified external object on the display comprises:
measuring, by the processor, a distance from the identified external object;
if a value of the measured distance is greater than a preset threshold value, providing, by the processor, a first function related to the identified external object; and
if the value of the measured distance is not greater than the preset threshold value, providing, by the processor, a second function related to the identified external object.

15. The method of claim 9, wherein displaying, by the processor, information on the at least one function executed in connection with the identified external object on the display comprises:
if a notification event is generated while the function related to the external object is provided, determining, by the processor, a target external object of the notification event;
controlling, by the processor, driving of the rotation member to make the display move in a direction in which the determined target external object is located; and
if response information is received from the target external object, providing, by the processor, information on an executed function corresponding to the received response information.

16. An electronic device, comprising:
a rotation support member;
a support member configured to support the rotation support member;
a rotation member rotatably coupled to a surface of the rotation support member;
first and second rotation devices included within the rotation support member and configured to rotate the rotation member in first and second directions;
a display located on a surface of the rotation member;
a driving device configured to drive the display;
a memory; and
a processor,
wherein the processor is configured to control, if input information is received, rotating the rotation member to make the display corresponding to the received input information rotates in the first and second directions, identifying an external object located in the first and second directions through at least one sensor, and providing at least one function related to the identified external object.

17. The electronic device of claim 16, wherein the support member comprises:
a first case having a speaker therein; and
a second case having at least one discharge hole for discharging a sound of the speaker below the first case.

18. The electronic device of claim 16, wherein the rotation support member comprises:
a body comprising first and second housings;
a first rotation device located within the body and configured to have a first driver and to rotate the rotation member in the first direction by the first driver;
a second rotation device located within the body and configured to have a second driver and to rotate the rotation member in the second direction by the second driver;
a rotator located with the body and coupled to the rotation member and configured to rotate along with the rotation member; and
at least one coupling piece located between the rotation member and the rotator and configured to couple the rotation member and the rotator.

19. The electronic device of claim 18, wherein the first rotation device comprises:
the first driver located below the rotator; and
a second gear located on a bottom surface of the rotator and configured to engage with a first gear located on the first driver and to rotate the rotator and the rotation member in the first direction by transferring torque of the first driver to the rotator.

20. The electronic device of claim 18, wherein the second rotation device comprises:
the second driver located on the rotator; and
a second gear located on a side surface of the rotator and configured to engage with a first gear located on the second driver and to rotate the rotator and the rotation member in the second direction by transferring torque of the second driver to the rotator.

* * * * *